(12) United States Patent
Rockel et al.

(10) Patent No.: US 12,086,379 B2
(45) Date of Patent: *Sep. 10, 2024

(54) DEVICES, METHODS, AND GRAPHICAL USER INTERFACES FOR PROVIDING COMPUTER-GENERATED EXPERIENCES

(71) Applicant: Apple Inc., Cupertino, CA (US)

(72) Inventors: Philipp Rockel, San Francisco, CA (US); William A. Sorrentino, III, Mill Valley, CA (US); Stephen O. Lemay, Palo Alto, CA (US); Peter D. Anton, Portola Valley, CA (US)

(73) Assignee: APPLE, INC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,532

(22) Filed: Sep. 14, 2023

(65) Prior Publication Data

US 2024/0004513 A1 Jan. 4, 2024

Related U.S. Application Data

(63) Continuation of application No. 18/107,369, filed on Feb. 8, 2023, now Pat. No. 11,853,527, which is a
(Continued)

(51) Int. Cl.
*G06F 3/048* (2013.01)
*G06F 3/01* (2006.01)
(Continued)

(52) U.S. Cl.
CPC .......... *G06F 3/04815* (2013.01); *G06F 3/013* (2013.01); *G06F 3/017* (2013.01);
(Continued)

(58) Field of Classification Search
CPC ...... G06F 3/04815; G06F 3/013; G06F 3/017; G06F 3/0482; G06F 3/04845;
(Continued)

(56) References Cited

U.S. PATENT DOCUMENTS 8,793,620 B2 7/2014 Stafford
8,994,718 B2 3/2015 Latta et al.
(Continued)

FOREIGN PATENT DOCUMENTS

EP 3 118 722 A1 1/2017

OTHER PUBLICATIONS

Office Action, dated Jun. 2, 2022, received in U.S. Appl. No. 17/475,036, 13 pages.
(Continued)

*Primary Examiner* — Vijay Shankar
(74) *Attorney, Agent, or Firm* — Morgan, Lewis & Bockius LLP

(57) ABSTRACT

At a computer system, in response to detecting a respective user input: if the respective user input meets first criteria requiring the one or both hands of the user maintain a first grip while a first type of movement of the one or both hands is detected, the computer system moves a virtual object in a three-dimensional environment relative to the three-dimensional environment in accordance with the movement of the one or both hands in the three-dimensional environment; and if the respective user input meets second criteria requiring the one or both hands of the user maintain a second grip while a second type of movement of the one or both hands is detected, the computer system replaces the view of the three-dimensional environment corresponding to a first viewpoint with a view of the three-dimensional environment corresponding to a second viewpoint different from the first viewpoint.

36 Claims, 17 Drawing Sheets

Related U.S. Application Data continuation of application No. 17/475,036, filed on Sep. 14, 2021, now Pat. No. 11,599,239.

(60) Provisional application No. 62/706,881, filed on Sep. 15, 2020.

(51) Int. Cl.
*G06F 3/04815* (2022.01)
*G06F 3/0482* (2013.01)
*G06F 3/04845* (2022.01)
*G06T 19/00* (2011.01)

(52) U.S. Cl.
CPC ........ *G06F 3/0482* (2013.01); *G06F 3/04845* (2013.01); *G06T 19/006* (2013.01)

(58) Field of Classification Search
CPC ....... G06F 2203/04806; G06F 3/04842; G06F 3/011; G06F 3/03; G06T 19/006; H04N 7/15
See application file for complete search history.

(56) References Cited

U.S. PATENT DOCUMENTS

| | | | |
|---|---|---|---|
| 9,489,053 | B2 | 11/2016 | Latta et al. |
| 9,971,401 | B2 | 5/2018 | Stafford |
| 11,599,239 | B2 | 3/2023 | Rockel et al. |
| 11,853,527 | B2 * | 12/2023 | Rockel .................. G06T 19/006 |
| 2014/0258942 | A1 | 9/2014 | Kutliroff et al. |
| 2015/0212585 | A1 | 7/2015 | Latta et al. |
| 2022/0083197 | A1 | 3/2022 | Rockel et al. |
| 2023/0185426 | A1 | 6/2023 | Rockel et al. |

OTHER PUBLICATIONS

Nov. 2, 2022, dated Nov. 2, 2022, received in U.S. Appl. No. 17/475,036, 8 pages.

Office Action, dated Jul. 14, 2023, received in U.S. Appl. No. 18/107,369, 8 pages.

Notice of Allowance, dated Aug. 9, 2023, received in U.S. Appl. No. 18/107,369, 8 pages.

International Search Report and Written Opinion, dated Jan. 5, 2022, received in International Patent Application No. PCT/US21/050503, which corresponds with U.S. Appl. No. 17/475,036, 34 pages.

* cited by examiner

DEVICES, METHODS, AND GRAPHICAL USER INTERFACES FOR PROVIDING COMPUTER-GENERATED EXPERIENCES

RELATED APPLICATIONS

This application is a continuation of U.S. application Ser. No. 18/107,369, filed Feb. 8, 2023, which is a continuation of U.S. application Ser. No. 17/475,036, filed Sep. 14, 2021, now U.S. Pat. No. 11,599,239, which claims priority to U.S. Provisional Patent Application 62/706,881, filed Sep. 15, 2020, which are incorporated by reference in their entirety.

TECHNICAL FIELD

This disclosure relates generally to a computer system with one or more display generation components and one or more input devices that provide computer-generated experiences, including but not limited to electronic devices that provide virtual reality and mixed reality experiences via one or more displays.

BACKGROUND

The development of computer systems for virtual reality and augmented reality has increased significantly in recent years. Example augmented reality environments include at least some virtual elements that replace or augment representations of the physical world. Example virtual reality environments include virtual elements that have spatial relationships that simulate spatial relationships in a physical environment. Input devices, such as cameras, controllers, joysticks, touch-sensitive surfaces, and touch-screen displays for computer systems and other electronic computing devices are used to interact with virtual/augmented reality environments. Example virtual elements include virtual three-dimensional objects, digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects is complex, tedious and error-prone, create a significant cognitive burden on a user, and detract from the user experience with the virtual/augmented reality environment. In addition, these methods take longer than necessary, thereby wasting energy. This latter consideration is particularly important in battery-operated devices. In addition, many systems that provide virtual reality and/or mixed reality experiences use head-mounted display devices that physically shield the users' faces from their surroundings, and hinder social interaction and information exchange with the outside world when the users are engaged in the virtual reality and mixed reality experiences.

SUMMARY

Accordingly, there is a need for computer systems with improved methods and interfaces for providing computer-generated experiences to users that make interaction with the computer systems more efficient and intuitive for a user. Such methods and interfaces optionally complement or replace conventional methods for providing computer-generated reality (CGR) experiences to users. Such methods and interfaces reduce the number, extent, and/or nature of the inputs from a user by helping the user to understand the connection between provided inputs and device responses to the inputs, thereby creating a more efficient human-machine interface. Such methods and interfaces also improve the user's experience, e.g., by reducing mistakes, interruptions, and time delays, when the user is engaged in the virtual reality experience and/or the mixed reality experience provided by the computer systems.

In particular, when interacting with a virtual three-dimensional environment that has virtual objects and surfaces of different shapes, sizes, spatial extent, and positions in the three-dimensional environment, the user may wish to navigate within the three-dimensional environment relative to the virtual objects or space to achieve a desired viewing position, viewing perspective, and/or interaction distance relative to a selected virtual object. For some scenarios, the user may wish to navigate toward the virtual object, and for other scenarios, the user may wish to bring the virtual object closer to the current viewpoint. For different virtual objects, a suitable viewing distance may be different, e.g., to facilitate inspection, appreciation, manipulation, and/or other purposes corresponding to the different virtual objects.

Accordingly, in some embodiments, systems and methods for enabling locomotion within the three-dimensional environment are disclosed, where locomotion toward a selected destination position or anchor position in the three-dimensional environment is carried out in response to detecting user input selecting the destination position or anchor position in conjunction with a physical movement of the user's hand(s) while the hand(s) maintain a preset posture or grip (e.g., the formation the preset posture or grip signals the user's intent for locomotion within the three-dimensional environment, and the movement of the user's hand in the preset posture or grip causes execution of the locomotion toward the selected destination position or anchor position). Locomotion toward a selected destination position is implemented by moving the viewpoint of the currently displayed view of the three-dimensional environment toward the selected destination position or anchor position in accordance with the movement of the user's hand(s) in the physical environment. In some embodiments, using gaze input to select a destination position or anchor position for a locomotion request and moving the viewpoint (e.g., visually represented as the changing views of the three-dimensional environment) in response to movement of the user's hand(s), as opposed to movement of the user's head or person as a whole, makes locomotion within the virtual three-dimensional environment faster, easier, and more efficient. A large virtual distance can be traveled quickly in response to a single input or a few inputs. In addition, the physical nature of the input also allows the user to experience the virtual locomotion in a more intuitive and physical way, without requiring the user to expend a lot of energy on providing the inputs. Furthermore, the user can easily select destination positions or anchor positions using gaze (e.g., by looking or gazing at a particular position in the three-dimensional environment), and use the same physical movement of the hand to travel different amount of distances and in different directions in the three-dimensional environment. In some embodiments, the user is provided with control over the speed and distance of the locomotion by changing the movement characteristics of his/her hand movement in the preset hand posture or grip.

In addition, in some embodiments, the computer system disambiguates a user's hand movement based on the type of grip or hand posture that is maintained during the user's hand movement. The type of grip or hand posture is distinguished based on the position of the fingers on a respective hand, the orientation of a respective hand, the number of hands forming the grip, the relative position and orientation of the hands forming the grip, or a combination of two or more of the above, etc., in accordance with various embodiments. In some embodiments, once a destination position or anchor position is selected, if a movable virtual object is present at the destination position or anchor position, the computer system recognizes the user's hand movement as a request to move the virtual object relative to the three-dimensional environment (and relative to the virtual position of the user or the viewpoint of the currently displayed view of the three-dimensional environment) if the user's hand(s) are in a first type of grip during the hand movement; and the computer system recognizes the user's hand movement as a request to move the viewpoint relative to the virtual object (and relative to the three-dimensional environment) if the user's hand(s) are in a second type of grip different from the first type of grip. In some embodiments, the computer system reorients the entire three-dimensional environment relative to the anchor position, while maintaining a fixed spatial relationship between the anchor position and the viewpoint, if the user's hand is in a third type of grip. In some embodiments, the computer system reorients the entire three-dimensional environment including all the virtual objects included in it relative to the virtual position of the user or the viewpoint, if no anchor position is selected, or if there is no movable object at the position of the gaze. In some embodiments, the computer system moves and/or reorients the whole three-dimensional environment relative to the virtual position of the user or the viewpoint if the selected anchor position is a virtual object that is not movable (e.g., a virtual mountain, a virtual wall, etc.). Using the nature of the selected virtual object or position, as well as the user's hand grip that is maintained during the movement of the user's hand, to determine whether to move a virtual object or move the viewpoint, or move the entire three-dimensional environment reduce the number of inputs that need to be remembered and mastered by the user, and makes the interaction with the three-dimensional environment more efficient and intuitive to the user.

In addition, in some embodiments, when a navigation target for a locomotion request has been selected, the computer system does not simply move the viewpoint to the selected navigation target in response to the locomotion request, but performs a more nuanced determination about where to move the viewpoint based on one or more characteristics of the navigation target in addition to the position of the navigation target (e.g., the center position, the position on a surface or bounding box of the navigation target, etc.). In some embodiments, the characteristics of the navigation target include the size, spatial extent, visual content, type, purpose, available interaction modes (e.g., direct manipulation, remote manipulation, etc.), etc. of the navigation target. Selecting different distances between the destination target and the position of viewpoint at the end of locomotion based on the characteristics of the destination target helps to facilitate better viewing and/or easier interaction with the destination target after the locomotion is completed.

In accordance with some embodiments, a method is performed at a computer system including a display generation component and one or more input devices. The method includes: displaying, by the display generation component, a first view of at least a portion of a three-dimensional environment corresponding to a first viewpoint; while displaying the first view of the at least the portion of the three-dimensional environment, detecting a change in grip of a user's hand in conjunction with detecting a gaze input directed to a respective position in the portion of the three-dimensional environment, wherein the change in grip of the user's hand results in a first predefined hand grip; while the user's hand maintains the first predefined hand grip, detecting a respective movement of the user's hand; and in response to detecting the respective movement of the user's hand while the user's hand maintains the first predefined hand grip: in accordance with a determination that the respective position is a first position and that the respective movement includes a first amount of movement, replacing the first view of the at least the portion of the three-dimensional environment corresponding to the first viewpoint with a second view of at least the portion of the three-dimensional environment corresponding to a second viewpoint that is different from the first viewpoint, wherein the second viewpoint is selected in accordance with the respective movement of the user's hand and the first position in the three-dimensional environment; and in accordance with a determination that the respective position is a second position that is different from the first position and that the respective movement includes the first amount of movement, replacing the first view of the at least the portion of the three-dimensional environment corresponding to the first viewpoint with a third view of at least the portion of the three-dimensional environment corresponding to a third viewpoint, wherein the third viewpoint is selected in accordance with the respective movement of the user's hand and the second position in the three-dimensional environment, and the third viewpoint is different from the first viewpoint and the second viewpoint.

In accordance with some embodiments, a method is performed at a computer system including a display generation component and one or more input devices. The method includes: displaying, via the display generation component, a view of at least a portion of a three-dimensional environment corresponding to a first viewpoint; while displaying the view of the at least the portion of the three-dimensional environment corresponding to the first viewpoint, detecting a respective user input, including detecting movement of one or both hands of a user in a physical environment; and in response to detecting the respective user input: in accordance with a determination that the respective user input meets first criteria, wherein the first criteria include a first criterion that is met when the one or both hands of the user maintain a first grip while a first type of movement of the one or both hands is detected, moving a virtual object in the three-dimensional environment relative to the three-dimensional environment in accordance with the movement of the one or both hands in the physical environment; and in accordance with a determination that the respective user input meets second criteria different from the first criteria, wherein the second criteria include a second criterion that is met when the one or both hands of the user maintain a second grip that is different from the first grip while a second type of movement of the one or both hands is detected, replacing the view of at least the portion of the three-dimensional environment corresponding to the first viewpoint with a view of at least the portion of the three-dimensional environment corresponding to a second viewpoint different from the first viewpoint.

In accordance with some embodiments, a method is performed at a computer system including a display generation component and one or more input devices. The method includes: displaying, by the display generation component, a first view of at least a portion of a three-dimensional environment corresponding to a first viewpoint; while displaying the first view of the at least the portion of the three-dimensional environment corresponding to the first viewpoint, detecting a set of one or more first user inputs specifying a navigation target located at a respective position in the three-dimensional environment and triggering a navigation operation toward the navigation target; and in response to detecting the set of one or more first user inputs, displaying, by the display generation component, an updated view of at least the portion of the three-dimensional environment corresponding to a second viewpoint different from the first viewpoint, wherein the second viewpoint is closer to the respective position of the navigation target than the first viewpoint but is spaced apart from the respective position of the navigation target, and the second viewpoint is selected in accordance with a predefined characteristic of the navigation target in conjunction with the respective position of the navigation target.

In accordance with some embodiments, a computer system includes one or more display generation components (e.g., one or more displays, projectors, head-mounted displays, etc., enclosed in the same housing or different housings), one or more input devices (e.g., one or more cameras, a touch-sensitive surface, optionally one or more sensors to detect intensities of contacts with the touch-sensitive surface), optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by a computer system with one or more display generation components, one or more input devices, and optionally one or more tactile output generators, cause the device to perform or cause performance of the operations of any of the methods described herein. In accordance with some embodiments, a graphical user interface on a computer system with one or more display generation components, one or more input devices, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes: one or more display generation components, one or more input devices, and optionally one or more tactile output generators; and means for performing or causing performance of the operations of any of the methods described herein. In accordance with some embodiments, an information processing apparatus, for use in a computer system with one or more display generation components, one or more input devices, and optionally one or more tactile output generators, includes means for performing or causing performance of the operations of any of the methods described herein.

Thus, computer systems with one or more display generation components are provided with improved methods and interfaces for providing computer-generated experiences to users that make interaction with the computer systems more efficient and intuitive for a user. The computer systems are also provide with improved methods and interfaces for providing computer-generated experiences to users that facilitate better social interaction, etiquette, and information exchange with the surrounding environment while users are engaged in various virtual reality and mixed reality experiences. Such methods and interfaces optionally complement or replace conventional methods for providing computer-generated reality (CGR) experiences to users. Such methods and interfaces reduce the number, extent, and/or nature of the inputs from a user by helping the user to understand the connection between provided inputs and device responses to the inputs, thereby creating a more efficient human-machine interface. Such methods and interfaces also improve the user's experience, e.g., by reducing mistakes, interruptions, and time delays, due to lack of social cues and visual information on the part of the user and others present in the same physical environment, when the user is engaged in the virtual reality experience and/or the mixed reality experience provided by the computer systems.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The present disclosure relates to user interfaces for providing a computer-generated reality (CGR) experience to a user, in accordance with some embodiments.

Figure 8:
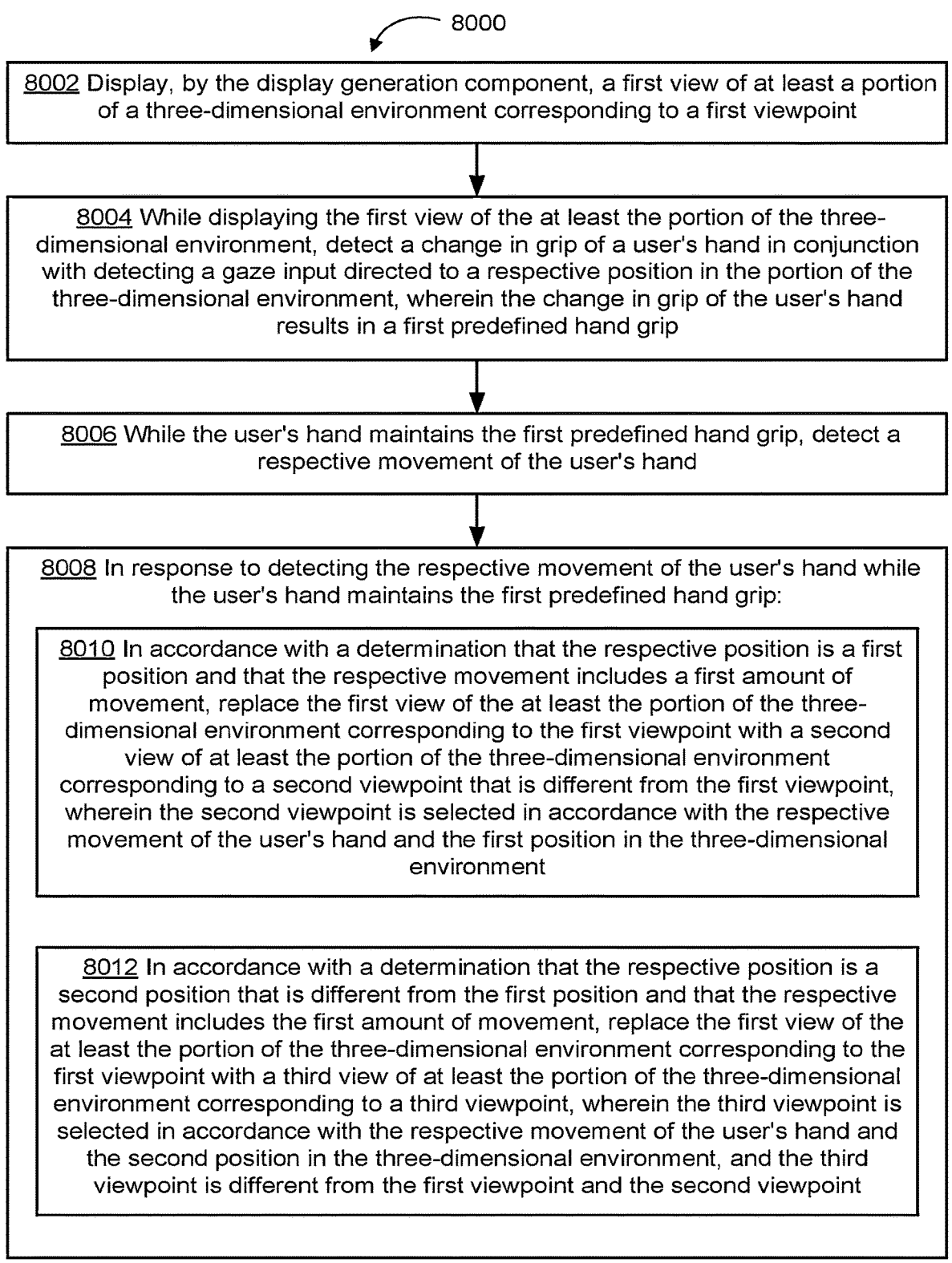
FIG. 8 is a flowchart of a method 8000 for selecting a navigation target and navigating to the navigation target in accordance with a physical gesture, in accordance with some embodiments.
Figure 9:
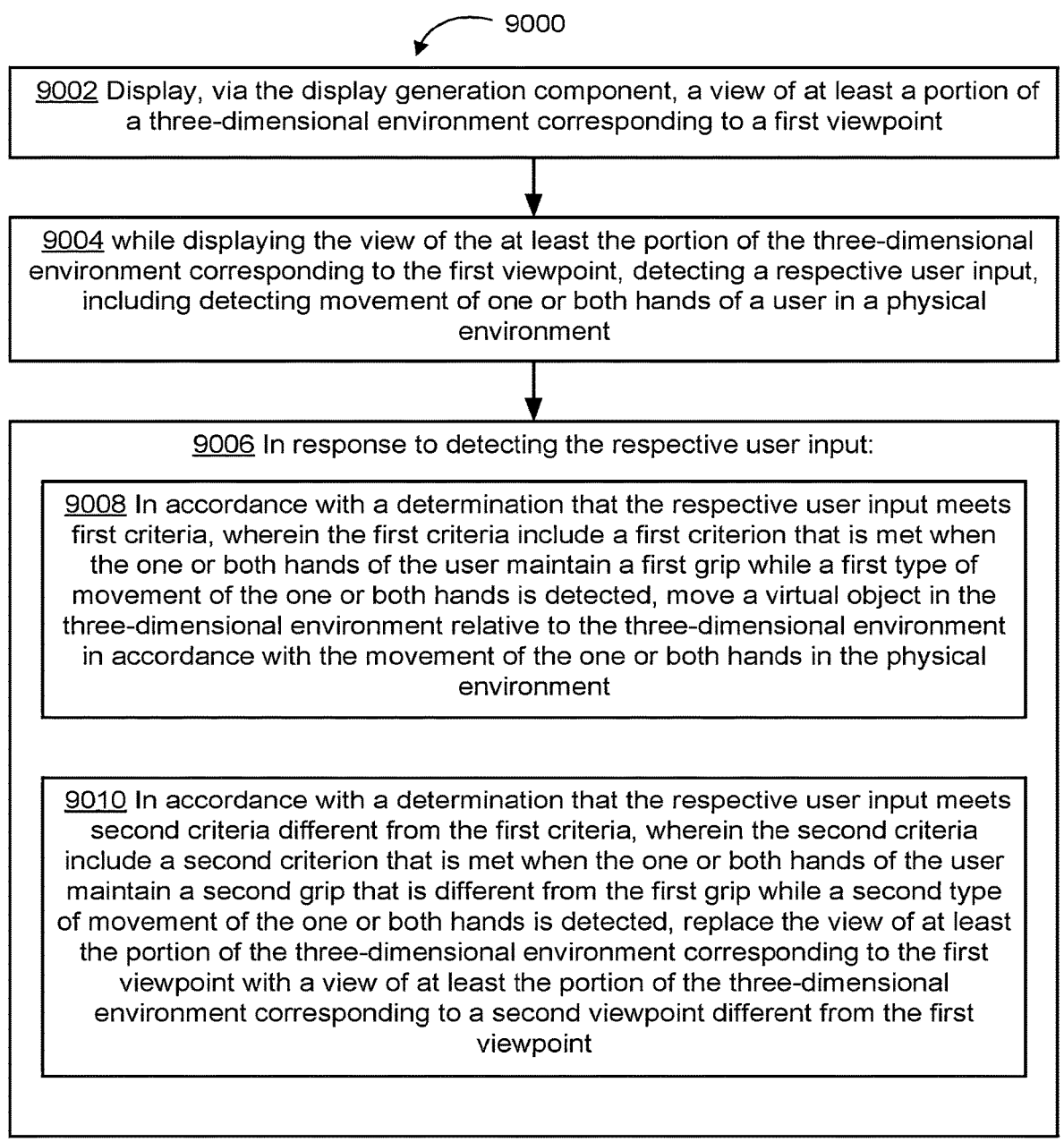
FIG. 9 is a flowchart of a method 9000 for selectively moving a virtual object relative to the three-dimensional environment (and the viewpoint) or moving the viewpoint relative to the three-dimensional environment (and all the virtual objects inside the three-dimensional environment) based on a user's hand grip that is maintained during a sequence of user inputs, in accordance with some embodiments.
Figure 10:
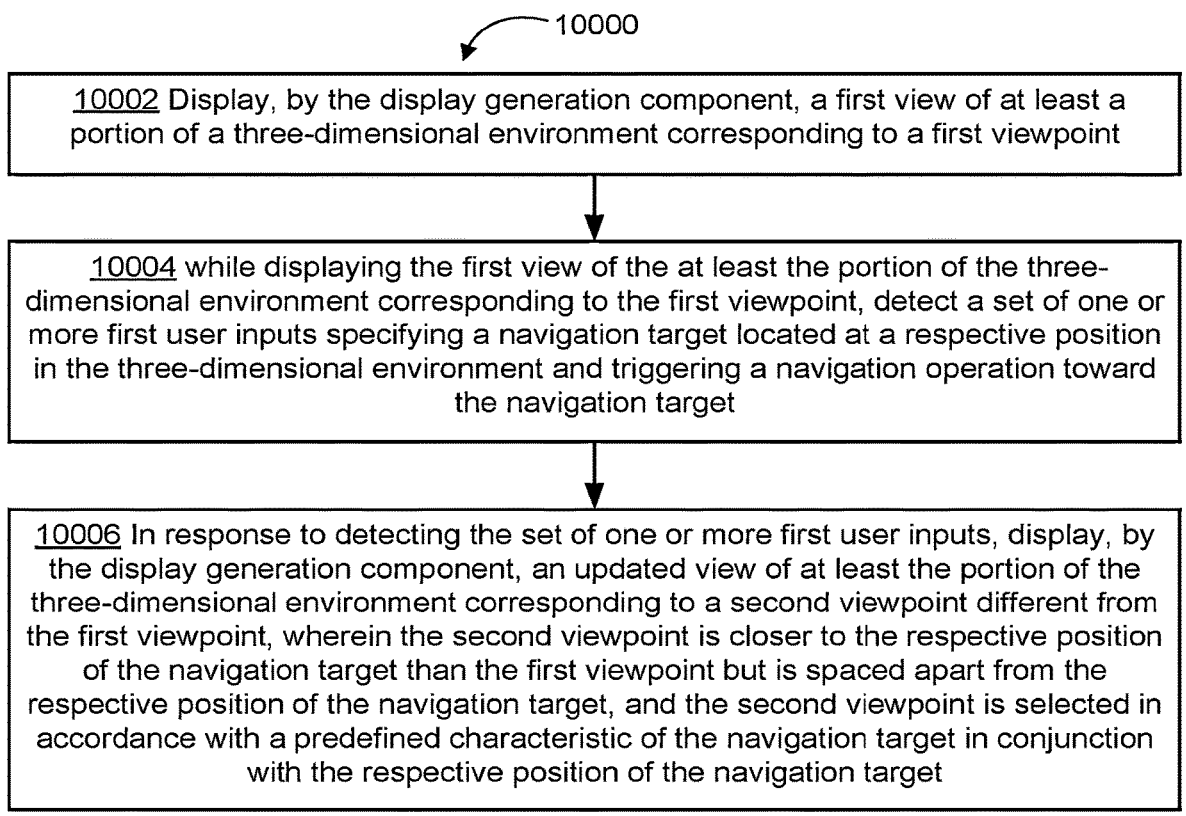
FIG. 10 is a flowchart of a method 10000 for moving a viewpoint toward a selected navigation target in response to a request for locomotion, where the position of the viewpoint at the end of the locomotion is selected based on the position of the navigation target as well as one or more other characteristics of the navigation target, in accordance with some embodiments.

FIGS. 1-6 provide a description of example computer systems for providing CGR experiences to users. FIGS. 7A-7D illustrate selecting a navigation target and navigating to the navigation target in accordance with a physical gesture, in accordance with some embodiments. FIGS. 7E-7I illustrate selectively moving a virtual object relative to the three-dimensional environment (and the viewpoint) or moving the viewpoint relative to the three-dimensional environment (and all the virtual objects inside the three-dimensional environment) based on a user's hand grip that is maintained during a sequence of user inputs, in accordance with some embodiments. FIGS. 7J-7O illustrate moving a viewpoint toward a selected navigation target in response to a request for locomotion, where the position of the viewpoint at the end of the locomotion is selected based on the position of the navigation target as well as one or more other characteristics of the navigation target, in accordance with some embodiments. FIG. 8 is a flowchart of a method for selecting a navigation target and navigating to the navigation target in accordance with a physical gesture, in accordance with some embodiments. FIG. 9 is a flowchart of a method for selectively moving a virtual object relative to the three-dimensional environment (and the viewpoint) or moving the viewpoint relative to the three-dimensional environment (and all the virtual objects inside the three-dimensional environment) based on a user's hand grip that is maintained during a sequence of user inputs, in accordance with some embodiments. FIG. 10 is a flowchart of a method for moving a viewpoint toward a selected navigation target in response to a request for locomotion, where the position of the viewpoint at the end of locomotion is selected based on the position of the navigation target as well as one or more other characteristics of the navigation target, in accordance with some embodiments. The user interfaces in FIGS. 7A-7O are used to illustrate the processes in FIGS. 8-10, respectively.

Figure 1:
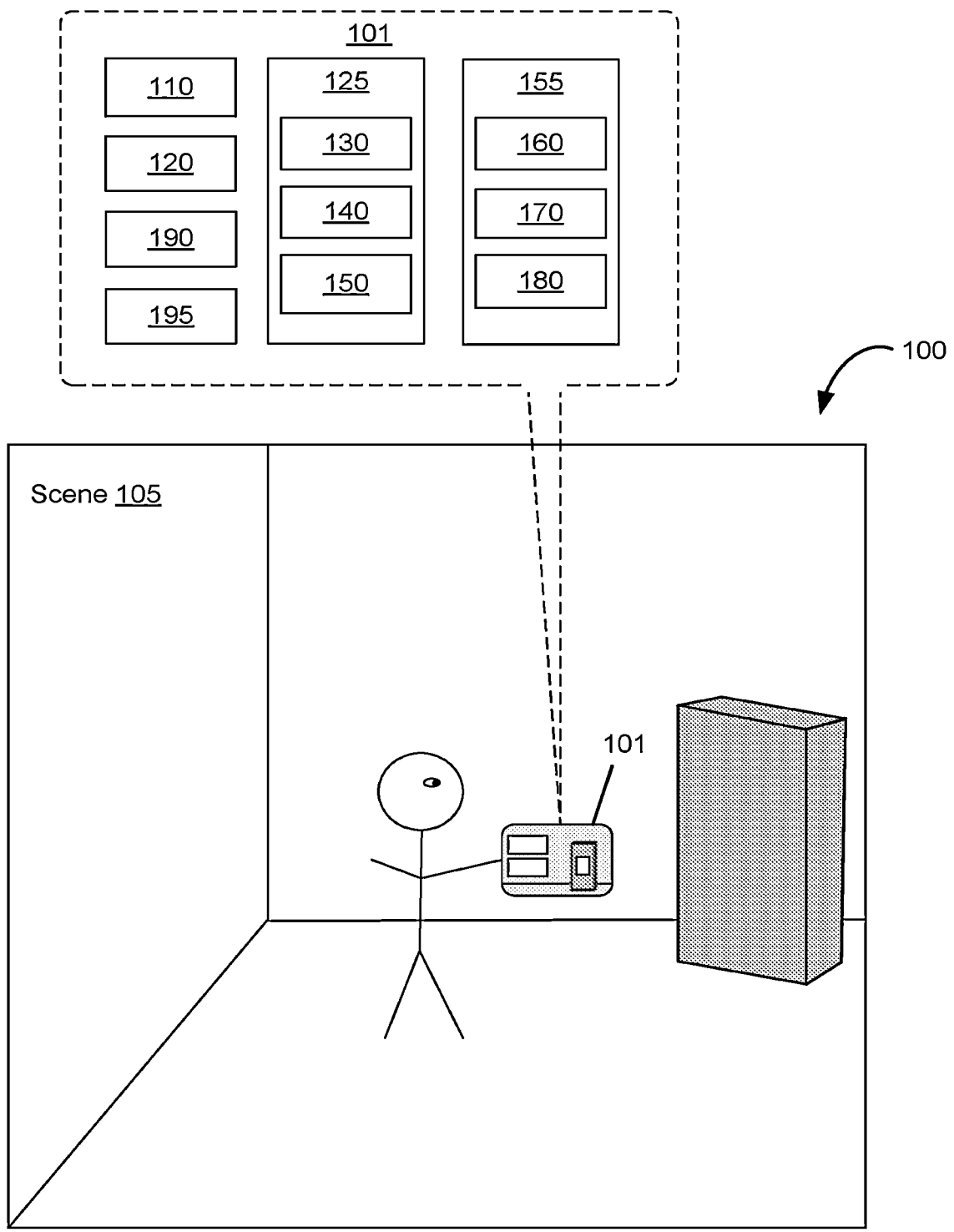
FIG. 1 is a block diagram illustrating an operating environment of a computer system for providing CGR experiences in accordance with some embodiments.

In some embodiments, as shown in FIG. 1, a CGR experience is provided to a user via an operating environment 100 that includes a computer system 101. The computer system 101 includes a controller 110 (e.g., processors of a portable electronic device or a remote server), one or more display generation components 120 (e.g., one or more head-mounted devices (HMDs), an HMD with an inner display and an outer display, one or more displays, one or more projectors, one or more touch-screens, etc., enclosed in the same housing and facing different directions, or enclosed in separate housings), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device (e.g., on the housing of the HMD or an outward facing display of the HMD) or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create a three-dimensional (3D) or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed reality environments include augmented reality and augmented virtuality environments.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical setting/environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation components 120 (e.g., one or more HMDs, displays, projectors, touch-screens, etc., enclosed in the same housing or in different housings) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component(s) 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, at least one of the display generation component(s) 120 is configured to provide the CGR experience (e.g., at least a visual component of the CGR experience) to the user. In some embodiments, the display generation component(s) 120 include a suitable combination of software, firmware, and/or hardware. An example of the display generation component 120 is described in greater detail below with respect to FIG. 3. In some embodiments, the functionalities of the controller 110 are provided by and/or combined with the display generation component(s) 120.

According to some embodiments, at least one of the display generation components 120 provides a CGR experience to the user while the user is virtually and/or physically present within the scene 105.

In some embodiments, the display generation component(s) are worn on a part of the user's body (e.g., on his/her head, on his/her hand, etc.). As such, at least one of the display generation component(s) 120 includes one or more CGR displays provided to display the CGR content. For example, in various embodiments, at least one of the display generation component(s) 120 displays the field-of-view of the user (e.g., a field-of-view from the viewpoint of the user). In some embodiments, at least one of the display generation component(s) 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, at least one of the display generation component(s) 120 is a CGR chamber, enclosure, or room configured to present CGR content in which the user does not wear or hold the display generation component 120. Many user interfaces described herein with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CGR content triggered based on movement of a handheld or tripod mounted device relative to the physical environment (e.g., the scene 105 or a part of the user's body (e.g., the user's eye(s), head, or hand)) could similarly be implemented with an MID where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
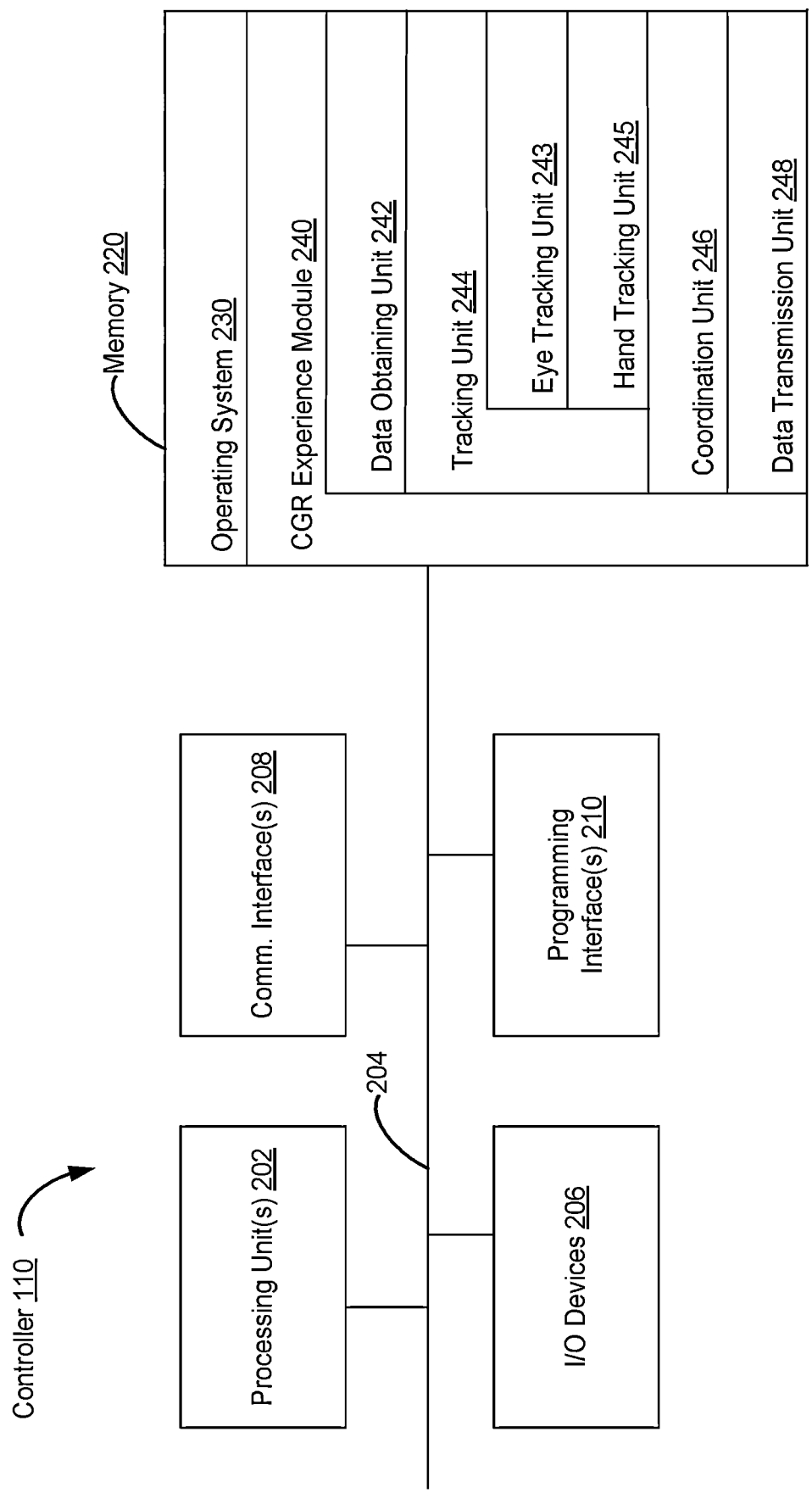
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least one or more of the display generation component(s) 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least one or more of the display generation component(s) 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to at least one of the display generation component(s) 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via at least one of the display generation component(s) 120. The eye tracking unit 243 is described in greater detail below with respect to FIG. 5.

In some embodiments, the coordination unit 246 is configured to manage and coordinate the CGR experience presented to the user by at least one of the display generation component(s) 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least one or more of the display generation component(s) 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
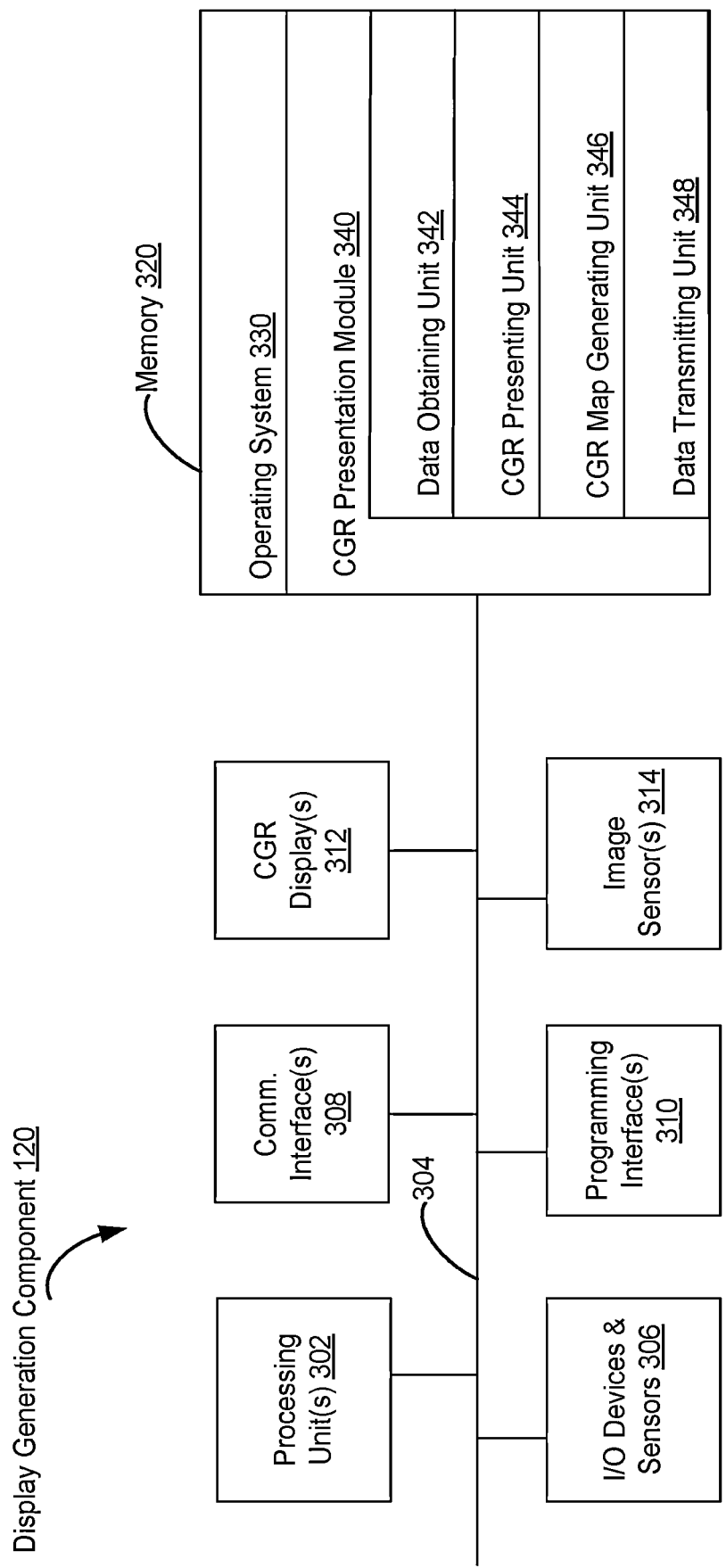
FIG. 3 is a block diagram illustrating a display generation component of a computer system that is configured to provide a visual component of the CGR experience to the user in accordance with some embodiments.

FIG. 3 is a block diagram of an example of at least one of the display generation component(s) 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the computer system (e.g., an HMD) including the display generation component(s) 120 also includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components, in the same housing.

In some embodiments, the one or more communication buses 304 include circuitry that interconnects and controls communications between system components. In some embodiments, the one or more I/O devices and sensors 306 include at least one of an inertial measurement unit (IIU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user and optionally status information related to the CGR experience. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD includes a single CGR display. In another example, the HMD includes a CGR display for each eye of the user. In some embodiments, the one or more CGR displays 312 are capable of presenting MR and VR content. In some embodiments, the one or more CGR displays 312 are capable of presenting MR or VR content. In some embodiments, the HMD includes one or more CGR displays facing the user's eyes, and one or more CGR displays facing away from the user's eyes (e.g., toward the external environment) when the HMD is placed on the user's head. In some embodiments, the computer system is a CGR room or CGR enclosure, and the CGR room or CGR enclosure includes CGR displays on the inside that provide CGR content to users within the CGR room or enclosure, and optionally includes one or more peripheral displays on the outside that displays status information related to the CGR content and the state of the users inside.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component(s) 120 were not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, a data transmitting unit 348, and optionally other operation units for displaying status information related to the user and the CGR content.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content and associated status information via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer-generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
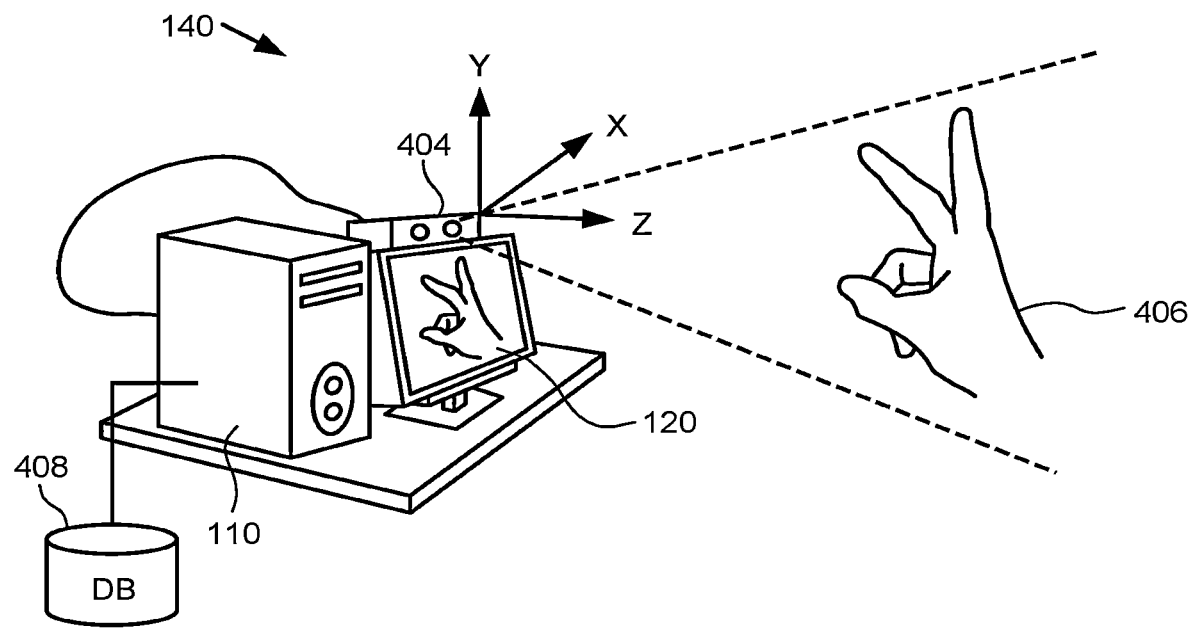
FIG. 4 is a block diagram illustrating a hand tracking unit of a computer system that is configured to capture gesture inputs of the user in accordance with some embodiments.
Figure 4:
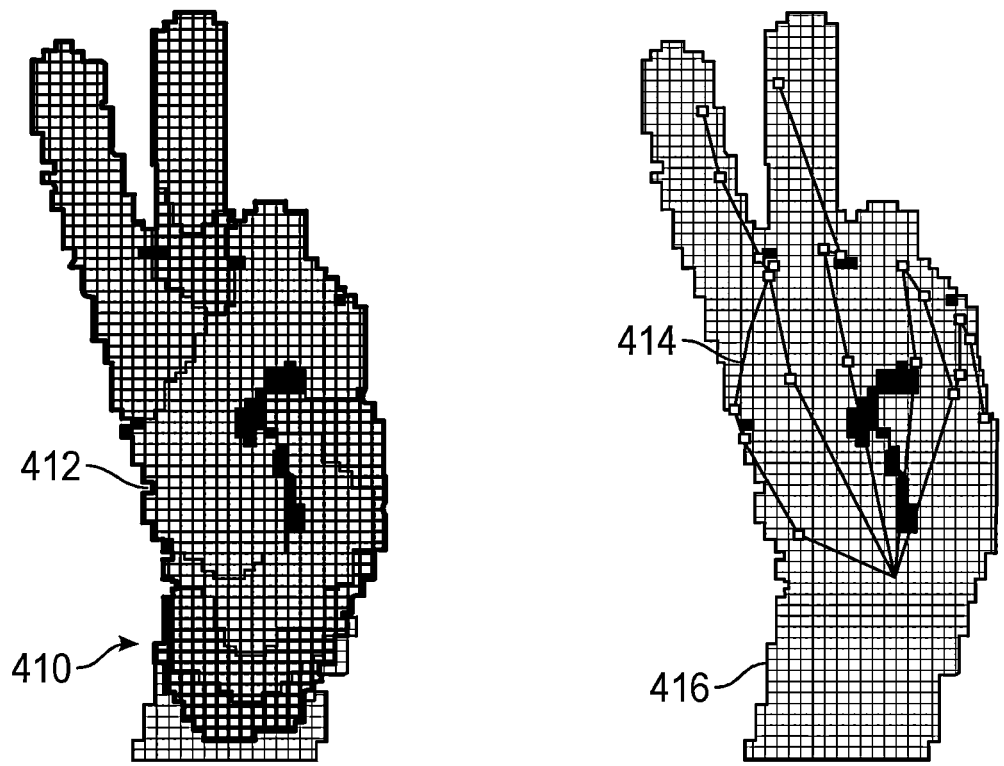

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to at least one of the display generation component(s) 120, or with respect to a portion of the user (e.g., the user's face, eyes, or head), and/or relative to a coordinate system defined relative to the user's hand. In some embodiments, the hand tracking device 140 is part of at least one of the display generation component(s) 120 (e.g., embedded in or attached to the same housing as the display generation component(s) (e.g., in a head-mounted device)). In some embodiments, the hand tracking device 140 is separate from the display generation component(s) 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component(s) 120 accordingly. For example, the user may interact with software running on the controller 110 by moving his hand 406 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component(s) 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, e.g., the measured z distance from the image sensors 404, with the shade of gray growing darker with increasing depth. The controller 110 processes these depth values in order to identify and segment a component of the image (e.g., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
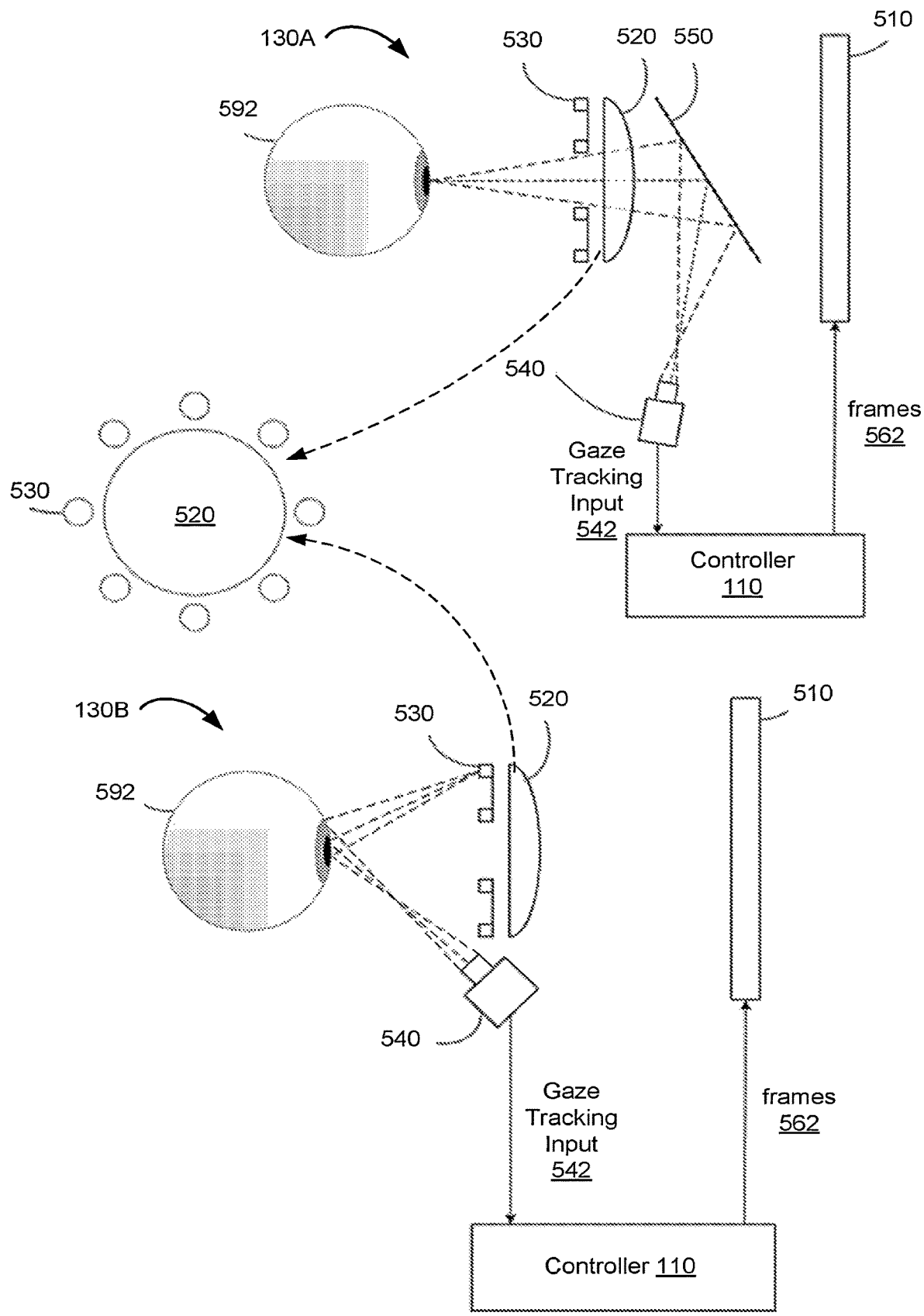
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the CGR content displayed via at least one of the display generation component(s) 120. In some embodiments, the eye tracking device 130 is integrated with at least one of the display generation component(s) 120. For example, in some embodiments, when the display generation component(s) 120 are part of a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component(s) 120. For example, when display generation component(s) are provided by a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with at least one of the display generation component(s) that is also head-mounted, or at least one of the display generation component(s) that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, at least one of the display generation component(s) 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, at least one of the display generation component(s) 120 may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, at least one of the display generation component(s) 120 projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, an inner display of a head-mounted device, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environment of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality (e.g., including virtual reality, and/or mixed reality) applications to provide computer-generated reality (e.g., including virtual reality, augmented reality, and/or augmented virtuality) experiences to the user.

Figure 6:
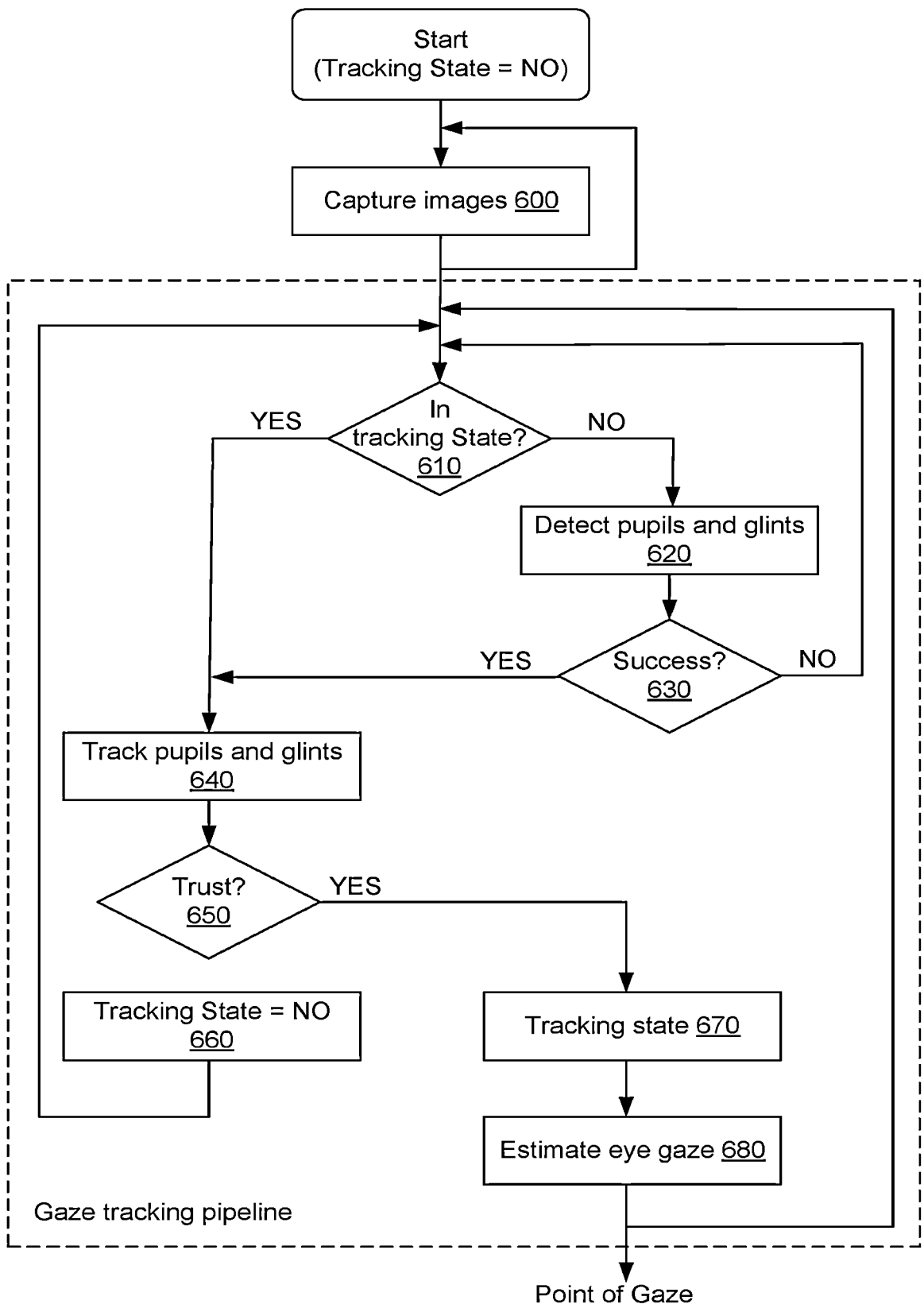
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serves as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with one or more display generation components, one or more input devices, and (optionally) one or cameras.

FIGS. 7A-7D illustrate a computer system (e.g., computer system 101 in FIG. 1) that includes at least a first display generation component (e.g., display 7100), where the computer system displays computer-generated content to a user via the first display generation component (e.g., display 7100), in accordance with some embodiments. In some embodiments, as shown in FIG. 7A, the first display generation component is a display (e.g., display 7100) that is placed in front of a user and that is not supported by or attached to the user's body. In some embodiments, the display generation component has a display side that faces toward the user's face and eyes and displays computer-generated content. In some embodiments, the display generation component has a transparent or semi-transparent portion (e.g., the entire area of the display side, a portion of the display side, etc.) through which the physical environment behind the display generation component is visible to the user facing the display side of the display generation component. In some embodiments, the display generation component displays a camera view of a portion of the physical environment that is obscured by presence of the display generation component, such that a user facing the display side of the display generation component can see the camera view of the portion of the physical environment, optionally, along with virtual content overlaid on, blocking the view of, and/or replacing display of, at least a portion of the camera view of the portion of the physical environment. In some embodiments, the display generation component projects the images of the virtual content into the user's eyes such that the user can visually perceive the virtual content. In some embodiments, the display generation component projects images of the virtual content onto physical surfaces and the virtual content is viewed through a semi-transparent portion or transparent portion of the display generation component along with the physical environment. In some embodiments, the display generation component is a head-mounted display that is attached to and/or supported by the user's head, face, ears, shoulders, and/or nose, and the display side of the head-mounted display faces the user's eyes and has a substantially fixed spatial relationship to the user's eyes. In some embodiments, the display generation component has a display side that is flat. In some embodiments, the display generation component has a display side that is curved and partially or completely surrounds a user's head or body. In some embodiments, the display generation component displays a completely virtual environment (e.g., a virtual game environment, a virtual office, etc.) without concurrently displaying a representation of a physical environment (e.g., a pass-through view (e.g., through a transparent portion of a display, or through a camera view) of the physical environment of the user, a recording of a camera view of a physical environment of the user, etc.). In some embodiments, the display generation component displays virtual content along with a representation of a physical environment, where the virtual content are displayed at various positions relative to the representation of the physical environment, where the various positions have corresponding physical locations in the physical environment. In some embodiments, spatial relationships in the physical environment are correlated to spatial relationships in the mixed reality, and/or augmented reality environment displayed via the display generation component, such that virtual objects appear to be positioned and/or move relative to the physical environment in the mixed reality and/or augmented reality environment. Although the Figures show one type of display generation component as an example, it is emphasized that, in various embodiments, the techniques disclosed herein are also applicable to other types of display generation components, and may prove to be more advantageous for other types of display generation components (e.g., a head-mounted display, a display that blocks the user's view of the physical environment, etc.).

FIGS. 7A-7D illustrate how navigation or locomotion within a virtual three-dimensional environment are performed and visualized in response to user requests, in accordance with some embodiments. In some embodiments, the virtual three-dimensional environment occupies an entire field of view provided by the display generation component. In some embodiments, the virtual three-dimensional environment occupies a portion of the field of view provided by the display generation component (e.g., a virtual portal or window that is displayed concurrently with a representation of a physical environment (e.g., overlaid on, replacing display of, blocking the view of a portion of the representation of the physical environment)). FIGS. 7A-7D are used to illustrate the processes described below, including the processes in FIGS. 8-10.

As show in FIG. 7A, a first display generation component (e.g., display 7100) displays a virtual three-dimensional environment (e.g., virtual three-dimensional environment 7102) that includes various virtual objects (e.g., a virtual tree with virtual treetop 7120 connected to virtual tree trunk 7128, virtual hill 7108, etc.) and/or surfaces (e.g., surface of the virtual objects, virtual walls, virtual floor, etc.) at different positions in the virtual three-dimensional environment. For example, in FIG. 7A, the virtual treetop 7120 has a first spatial relationship with the virtual tree trunk 7218 (e.g., the virtual treetop 7120 is positioned above the virtual tree trunk 7128 with its bottom surface attached to the top of the virtual tree trunk 7128) in the virtual three-dimensional environment. The virtual tree has a second spatial relationship with the virtual hill 7108 (e.g., the bottom of the virtual tree trunk 7128 is attached to the sloped front surface of the virtual hill 7108). The virtual tree has a third spatial relationship to a first viewpoint corresponding to the current view 7205 of the virtual three-dimensional environment. The virtual hill 7108 has a fourth spatial relationship to the first viewpoint corresponding to the current view 7205 of the virtual three-dimensional environment. For example, the virtual tree is at a position that is a first distance (e.g., 30 meters) away from the first viewpoint corresponding to the current view 7205 of the virtual three-dimensional environment 7102); and, compared to the virtual tree, the virtual hill 7108 spans a range that is closer to the first viewpoint in height and distance at the bottom of the hill and farther in distance and lower in height at the top of the hill. In some embodiments, a viewpoint corresponding to a currently displayed view of a three-dimensional environment refers to a virtual position, a vantage point, and/or a viewing perspective in the virtual three-dimensional environment from which the currently displayed view would be seen by a virtual viewer placed at the virtual position, vantage point and/or viewing perspective (e.g., with his/her eyes or head at the virtual position, standing at the virtual position, sitting at the virtual position, etc.). In some embodiments, the viewpoint corresponding to a currently displayed view of a virtual three-dimensional environment moves in the virtual three-dimensional environment in accordance with the movement (e.g., rotation, and/or translation, etc.) of the head of a user (e.g., movement of the head relative to the torso, movement of the head as due to movement of the torso, etc.) who is in a position to view content displayed via the first display generation component. In some embodiments, the position of the user or a portion thereof in the physical environment has a corresponding position in the virtual three-dimensional environment (e.g., the virtual position that corresponds to the viewpoint of the currently displayed view of the virtual three-dimensional environment), and the movement (e.g., rotation, and/or translation, etc.) of the user as a whole or a portion thereof (e.g., user's head and/or torso) in the physical environment, optionally, causes a corresponding movement (e.g., rotation and/or translation, etc.) of the viewpoint of the currently displayed view of the virtual three-dimensional environment. In some embodiments, the correspondence between the movement of the user as a whole or movement of the user's head in the physical environment and the movement of the viewpoint allows the user to experience the spatial relationships in the virtual three-dimensional environment in a more physical and realistic way. However, in many instances, physically moving around in a physical environment is time consuming, cumbersome, and difficult for some users, therefore a more efficient and lightweight way to navigate within the virtual three-dimensional environment and experience the spatial relationships in the virtual three-dimensional environment is desirable. Although in a virtual environment, inputs and/or navigation from one scene to another scene can be made instant, discrete, and abrupt, such abrupt inputs and transitions that are completely decoupled from a user's physical experience may confuse the user, cause user mistakes, detract from the immersive experience provided by the virtual three-dimensional environment, and under-utilize the full richness and complexity of a user's control of his/her physical movement. As disclosed herein, in some embodiments, a user's physical inputs (e.g., hand gestures, finger gestures, movement of arms, movement of wrists, gaze inputs, various combinations of the above, etc.) other than physical movement of the user's head or torso in the physical environment are recognized as requests for locomotion in the three-dimensional environment (e.g., moving the viewpoint (e.g., the virtual position or vantage point from which a portion of the three-dimensional environment is presented to the user) and cause different views of the three-dimensional environment to be displayed to the user (e.g., changing views due to movement of the viewpoint relative to the virtual three-dimensional environment (e.g., moving the viewpoint closer to a virtual object, away from a virtual object, around a virtual object, etc.)).

In some embodiments, as shown in FIG. 7A, the first display generation component is a display that is placed in front of a user and is not supported by or attached to the user's body. In some embodiments, the display is a head-mounted display that has a display side facing toward the user's face and eyes and does not move relative to the user's face or eyes when the user moves his/her head or body in the physical environment. In some embodiments, when a head-mounted display is used as the display generation component, the virtual position of the viewpoint of the currently displayed view of the physical environment corresponds to (e.g., having a preset spatial relationship to, having a constant spatial relationship to, overlaps with, is in proximity to, etc.) a virtual position of the user's eyes or head in the virtual three-dimensional environment. In the examples shown in FIGS. 7A-7D, the user as a whole is stationary relative to a physical environment, in accordance with some embodiments. In some embodiments, the user as a whole may be moving in the physical environment, but the viewpoint is not updated based on the movement of the user as a whole in the physical environment. In some embodiments, the user as a whole or the user's head may be moving in the physical environment which causes a movement of the viewpoint that is independent of and in additional to the movement of the viewpoint that is caused by the request for locomotion issued using the user's hand movement in the physical environment (e.g., in conjunction with the user's gaze, and while in the first preset hand grip).

In some embodiments, as shown in FIG. 7A, the computer system detects a gaze input (e.g., gaze input 7206) being directed to a respective portion of the virtual three-dimensional environment. In some embodiments, as the user's eyes move around while the user is facing the display side of the first display generation component, the computer system tracks the movement of the user's eyes and determines the user's line of sight and the position of the user's focal point in the three-dimensional environment. For example, in some embodiments, in accordance with a determination that the user's line of sight and focal point have localized within a threshold area of a first position in the three-dimensional environment for at least a threshold amount of time, a gaze input is detected; and a virtual object present at the first position is, optionally, recognized as a target of the gaze input. In some embodiments, the computer system displays a visual marker (e.g., visual marker 7122) to show the current location of the gaze input (e.g., gaze input 7206). In some embodiments, the visual marker is displayed in accordance with a determination that a target of the gaze input has been recognized at the location of the gaze input. In some embodiments, the visual marker is displayed in accordance with a determination that the gaze input has met preset criteria (e.g., remained within a threshold area of a virtual position for at least a threshold amount of time (e.g., a threshold amount of time for detecting the gaze input (e.g., a gaze detection threshold), another threshold amount of time (e.g., a dwell time threshold) after the gaze input is detected), etc.). In some embodiments, the visual marker is displayed to merely indicate movement of the line of sight and/or focal point of the user, and does not necessarily mean that the user's attention is focused at the position of the visual marker. In some embodiments, if the visual marker is used to merely indicate the movement of the line of sight or focal point, other visual feedback is provided when a gaze input is detected and/or when a target object of the gaze input is detected (e.g., in accordance with the gaze input alone, or in accordance with the gaze input detected in conjunction with another user input, etc.). In FIG. 7A, the visual marker 7122 is displayed at a position on the virtual treetop 7120 in the first view 7205 of the virtual three-dimensional environment 7102 to indicate that the user is currently looking at the virtual treetop 7120 displayed via the first display generation component (e.g., the display 7100). In this example, the gaze input 7206 on the virtual treetop 7120 selects the virtual treetop 7120 as a target for another user input (e.g., a voice input, a gesture input, a touch input, etc.) that is detected in conjunction with the gaze input 7206.

In FIG. 7A, a representation (e.g., representation 7202') of a user's hand (e.g., hand 7202) is shown in the view 7205 of the three-dimensional environment 7102. In some embodiments, the representation of the user's hand is a camera view of the user's hand held in front of the user's body. For example, in some embodiments, the user's hand is recognized and segmented from the camera view and superimposed or displayed at a position in the three-dimensional environment that corresponds to a virtual position of the user in the three-dimensional environment (e.g., a suitable virtual position of the hand is optionally determined based on the virtual position of the viewpoint of the currently displayed view). In some embodiments, the representation of the user's hand is a stylized graphical representation of the user's hand that, optionally, moves and/or changes to illustrate the movement and/or changing posture of the user's hand in the physical environment. In some embodiments, the representation of the user's hand is not displayed in the currently displayed view of the three-dimensional environment. For example, in some embodiments, the user's hand is outside of the user's field of view provided by the first display generation component. In some embodiments, the user's hand is in a position in front of the user that would have been in the user's field of view but for the presence of the first display generation component in front of the user (e.g., the view of the user's hand is blocked by the first display generation component and no representation of the user's hand is displayed via the first display generation component). In other words, in some embodiments, the user's hand performs a gesture or movement in the physical environment which is captured as a input that causes changes in the three-dimensional environment, even though the gesture and movement of the user's hand is not shown to the user via a representation of the user's hand in the view of the three-dimensional environment. In some embodiments, instead of a single hand, two hands of the user are used to provide the required user input for requesting locomotion within the virtual three-dimensional environment, and are, optionally, both visually represented in the view of the virtual three-dimensional environment.

Figure 7B:
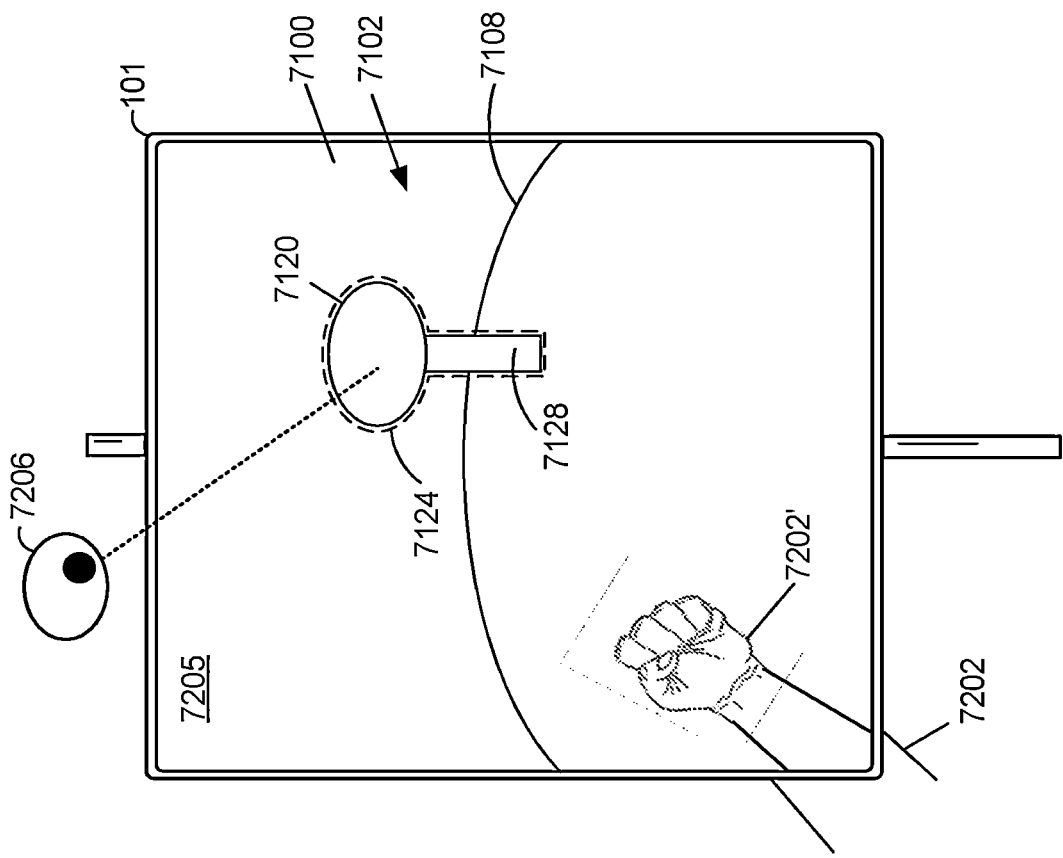
FIGS. 7A-7D illustrate selecting a navigation target and navigating to the navigation target in accordance with a physical gesture, in accordance with some embodiments.
Figure 7A:
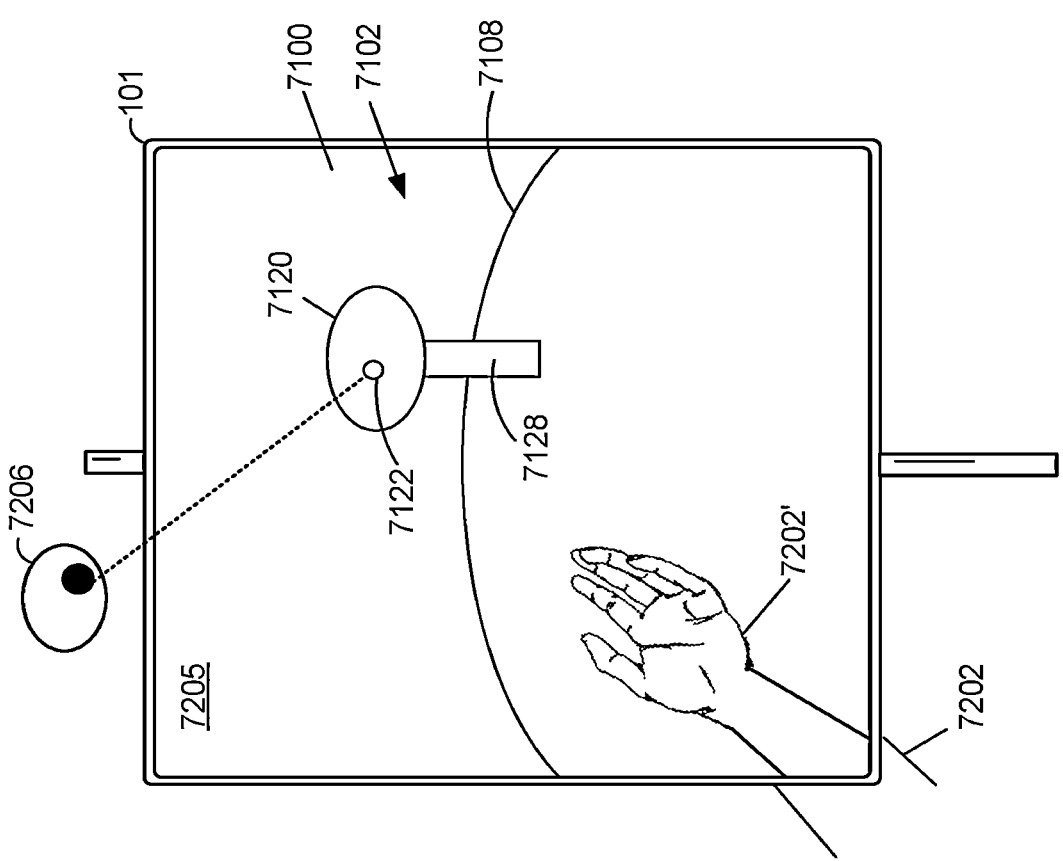

In FIG. 7B following FIG. 7A, while the gaze input 7206 is detected at a position on the virtual treetop 7120 in the first view 7205 of the three-dimensional environment 7102, the computer system detects movement of the user's hand 7202 in the physical environment (e.g., movement of the user's hand that corresponds to a change in grip of the hand). In accordance with a determination that the movement of the user's hand corresponds to movement of the finger(s) and/or wrist to form a first preset hand posture (e.g., forming a fist, fully or partially closing the hand with multiple fingers curling toward and eventually resting on the palm of the hand, pinching multiple fingers together, etc.). In some embodiments, the first preset hand posture corresponds to a grip, a grasp, a hold, and/or a multi-finger pinch, etc. of the hand. In some embodiments, the first preset hand posture requires the hand to have a first preset orientation relative to the user (e.g., with the palm side facing toward the user's face, facing upward, and/or facing sideways, etc.). In some embodiments, the movement of the user's hand includes movement of two hands toward each other and forming a first preset hand posture or grip (e.g., fingers of two hands are locked to each other, one hand is wrapped around another hand that is in a closed fist, two hands clasped together, etc.). As used here, a required hand posture, optionally, includes a required hand grip, a required orientation of the hand, required relative spatial relationships between different parts of the hand, required relative positions of two hands or different parts of two hands, and/or a combination of two or more of the above. In some embodiments, criteria for requesting locomotion includes a required hand grip without additional requirements on the number of hand(s), the orientation(s) of the hand(s), and/or the position(s) of the hand(s) forming the required hand grip. In some embodiments, the criteria for requiring locomotion includes a required hand grip as well as the number of hands, the orientation(s) of the hand(s), and/or the positions of the hand(s) forming the required hand grip. In some embodiments, the computer system detects the movement of the user's hand(s) to form the first preset hand posture or grip in conjunction with (e.g., concurrently with, within a threshold time window of, etc.) detecting the gaze input 7206 on a first portion of the virtual three-dimensional environment (e.g., the virtual treetop 7120); and in response, the computer system selects the virtual treetop 7120, or the virtual tree as a whole (e.g., including the virtual treetop 7120 and the virtual tree trunk 7128) as a target position or anchor position for navigation. In some embodiments, the computer system displays visual feedback 7124 (e.g., highlight, outline, visually distinguish, etc.) to indicate the selection of the target position or anchor position for locomotion (e.g., highlighting the virtual tree as a whole with an outline, or spotlight, darken areas surrounding the virtual tree, etc.) within the three-dimensional environment. In some embodiments, the computer system selects a position or object as the target position or anchor position for locomotion in response to detecting the gaze input moving to and/or dwelling on the position or object while the user's hand(s) have formed and are maintaining the first preset hand posture or grip.

Figure 7D:
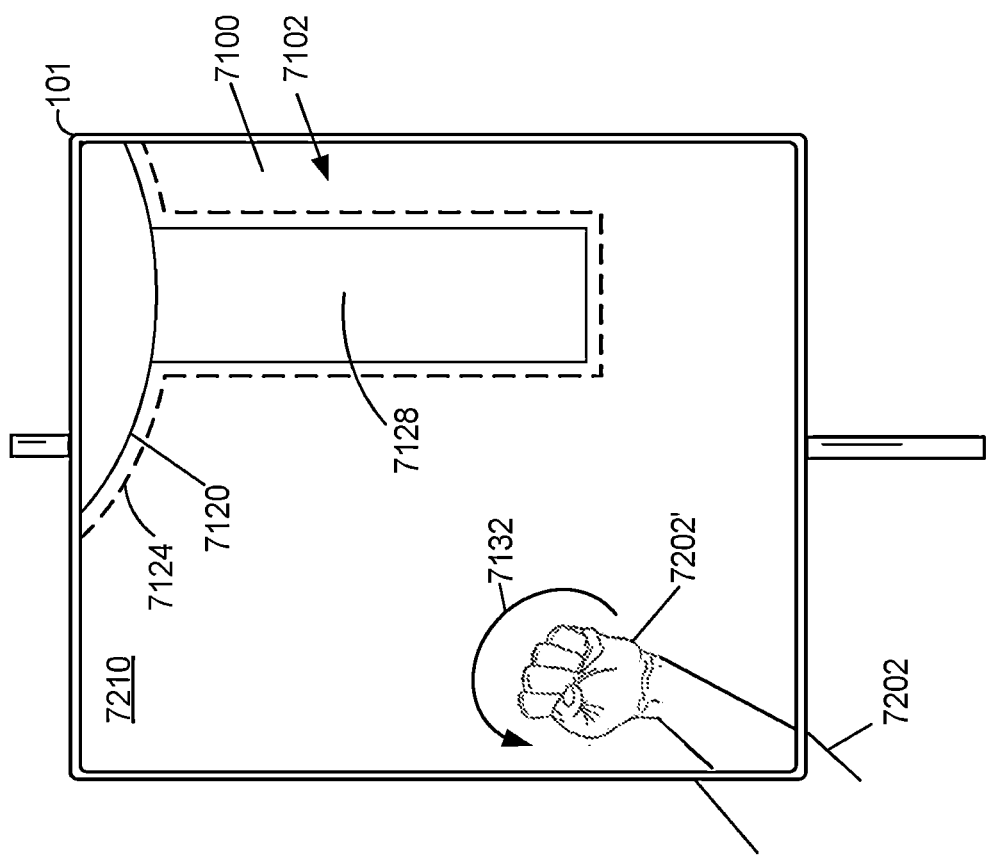
Figure 7C:
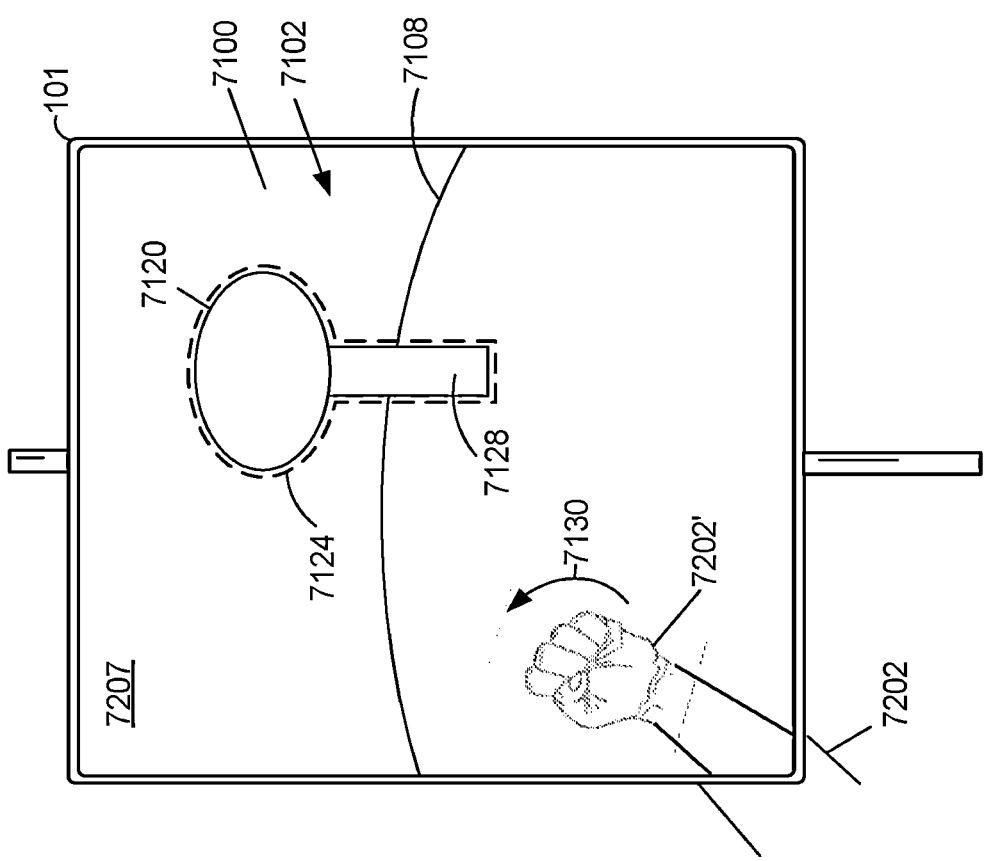

As shown in FIGS. 7C and 7D following FIG. 7B, while the user's hand(s) maintain the first predefined hand posture or grip (e.g., a grasping grip, a pinching grip, two-handed grasp, etc.), the computer system detects movement (e.g., movement 7130, movement 7132, etc.) of the user's hand(s) toward the user (e.g., translation of the user's hand(s) toward the user's body (e.g., due to movement of the user's arm(s) connected to the hand(s) around the elbow(s) or shoulder(s), rotational movement around the wrist(s) connected to the hand(s), or both, etc.). Optionally, the start of the movement of the user's hand(s) in the first predefined hand posture or grip is detected while the gaze input 7206 is maintained at the selected target or anchor position for locomotion. In FIG. 7C, in response to detecting the movement of the user's hand(s) while the user's hand(s) maintain the first predefined hand posture or grip, in accordance with a determination that the selected target position or anchor position for locomotion is a first position (e.g., the virtual tree) and that the respective movement includes (or is) a first amount of movement (e.g., movement 7130 that represents a first fraction of a full range of movement capable of being performed by the hand(s) in this manner (e.g., rotating around the wrist(s), rotating around the elbow(s), rotating around the shoulder(s), etc.)), the computer system replaces the first view 7205 of the virtual three-dimensional environment corresponding to a first viewpoint (e.g., the viewpoint corresponding to a first virtual position in the virtual three-dimensional environment) with a second view 7207 of the virtual three-dimensional environment corresponding to a second viewpoint (e.g., the viewpoint corresponding to a second virtual position in the three-dimensional environment that is different from the first virtual position). As shown in FIGS. 7B-7C, the second viewpoint is selected in accordance with the movement of the user's hand(s) and the target or anchor position selected by the gaze input 7206. As a result of the movement of the viewpoint for the currently displayed view of the three-dimensional environment (e.g., from the first virtual position to the second virtual position), the virtual tree appears much closer to the user, it is as if the user has moved up the virtual hill 7108 and arrived at a vantage point that is higher up in the three-dimensional environment and closer to the virtual position of the virtual tree. In some embodiments, similar movement of the hand(s) can be repeated to move the viewpoint even closer to the selected target or anchor position, as long as the user's hand(s) maintain the first predefined hand posture or grip. In some embodiments, the movement of the viewpoint in the virtual three-dimensional environment simulates or mimics the movement of a virtual position of the user resulted from the user's hand grasping and pulling on an invisible rubber band or taut rope around a virtual pulley anchored at the selected target or anchor position in the virtual three-dimensional environment. In some embodiments, the user's hand(s) relax and reform the first predefined hand posture or grip and/or the hand(s) as a whole restore to a neutral starting position (e.g., with arm(s) or wrist(s) extended back to a neutral relaxed position in front of the user) before repeating the movement toward the user's body to cause further movement of the viewpoint in the virtual three-dimensional environment. In some embodiments, the gaze input is not required to remain on the selected target or anchor position during the subsequent repetition of the hand movement, as long as the movement is repeated with sufficiently high frequency (e.g., each repetition falling within a threshold time window of the previous repetition, there are more than a preset number of repetitions within a preset time window, etc.) after the initial hand movement to indicate that it is part of a continuous sequence of inputs for the same purpose (e.g., navigating toward the selected target or anchor position, navigating in the same direction, etc.). In some embodiments, the visual feedback (e.g., visual feedback 7124) indicating the selected target or anchor position is maintained as long as the time window for using repeated hand movement with the first predefined hand posture or grip to cause locomotion toward the selected target or anchor position is still open.

FIG. 7D follows FIG. 7C, and illustrates continuation of the movement of the user's hand(s) (e.g., movement toward the user's torso or head). In response to detecting the continuation of the movement of the user's hand(s) (e.g., movement 7132 which represents a larger fraction of the full extent of the movement of the hand(s) in this manner), the viewpoint of the currently displayed view of the three-dimensional environment (e.g., the view 7210 in FIG. 7D) is moved even closer to the selected target position or anchor position (e.g., moved from the second virtual position to a third virtual position that is closer to the selected target position or anchor position than the second virtual position), the virtual tree appears right in front of the user, it is as if the user has moved up the virtual hill and arrived at a vantage point right in front of the virtual tree. In some embodiments, the computer system moves the viewpoint right to the target or anchor position, and the user would be viewing the virtual treetop at the surface of the virtual treetop. In some embodiments, the computer system selects a suitable viewing position and distance for viewing the virtual tree that is not immediately on the surface of the virtual tree (e.g., a position below the tree top and next to the tree trunk, a position in mid-air a few feet from the tree top, etc.). More details of selecting a suitable viewing position for a virtual object based on the nature of the virtual object are described with respect to FIGS. 7J-7O and FIG. 10.

In some embodiments, to trigger locomotion within the three-dimensional environment, the movement of the user's hand(s) is not required to be toward the user, and can be in other directions relative to the user. For example, in some embodiments, movement of the user's hand(s) to the left or right side of the user, or upward or downward relative to the user's head, while in the first preset hand posture or grip would result in the corresponding movement of the viewpoint in the three-dimensional environment. More specifically, in some embodiments, when the movement of the user's hand(s) is to the right side of the user's body, the viewpoint is moved leftward in the virtual three-dimensional environment relative to the selected anchor position; and when the movement of the user's hand(s) is to the left side of the user's body, the viewpoint is moved rightward in the virtual three-dimensional environment relative to the selected anchor position. In another example, when the movement of the user's hand(s) is downward relative to the user's body, the viewpoint is moved upward in the virtual three-dimensional environment relative to the selected anchor position; and when the movement of the user's hand(s) is upward relative to the user's body, the viewpoint is moved to downward in the virtual three-dimensional environment relative to the selected anchor position. In another example, when the movement of the user's hand(s) is clockwise, the viewpoint is rotated counterclockwise relative to the selected anchor position; and when the movement of the user's hand(s) is counterclockwise, the viewpoint is rotated clockwise relative to the selected anchor position. In some embodiments, the movement directions of the viewpoint are reversed relative to those described above. More details of how a user may cause a viewpoint of the currently displayed view of the three-dimensional environment to move relative to the three-dimensional environment are also described with respect to FIGS. 7E-7I, where preset hand postures and/or grips are used to determine whether move a viewpoint relative to the three-dimensional environment (and relative to the virtual objects contained therein) or to move a virtual object relative to the three-dimensional environment (and relative to the viewpoint).

In some embodiments, if the gaze input is detected at another position (e.g., the virtual hilltop 7108) in conjunction with detecting the user's hand(s) forming the first predefined hand posture or grip, said other position (e.g., the virtual hilltop 7108) is selected as the target position or anchor position for locomotion. For example, in accordance with a determination that the selected target position or anchor position is the virtual hilltop 7180, for the same amount of movement of the user's hand(s) while the hand(s) maintain the first predefined hand posture or grip, the computer system replaces the first view 7205 with a different view that corresponds to a viewpoint at a virtual position that is selected between the first viewpoint corresponding to the first view 7205 and the virtual hilltop 7108 (e.g., a virtual position that is higher and farther away from the first viewpoint than the virtual tree is). For example, for the movement 7130 of the user's hand(s), the computer system would display a view that shows the virtual tree closer and more to the right in the field of view than that shown in FIG. 7C; and for the movement 7132 of the user's hand(s), the computer system would show a view from the top of the virtual hill, without the virtual tree being present in the field of view (e.g., the virtual tree would be behind the virtual position of the viewpoint at this point).

In some embodiments, as shown in FIGS. 7B-7D, the computer system maintains display of the visual feedback (e.g., visual feedback 7124) indicating the currently selected target position or anchor position (e.g., applying a visual effect that visually emphasize the selected target position or anchor position for locomotion (e.g., highlight or outline around the virtual tree)) during the movement of the viewpoint in response to the movement of the user's hand(s) in the first predefined hand posture or grip.

In some embodiments, before the movement of the hand(s) in the first predefined posture or grip is started, the user has the option to select a different target or anchor position by moving the gaze input to the different position in the three-dimensional environment. For example, a first target or anchor position may be selected before the user's hand forms the first predefined hand posture or grip; and after the user's hand forms the first predefined hand posture or grip, the user moves the gaze to another position while maintaining the first predefined hand posture or grip; and as a result, a new target or anchor position is selected and the visual effect that was applied to the first target or anchor position ceases to be displayed on the first target or anchor position and is applied to the new target or anchor position. In some embodiments, the target or anchor position is selected by the gaze input alone (e.g., before the first predefined hand posture or grip is formed), and as the user moves his/her gaze from one position to another position, the currently selected target or anchor position changes with the movement of the gaze input, and the visual effect also moves with the movement of the gaze input.

In some embodiments, the selection of the target or anchor position made in accordance with the gaze input is further adjustable by additional, more fine-grained inputs, such as movement of the user's finger(s) on a touch-sensitive surface, in air, or relative to other parts of the user's hand, etc. In some embodiments, based on the location of the gaze input (e.g., after the target or anchor position is selected based on the gaze input, before detecting the change in grip of the user's hand, and/or while the user's hand maintains the first predefined hand grip, etc.), the computer system detects a gesture that includes predefined movement of a first portion of the user's hand relative to a second portion of the user's hand (e.g., rubbing the user's thumb against the user's index finger, moving one or more fingers, etc., while maintaining the first predefined hand posture or grip). In response to detecting the gesture, the computing system shifts the selected target or anchor position by a preset small amount (e.g., relative to the location of the gaze input), and shifts a respective application location of the visual effect as well. In some embodiments, the direction and amount of the movement of the application location of the visual effect are determined based on the direction, speed, and/or magnitude of the gesture. For example, before the predefined hand posture or grip is formed or while the predefined hand posture or grip is maintained, one or more fine-tuning gestures can be performed using the same hand(s) to fine tune the target position selected by the gaze input from the top of the virtual treetop 7120 to the middle of the virtual treetop 7120, before the movement of the hand(s) in the predefined hand posture or grip is used to move the viewpoint toward the virtual position for a preset viewpoint associated with the target position (e.g., the target position itself, a suitable viewpoint for viewing the object that is at the target position, etc.). For example, when the gaze input is on the middle portion of virtual treetop 7120, the spotlight is displayed on the whole tree, and the viewpoint corresponding to the target position (e.g., with the full extent of movement of the hand(s) while maintaining the first predefined hand posture or grip) is in front of the virtual tree (e.g., below the virtual treetop 7120 and in front of the tree trunk 7128, as shown in FIG. 7D). If the user swipes his/her thumb forward (e.g., away from the user) relative to the side of the index finger on the same hand while maintaining the first predefined hand posture or grip (e.g., a full-hand grasping grip, a two-handed grip, etc.), the spotlight moves to the top of the virtual treetop 7120, and the viewpoint corresponding to the target position (e.g., with the full extent of movement of the hand(s) while maintaining the first predefined hand posture or grip) would be above the top of the virtual tree (e.g., as if the user is viewing the three-dimensional environment while standing on top of the virtual tree).

In some embodiments, detecting the user's hand(s) moving into the first predefined hand posture or grip includes detecting one hand or one or more fingers of one hand (e.g., an index finger, index finger and middle finger together, etc.) moving to touch and maintain contact with the other hand or a preset portion thereof (e.g., a hand in a closed fist, palm of an open hand, wrist of a close, wrist of an open hand, etc.).

In some embodiments, the amount of movement that the viewpoint goes through is determined based on an amount of wrist rotation that has occurred relative to a full extent of wrist rotation that is typical for a human user (e.g., in the case where the movement of the hand(s) is executed by wrist rotation). In some embodiments, lateral movement of the hand(s) due to movement of the user's arm(s) or person is not taken into account when determining the amount of locomotion that would result from the respective movement of the hand(s). In some embodiments, rotational movement of the hand(s) around the elbow(s) due to movement of the user's arm(s) is not taken into account when determining the amount of locomotion that would result from the respective movement of the hand(s). In some embodiments, the amount of movement that the viewpoint goes through is determined in accordance with an amount of elbow rotation that has occurred relative to a full extend of elbow rotation that is typical for a human user (e.g., in the case where the movement of the hand(s) is executed by elbow rotation with stiff wrist(s)). In some embodiments, the amount of movement that the viewpoint goes through is determined in accordance with an amount of shoulder rotation that has occurred relative to a full extend of shoulder rotation that is typical for a human user (e.g., in the case where the movement of the hand(s) is executed by shoulder rotation with stiff wrist(s) and elbow(s)).

In some embodiments, the movement of the viewpoint is triggered in response to a tap input (e.g., a tap input performed by a thumb of the hand 7202 while the hand 7202 is in a closed fist, a tap input performed by a second hand on a first hand that is in a closed fist, etc.). For example, in some embodiments, the first predefined posture or grip is a closed hand grip with a movable thumb and the movement of the hand that causes the locomotion includes a tapping movement of the thumb on the surface of the closed hand (e.g., on the side of the index finger of the same hand, on the backside of the other fingers of the same hand, etc.), without movement of the whole hand in the closed hand grip.

In some embodiments, the movement of the viewpoint is triggered in response to a swipe input (e.g., a swipe performed by a thumb of the hand 7202 while the hand 7202 is in a grasping posture, a swipe input performed by a second hand on a first hand that is in a closed posture, etc.). For example, in some embodiments, the first predefined posture or grip is a closed hand grip with a movable thumb and the movement of the hand that causes the locomotion includes a swipe movement of the thumb on the closed hand (e.g., on the side of the index finger of the same hand, across the backside of the other fingers of the same hand, etc.), without movement of the whole hand in the closed hand grip. In some embodiments, the swipe direction determines the relative movement direction of the viewpoint and the anchor position. For example, a leftward swipe of the thumb on the closed hand causes the viewpoint to move leftward (or rightward, in some embodiments) relative to the anchor position; a forward swipe of the thumb on the closed hand causes the viewpoint to move forward toward (or backward away from, in some embodiments) the anchor position; a rightward swipe of the thumb on the closed hand causes the viewpoint to move rightward (or leftward, in some embodiments) relative to the anchor position; and a backward swipe of the thumb on the closed hand causes the viewpoint to move backward away from (or forward toward, in some embodiments) the anchor position, etc.

In some embodiments, the movement of the viewpoint is triggered in response to pulling back of the hand(s) (e.g., rotation of the hand(s) around the wrist of the same hand(s), rotation of the arm(s) of the same hand(s) around the elbow(s), etc. toward the user, etc.) while the hand(s) maintain the first predefined hand posture or grip (e.g., hand 7202 in a grasping posture) and release of the hand (e.g., relaxing the wrist(s), uncurling the elbow(s), releasing the first predefined hand posture, etc.).

In some embodiments, instead of or in addition to controlling the amount of movement executed by the viewpoint based on the amount of movement executed by the user's hand(s) while maintaining the first predefined hand posture or grip, other characteristics of movement of the viewpoint are optionally controlled by the characteristics of the movement of the hand(s). For example, in some embodiments, the rate of movement of the viewpoint is determined based on the amount of wrist or elbow rotation that has been executed to cause the hand movement. In some embodiments, characteristics (e.g., direction, speed, etc.) of other gestures (e.g., the tap input, the swipe input, etc.) that is used to cause movement of the viewpoint is used to control the movement characteristics (e.g., direction, speed, etc.) of the viewpoint. In some embodiments, the computer system displays a sequence of intermediate views corresponding to a sequence of intermediate viewpoints between the starting viewpoint (e.g., the viewpoint corresponding to the initial view before the start of the hand movement in the first predefined hand posture or grip) and the final viewpoint (e.g., the viewpoint closest to the selected target or anchor position, the viewpoint at the end of the locomotion, etc.), where the sequence of intermediate viewpoints correspond to changing viewing perspective from a virtual position moving through the three-dimensional environment in accordance with the movement of the user's hand(s) in the first predefined posture or grip. In some embodiments, the movement characteristics (e.g., direction, speed, distance, etc.) of the virtual position are determined based on the movement characteristics of the user's hand(s) (e.g., rotational speed, amount of rotation, a combination thereof of the hand around the wrist(s), around the elbow(s), etc.; tapping speed, tapping duration, swiping speed(s), swiping distance(s), etc.).

In some embodiment, while the displayed view of the three-dimensional environment changes with the movement of the viewpoint, peripheral portions of the view are visually deemphasized (e.g., blurred, displayed with reduced resolution or clarity, etc.) to simulate a motion blur. In some embodiments, visually deemphasizing the peripheral portions of the currently displayed view of the three-dimensional environment during the movement of the viewpoint helps to prevent and alleviate motion sickness experienced by the user when experiencing the locomotion within the computer-generated environment.

In some embodiments, the computer system determines whether to move the viewpoint of the currently displayed view of the three-dimensional environment or to move a virtual object in the three-dimensional environment based on the nature of the object present at the position of the gaze input. For example, if a movable virtual object (e.g., a virtual app window, a virtual ball, a user interface object, etc.) is present at the position of the gaze input, the virtual object is selected as a target object and moved toward the virtual position of the viewpoint in response to the user's hand movement in the first predefined hand posture or grip. If no movable object is present at the position of the gaze input (e.g., the position does not have any virtual object, or a virtual object present at the position mimics something that is not typically movable in the physical environment (e.g., a virtual tree, a virtual house, a virtual wall, a virtual hill, a virtual cloud, etc.), etc.), the movement of the user's hand(s) in the first predefined hand posture or grip is interpreted by the computer system as a request to move the viewpoint (e.g., executing locomotion in the three-dimensional environment).

FIGS. 7E-7I illustrate interactions with the three-dimensional environment that either result in movement of a viewpoint relative to a virtual object or the virtual three-dimensional environment (e.g., simulating movement of the user relative to virtual object or the virtual three-dimensional environment), or in movement of a virtual object relative to the viewpoint or the three-dimensional environment, in accordance with some embodiments.

Figure 7F:
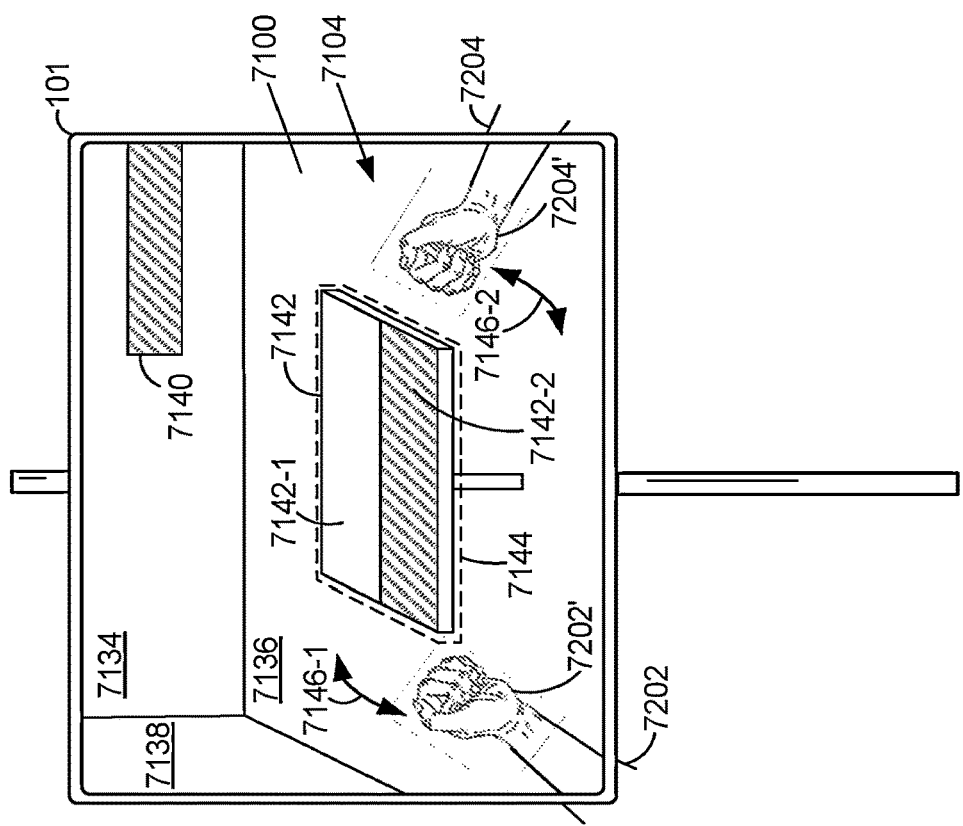
FIGS. 7E-7I illustrate selectively moving a virtual object relative to the three-dimensional environment (and the viewpoint) or moving the viewpoint relative to the three-dimensional environment (and all the virtual objects inside the three-dimensional environment) based on a user's hand grip that is maintained during a sequence of user inputs, in accordance with some embodiments.
Figure 7E:
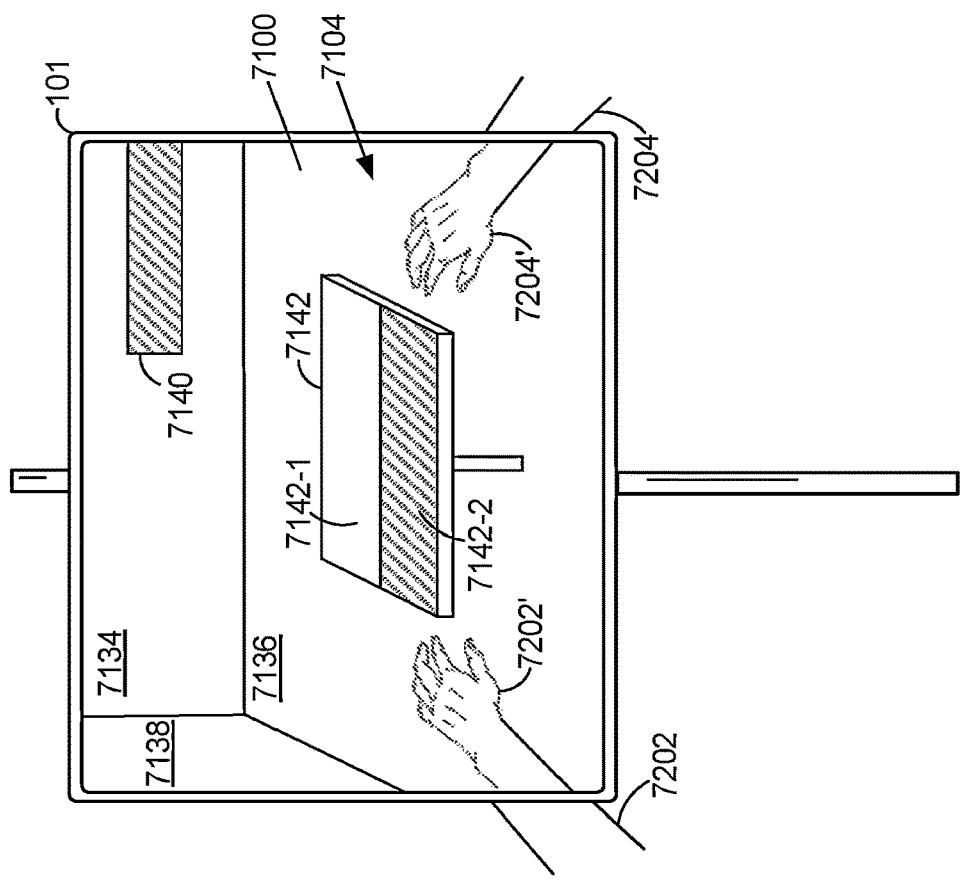

FIGS. 7E-7I illustrate a computer system (e.g., computer system 101 in FIG. 1) that includes at least a first display generation component (e.g., display 7100), where the computer system displays computer-generated content to a user via the first display generation component (e.g., display 7100), in accordance with some embodiments. In some embodiments, as shown in FIG. 7E, the first display generation component is a display (e.g., display 7100) that is placed in front of a user and is not supported by or attached to the user's body. In some embodiments, the display generation component has a display side that faces toward the user's face and eyes and displays computer-generated content. In some embodiments, the display generation component has a transparent or semi-transparent portion (e.g., the entire area of the display side, a portion of the display side, etc.) through which the physical environment behind the display generation component is visible to the user facing the display side of the display generation component. In some embodiments, the display generation component displays a camera view of a portion of the physical environment that is obscured by presence of the display generation component, such that a user facing the display side of the display generation component can see the camera view of the portion of the physical environment, optionally, along with virtual content overlaid on, blocking the view of, and/or replacing display of, at least a portion of the camera view of the portion of the physical environment. In some embodiments, the display generation component projects the images of the virtual content into the user's eyes such that the user can visually perceive the virtual content. In some embodiments, the display generation component projects images of the virtual content onto physical surfaces and the virtual content is viewed through a semi-transparent portion or transparent portion of the display generation component along with the physical environment. In some embodiments, the display generation component is a head-mounted display that is attached to and/or supported by the user's head, face, ears, shoulders, and/or nose, and the display side of the head-mounted display faces the user's eyes and has a substantially fixed spatial relationship to the user's eyes. In some embodiments, the display generation component has a display side that is flat. In some embodiments, the display generation component has a display side that is curved and partially or completely surrounds a user's head or body. In some embodiments, the display generation component displays a completely virtual environment (e.g., a virtual game environment, a virtual office, etc.) without concurrently displaying a representation of a physical environment (e.g., a pass-through view (e.g., through a transparent portion of a display, or through a camera view) of the physical environment of the user, a recording of a camera view of a physical environment of the user, etc.). In some embodiments, the display generation component displays virtual content along with a representation of a physical environment, where the virtual content are displayed at various positions relative to the representation of the physical environment. The various positions, optionally, have corresponding locations in the physical environment. In some embodiments, spatial relationships in the physical environment are correlated to spatial relationships in the virtual reality, mixed reality and/or augmented reality environment displayed via the display generation component. Although the Figures show one type of display generation component as an example, it is emphasized that, in various embodiments, the techniques disclosed herein are also applicable to other types of display generation components, and may prove to be more advantageous for other types of display generation components (e.g., a head-mounted display, a display that blocks the user's view of the physical environment, etc.).

Figure 7H:
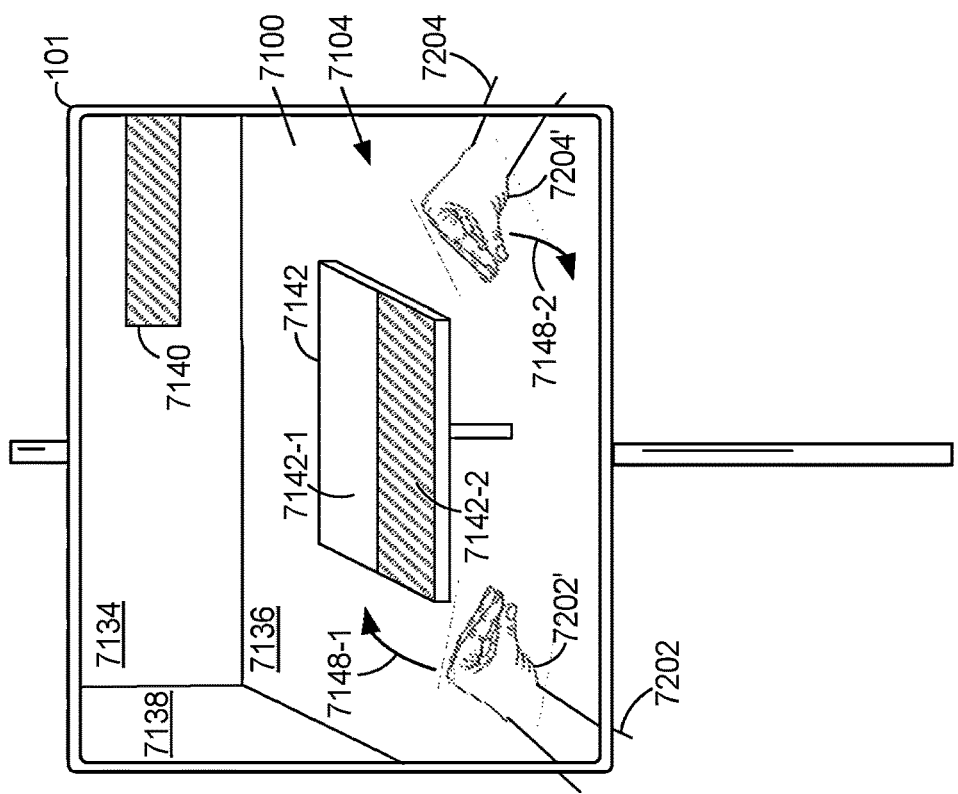
Figure 7G:
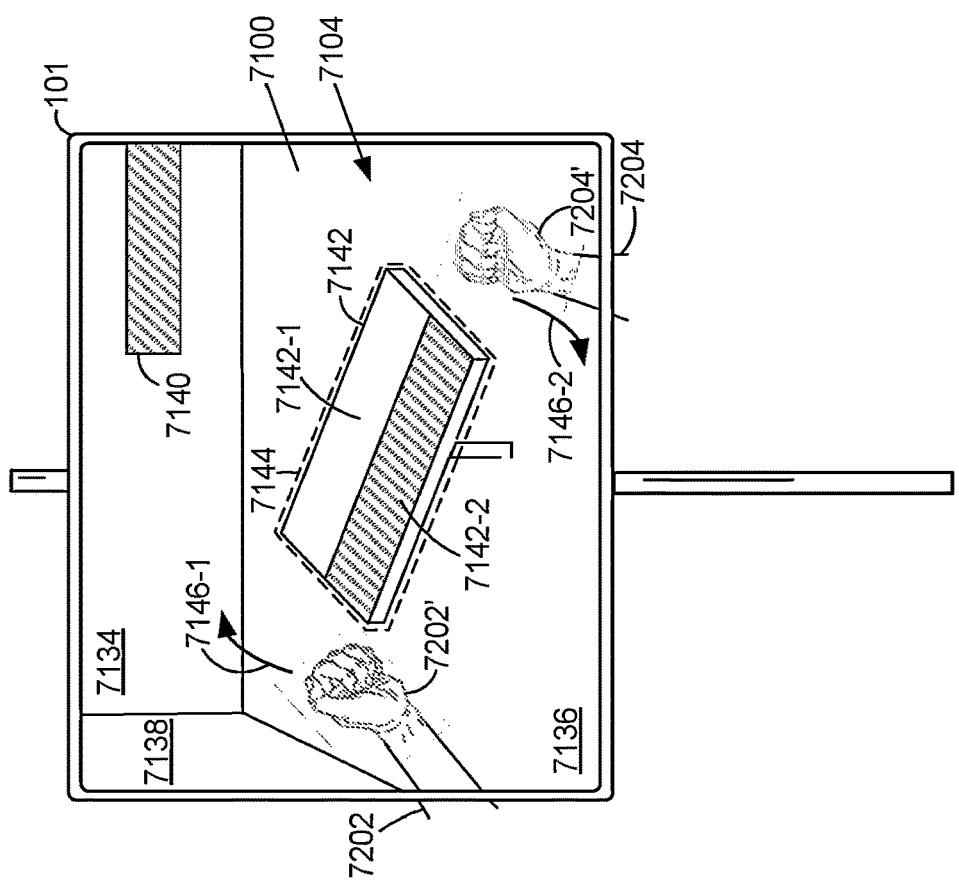
Figure 7I:
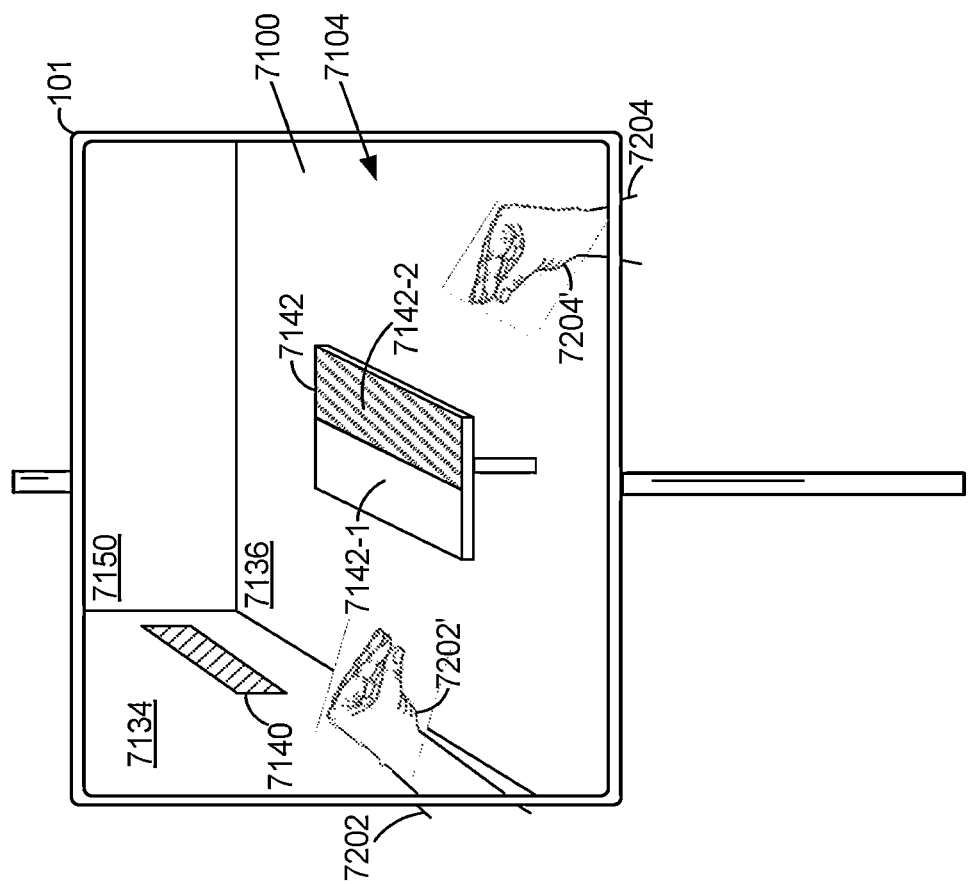
Figure 7K:
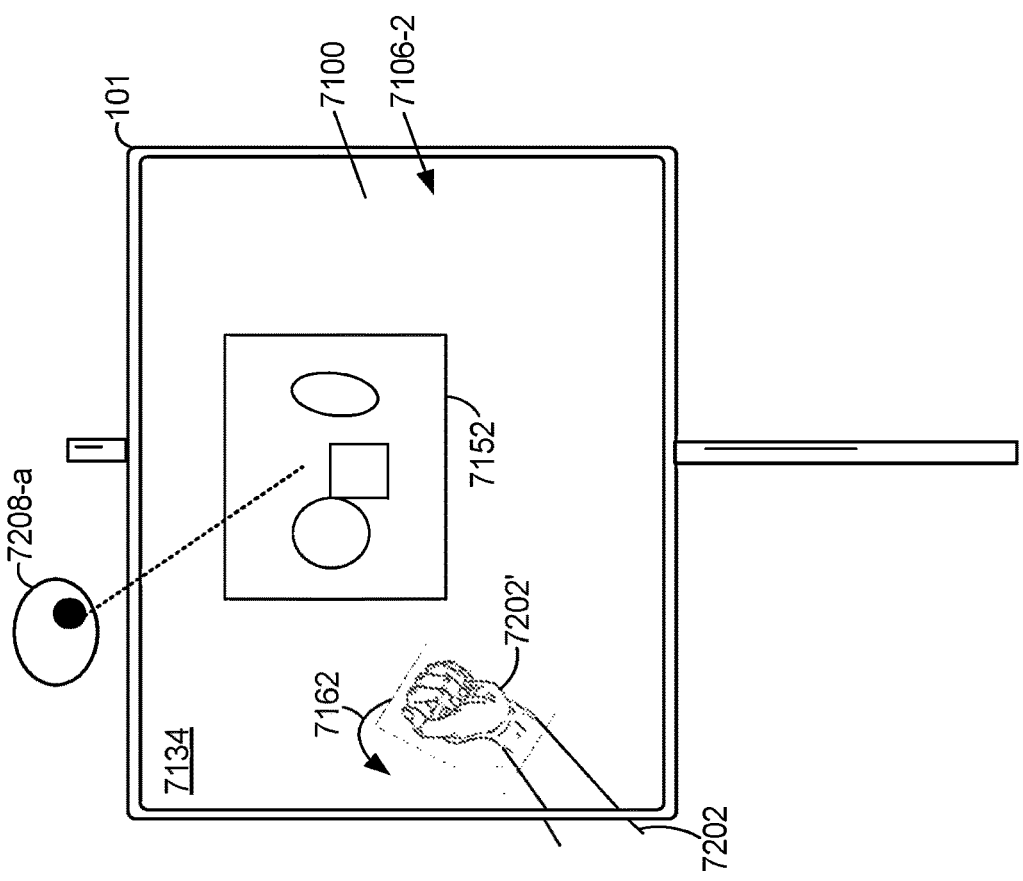
FIGS. 7J-7O illustrate moving a viewpoint toward a selected navigation target in response to a request for locomotion, where the position of the viewpoint at the end of the locomotion is selected based on the position of the navigation target as well as one or more other characteristics of the navigation target, in accordance with some embodiments.

FIGS. 7E-7G illustrate movement of the virtual object (e.g., rotation of virtual object, translation of a virtual object, etc.) relative to the three-dimensional environment (e.g., while the viewpoint remains stationary relative to the three-dimensional environment) in response to user input of a first type, in accordance with some embodiments. FIG. 7E followed by FIGS. 7H-7I illustrate movement of the viewpoint (e.g., rotation of the viewpoint, translation of the viewpoint, etc.) relative to the three-dimensional environment (e.g., while virtual object is kept stationary relative to the three-dimensional environment) in response to user input of a second type, in accordance with some embodiments. In the example shown in FIGS. 7E-7I, the computer system disambiguates the user inputs based on the hand posture or grip that is maintained during the user inputs. FIGS. 7E-7I are used to illustrate the processes described below, including the processes in FIGS. 8-10.

In some embodiments, the three-dimensional environment is a virtual environment without any representation of the physical environment surrounding the user. In some embodiments, the three-dimensional environment includes a virtual environment that has a spatial correspondence to a physical environment (e.g., include virtual walls at positions that correspond to physical locations of walls in the physical environment). In some embodiments, portions of the virtual environment are transparent to reveal portions of the physical environment at locations that correspond to the virtual positions of the portions of the virtual environment. For example, even though the virtual environment obscures most portions of the view of the physical environment, a virtual window may be included in the virtual environment that reveals a portion of physical environment at a location that corresponds to the position of the virtual window in the virtual environment. In some embodiments, the resulting change in view from moving the viewpoint relative to a selected anchor position in the virtual environment is the same as the resulting view change from translating and/or reorienting the entire three-dimensional environment including all virtual objects contained therein relative to the virtual position of the current viewpoint in the three-dimensional environment. In some embodiments, the virtual three-dimensional environment occupies an entire field of view provided by the display generation component. In some embodiments, the virtual three-dimensional environment occupies a portion of the field of view provided by the display generation component (e.g., the virtual environment is viewable through a virtual portal or window that is displayed concurrently with a representation of a physical environment (e.g., overlaid on, replacing display of, blocking the view of a portion of the representation of the physical environment).

As show in FIG. 7E, a first display generation component (e.g., display 7100) displays a virtual three-dimensional environment (e.g., virtual three-dimensional environment 7104) that includes various virtual objects (e.g., a virtual object 7140 on a virtual wall 7134, a virtual table 7142 on a virtual floor 7136, a virtual wall 7138 that is perpendicular to and intersect with the virtual wall 7134 and the virtual floor 7136, etc.) and/or surfaces (e.g., surface of the virtual objects 7140 and 7142, virtual walls 7134 and 7138, virtual floor 7136, etc.) at different positions in the virtual three-dimensional environment. In some embodiments, a spatial relationship between a virtual object to another virtual object is defined by their relative position and relative orientation in the virtual three-dimensional environment. For example, the virtual wall 7314 and virtual wall 7318 are vertical or upright in the three-dimensional environment, and the virtual floor 7136 is horizontal in the three-dimensional environment. The virtual object 7140 is flat and parallel to the virtual wall 7134, and the virtual table 7142 is flat and parallel to the virtual floor 7136. Other virtual objects having different positions and orientations relative to the three-dimensional environment are possible. A respective virtual object or surface has a corresponding position, spatial extent, shape, and/or orientation in the virtual three-dimensional environment that may be static or may change over time (e.g., in response to user input, and/or in accordance with preprogrammed instructions, etc.). In some embodiments, a viewpoint corresponding to a currently displayed view of a virtual three-dimensional environment refers to a virtual position, a vantage point, and/or a viewing perspective in the virtual three-dimensional environment from which the currently displayed view would be seen by a virtual viewer placed at the virtual position, vantage point and/or viewing perspective (e.g., with his/her eyes or head at the virtual position, standing at the virtual position, sitting at the virtual position, etc.). In some embodiments, the viewpoint corresponding to a currently displayed view of a virtual three-dimensional environment moves in the virtual three-dimensional environment in accordance with the movement of the head of a user (e.g., movement of the head relative to the torso, movement of the head as due to movement of the torso, etc.) who is in a position to view content displayed via the first display generation component. In some embodiments, the position of the user or a portion thereof in the physical environment has a corresponding position in the virtual three-dimensional environment (e.g., the virtual position that corresponds to the viewpoint of the currently displayed view of the virtual three-dimensional environment), and the movement of the user as a whole or movement of a preset portion thereof (e.g., user's head and/or torso) in the physical environment, optionally, causes a corresponding movement of the viewpoint of the currently displayed view of the virtual three-dimensional environment. In some embodiments, the correspondence between the movement of the user's head or torso in the physical environment and the movement of the viewpoint allows the user to experience the spatial relationships in the virtual three-dimensional environment in a more physical and realistic way. In some embodiments, as disclosed herein, a user's physical inputs (e.g., hand gestures, finger gestures, movement of arms, movement of wrists, gaze inputs, various combinations of the above, etc.) other than physical movement of the user's head or torso in the physical environment are used to move the viewpoint (e.g., the virtual position or vantage point from which a portion of the three-dimensional environment is presented to the user) relative to virtual objects in the virtual three-dimensional environment (e.g., moving the viewpoint closer to a virtual object, away from a virtual object, around a virtual object, etc.). In some embodiments, movement of a viewpoint is visually represented as replacing a first view corresponding to a first viewpoint at a first virtual position with a second view corresponding to a second viewpoint at a second virtual position, and optionally displaying a sequence of intermediate views that correspond to a sequence of intermediate viewpoints at virtual positions between the first virtual position and the second virtual position (e.g., virtual positions along a virtual movement path of the viewpoint of the currently displayed view, movement path of a virtual position of the user that is in a position to view the content displayed via the display generation component, etc.).

In some embodiments, as shown in FIG. 7E, the first display generation component is a display that is placed in front of a user that is not supported by or attached to the user's body. In some embodiments, the display is a head-mounted display that has a display side facing toward the user's face and eyes and does not move relative to the user's face or eyes when the user moves his/her head or body in the physical environment. In some embodiments, when a head-mounted display is used as the display generation component, the virtual position of the viewpoint of the currently displayed view of the physical environment corresponds to (e.g., having a preset spatial relationship to, having a constant spatial relationship to, overlaps with, is in proximity to, etc.) a virtual position of the user's eyes or head in the virtual three-dimensional environment. In the examples shown in FIGS. 7E-7I, the user as a whole is stationary relative to a physical environment, in accordance with some embodiments. In some embodiments, the user as a whole may be moving in the physical environment, but the viewpoint is not updated based on the movement of the user as a whole in the physical environment. In some embodiments, the user as a whole may be moving in the physical environment and cause movement of the viewpoint that is independent of and in additional to the movement of the viewpoint caused by the physical input other than the movement of the user as a whole in the physical environment.

In FIG. 7E, a representation (e.g., representation 7202') of a user's hand (e.g., hand 7202) and a representation (e.g., representation 7204') of the user's other hand (e.g., hand 7204) are shown in a first view of the three-dimensional environment 7104. In this example, the first viewpoint is at a first virtual position in the three-dimensional environment that is on an opposite side of the virtual table 7142 from the virtual wall 7134, and on the right side of the virtual wall 7138, and above the virtual floor 7136. The virtual table has two portions 7142-1 and 7142-2, and the first virtual position is closer to the shaded portion 7142-2 and farther away from the unshaded portion 7142-1 of the virtual table 7142. In some embodiments, the representation(s) of the user's hand(s) are a camera view of the user's hand(s) held in front of the user's body. For example, the user's hand(s) are recognized and segmented from the camera view and superimposed or displayed at position(s) in the three-dimensional environment that correspond to a virtual position of the user in the three-dimensional environment (e.g., suitable virtual position(s) of the hand(s) are optionally determined based on the virtual position of the viewpoint of the currently displayed view (e.g., the first virtual position)). In some embodiments, the representation(s) of the user's hand(s) are stylized graphical representation(s) of the user's hand(s) that, optionally, move and/or change to illustrate the movement and/or changing posture of the user's hand(s) in the physical environment. In some embodiments, the representation(s) of the user's hand(s) are not displayed or visible in the currently displayed view of the three-dimensional environment. For example, in some embodiments, the user's hand(s) are outside of the user's field of view provided by the first display generation component. In some embodiments, the user's hand(s) are in front of the user and would have been in the user's field of view but for the presence of the first display generation component in front of the user (e.g., the view of the user's hand(s) is blocked by the first display generation component and no representation of the user's hand(s) is displayed via the first display generation component). In other words, in some embodiments, the user's hand(s) perform a gesture or movement in the physical environment which is captured as a input that causes changes in the three-dimensional environment, even though the gesture and movement of the user's hand(s) are not displayed via representations of the user's hand(s) in the view of the three-dimensional environment. In some embodiments, instead of both hands, a single hand of the user is used to provide the required user input for moving a virtual object and/or moving a viewpoint relative to the three-dimensional environment.

In FIGS. 7E-7F, while displaying the first view of the three-dimensional environment 7104, the computer system detects movement of the user's hands 7202 and 7204 that form a first type of hand posture or grip (e.g., one or both hands fully closed into fist(s), fingers curled toward the palm of the same hand on one or both hands, etc.). In some embodiments, the first type of hand posture or grip requires that two hands of the user have a first predefined orientation relative to the user or the physical environment (e.g., both hands facing toward each other, both hands facing the same direction (e.g., upward, toward the user, etc.), etc.). In some embodiments, the computer system only requires a single hand of the user to form the first type of hand posture or grip for the required input. In some embodiments, the computer system only requires a single hand of the user to have the first predefined orientation relative to the user or the physical environment for the required input. In FIG. 7F, after the computer system detects that the user's hand(s) are maintaining the first type of hand posture or grip, the computer system detects the user's hand(s) executing a first type of movement (e.g., two hands rotating around a common center, two hands moving in opposite directions, two hands moving in the same direction, a single hand rotating around a selected anchor position, a single hand translating relative to a preselected anchor position, etc.) while maintaining the first type of hand posture or grip. FIG. 7G following FIG. 7F illustrates that, in response to detecting the movement of the user's hand(s), in accordance with a determination that the user's hand(s) made the first type of movement while maintaining the first type of hand posture or grip, the computer system recognizes the movement of the user's hand(s) as a user's request to rotate a virtual object (e.g., around its own central axis, around the viewpoint, etc.) in the three-dimensional environment (e.g., while keeping the virtual position of the viewpoint stationary in the three-dimensional environment). It is to be noted that, while it is possible, in some scenarios, to trigger movement of the viewpoint in response to the user's head movement in the physical environment, the movement of the viewpoint due to the movement of the user's head would be independent of and in additional to the changes caused by the user's hand movement as described herein.

As shown in FIG. 7G, the virtual table 7142 is selected as the target of the user request for rotating and/or translating a virtual object relative to the three-dimensional environment (e.g., selected based on the location(s) of the user's hand(s), the location of the user's gaze, and/or based on what objects are movable in the three-dimensional environment, etc.). In some embodiments, the object that is selected as the target of the user's request for rotation or translation (e.g., the virtual table 7142) is visually emphasized relative to the three-dimensional environment (e.g., by the visual effect 7144 (e.g., spotlight, outline, animation, etc.), or visual effect that deemphasizes the surrounding environment of the selected target, etc.). In some embodiments, the computer system detects a gaze input being directed to a respective portion of the virtual three-dimensional environment, and the target is selected based on the location of the gaze input at a time proximate to when the first type of hand posture or grip is formed by the user's hand(s). In some embodiments, as the user's eyes move around while the user is facing the display side of the first display generation component, the computer system tracks the movement of the user's eyes and determines the user's line of sight and the position of the user's focal point in the three-dimensional environment. For example, in some embodiments, in accordance with a determination that the user's line of sight and focal point have localized within a threshold area of a first position in the three-dimensional environment for at least a threshold amount of time, a gaze input is detected; and a virtual object present at the first position is, optionally, recognized as a target of the gaze input. In some embodiments, the computer system displays a visual marker to show the current location of the gaze input. In some embodiments, the visual marker is displayed in accordance with a determination that a target of the gaze input has been recognized at the location of the gaze input. In some embodiments, the visual marker is displayed in accordance with a determination that the gaze input has met preset criteria (e.g., remained within a threshold area for at least a threshold amount of time (e.g., a threshold amount of time for detecting the gaze input (e.g., a gaze detection threshold), another threshold amount of time (e.g., a dwell time threshold) after the gaze input is detected), etc.). In some embodiments, the visual marker is displayed to merely indicate movement of the line of sight and/or focal point of the user, and does not necessarily mean that the user's attention is focused at the position of the visual marker. In some embodiments, if the visual marker is used to merely indicate the movement of the line of sight or focal point, other visual feedback (e.g., visual effect 7144) is provided when a gaze input is detected and/or when a target object of the gaze input is detected (e.g., in accordance with the gaze input alone, or in accordance with the gaze input detected in conjunction with the user's hand(s) forming the first type of hand posture or grip, etc.). In some embodiments, when gaze is used to select the target for the user's request to rotate or translate a virtual object, the user can rotate or translate a virtual object that is far away from the virtual position of the viewpoint using his/her hands.

In some embodiments, as the user's hand(s) move in the physical environment, the computer system determines a corresponding amount of movement (e.g., the amount of rotation relative to an axis or center of the virtual object or another anchor axis or position, the amount of translational movement relative to the original position of the virtual object, etc.) that is to be executed by the virtual object relative to the three-dimensional environment in accordance with the amount of movement (e.g., the amount of rotational movement relative to an anchor position (e.g., the center of the two hands), the amount of translational movement relative to the user's torso, etc.) executed by the user's hand(s). In some embodiments, the computer system determines the direction of movement (e.g., clockwise, counterclockwise, forward, backward, upward, downward, leftward, rightward, etc.) to be executed by the virtual object in accordance with the direction of the movement (e.g., clockwise, counterclockwise, forward, backward, upward, downward, leftward, rightward, etc.) executed by the user's hand(s) while maintaining the first type of hand posture or grip. In some embodiments, the computer system determines the characteristics (e.g., speed, acceleration, distance, direction, path, etc.) of the movement of the virtual object in accordance with the characteristics (e.g., speed, acceleration, distance, direction, path, etc.) of the movement of the user's hand(s) while maintaining the first type of hand posture or grip. In some embodiments, the computer system continues movement of the virtual object (e.g., rotation, translation, etc.) after the user's hand(s) has stopped moving and/or is no longer maintaining the first type of hand posture or grip, to simulate manifestation of moment of inertia, conservation of angular momentum, and other physical laws on the virtual object.

In the example shown in FIGS. 7F and 7G, the virtual table 7142 has been selected as the target for the user's request to rotate a virtual object relative to the three-dimensional environment. In another example, if a different virtual object (e.g., the virtual object 7140 on the virtual wall 7134) is selected (e.g., in accordance with the location of the user's gaze input at the time proximate to the user's hand(s) forming the first type of hand posture or grip, in accordance with a location of a pointing gesture detected before the user's hand(s) forming the first type of hand posture or grip, etc.) as the target for the user's request to rotate a virtual object relative to the three-dimensional environment, the same movement of the user's hand(s) while in the first type of hand posture or grip would cause the different virtual object to move in the three-dimensional environment. In some embodiments, the movement of the virtual object is constrained by the type, and/or position of the virtual object in the three-dimensional environment. For example, the virtual table 7142 is, optionally, constrained to rotate around a vertical axis and move in a horizontal plane above the virtual floor 7136, while the virtual object 7140 is, optionally, constrained to move in a vertical plane of the virtual wall 7134 and rotate around a horizontal axis perpendicular to the virtual wall 7134. In some embodiments, the same type of movement of the user's hand(s) may, optionally, cause different types of movement (e.g., different rotational directions, different movement directions, different orientations during movement, etc.) of the virtual object, depending on the type of the virtual object and the movement constraints placed on the virtual object.

In FIGS. 7H-7I, in contrast to the scenario shown in FIGS. 7F-7G, while displaying the first view of the three-dimensional environment 7104, the computer system detects movement of the user's hands 7202 and 7204 that form a second type of hand posture or grip (e.g., multiple fingers of one or both hands forming a pinch posture, fingers extended out from the palm of the same hand on one or both hands, thumb resting on the side of index finger of the same hand on one or both hands, etc.) different from the first type of hand posture or grip. In some embodiments, the second type of hand posture or grip requires that two hands of the user have a second predefined orientation (e.g., same as the first predefined orientation, different from the first predefined orientation, etc.) relative to the user or the physical environment (e.g., both hands facing toward each other, both hands facing the same direction (e.g., upward, toward the user, etc.), etc.). In some embodiments, the computer system only requires a single hand of the user to form the second type of hand posture or grip for the required input. In some embodiments, the computer system only requires a single hand of the user to have the second predefined orientation relative to the user or the physical environment for the required input. In FIG. 7H, after the computer system detects that the user's hand(s) are maintaining the second type of hand posture or grip, the computer system detects the user's hand(s) executing a second type of movement (e.g., two hands rotating around a common center, two hands moving in opposite directions, two hands moving in the same direction, a single hand rotating around a selected anchor point, a single hand translating relative to a preselected anchor point, etc.) while maintaining the second type of hand posture or grip. FIG. 7I following FIG. 7H illustrates that, in response to detecting the movement of the user's hand(s), in accordance with a determination that the user's hands are making the second type of movement (e.g., same as the first type of movement, different from the first type of movement, etc.) while maintaining the second type of hand posture or grip, the computer system recognizes the user's hand movement as a user's request to rotate and/or translate a viewpoint relative to the three-dimensional environment while keeping the virtual objects stationary in the three-dimensional environment. It is to be noted that, while it is possible, in some scenarios, to trigger movement of the viewpoint in response to the user's head movement in the physical environment, the movement of the viewpoint due to the movement of the user's head would be independent of and in additional to the changes caused by the user's hand movement as described herein.

As shown in FIG. 7H, the virtual table 7142 is not selected as the target of the user request, because the request is for moving the viewpoint relative to the three-dimensional environment. In some embodiments, the movement of the viewpoint is a rotational movement that is anchored around a selected anchor point (e.g., virtual table 7142) or around a virtual position of the viewpoint (e.g., pure rotation, without translation of the viewpoint). In some embodiments, when selecting an anchor position that is different from the virtual position of the viewpoint, the computer system selects the anchor position based on the location(s) of the user's hand(s), the location of the user's gaze, and/or other earlier inputs. etc. In some embodiments, the object that is selected as the anchor for the rotation or translation of the viewpoint is visually emphasized relative to the three-dimensional environment. In some embodiments, the whole environment is changed in appearance to indicate that the viewpoint, as opposed to a particular virtual object, is to be rotated or translated in response to the user's hand movement in the second type of hand posture or grip.

In some embodiments, as the user's hand(s) move in the physical environment, the computer system determines a corresponding amount of movement (e.g., the amount of rotation relative to an anchor position or axis (e.g., a position or axis that passes through a selected virtual object or the current virtual position of the viewpoint, etc.), the amount of translational movement relative to the original position of the viewpoint, etc.) that is to be executed by the viewpoint relative to the three-dimensional environment in accordance with the amount of movement (e.g., the amount of rotational movement relative to an anchor position (e.g., the center of the two hands), the amount of translational movement relative to the user's torso, etc.) executed by the user's hand(s). In some embodiments, the computer system determines the direction of movement (e.g., clockwise, counterclockwise, forward, backward, upward, downward, leftward, rightward, etc.) to be executed by the viewpoint of the currently displayed view in accordance with the direction of the movement (e.g., clockwise, counterclockwise, forward, backward, upward, downward, leftward, rightward, etc.) executed by the user's hand(s) while maintaining the second type of hand posture or grip. In some embodiments, the computer system determines the characteristics (e.g., speed, acceleration, distance, direction, path, etc.) of the movement of the viewpoint in accordance with the characteristics (e.g., speed, acceleration, distance, direction, path, etc.) of the movement of the user's hand(s) while maintaining the second type of hand posture or grip. In some embodiments, the computer system continues movement of the viewpoint (e.g., rotation, translation, etc.) after the user's hand(s) have stopped moving and/or are no longer maintaining the second type of hand posture or grip, to simulate manifestation of moment of inertia, conservation of angular momentum, and other physical laws on the user in the three-dimensional environment.

In the example shown in FIGS. 7H and 7I, the virtual table 7142 has been selected as the anchor for the user's request to rotate the viewpoint of the currently displayed view of the three-dimensional environment relative to the three-dimensional environment. In response to the movement of the user's hand(s), the viewpoint is moved from a virtual position that is opposite to the virtual wall 7134 across the virtual table 7142 and closer to the shaded portion 7142-2 of the virtual table to another virtual position that is opposite to another virtual wall 7150 (adjacent to the virtual wall 7134) across the virtual table 7142. It is as if the virtual position of the user has been moved (e.g., rotated) around the virtual table in a direction (e.g., clockwise, counterclockwise, etc.) that corresponds to the direction (e.g., clockwise, counterclockwise, etc.) of movement of the user's hand(s). As a result, as shown in FIG. 7I, the computer system now displays a view of the three-dimensional environment that corresponds to a second viewpoint that is on the opposite side of the virtual table from the virtual wall 7150, on the same side of the virtual wall 7134 as the virtual table 7142, and above the virtual floor 7136, in contrast to the view shown in FIG. 7H. In another example, if a different virtual object or position is selected as the anchor for the rotational or translational movement of the viewpoint (e.g., in accordance with the location of the user's gaze input at the time proximate to the user's hand forming the second type of hand posture or grip, in accordance with a location of a pointing gesture detected before the user's hands forming the second type of hand posture or grip, etc.), the same movement of the user's hand(s) while in the second type of hand posture or grip would cause the viewpoint to rotate around or translate relative to a different position in the three-dimensional environment. In some embodiments, the rotational movement of the viewpoint is constrained, for example, to be around a vertical axis only. For example, the user cannot cause the three-dimensional environment to flip on its side or turned upside down, in some embodiments.

In some embodiments, the first type of hand posture or grip is a full hand grip (e.g., all fingers are curled toward the palm of the same hand) that moves a virtual object in the three-dimensional environment relative to the three-dimensional environment and the viewpoint. In some embodiments, the second type of hand posture or grip is a multi-finger grip (e.g., two or more fingers are touching each other, rather than the palm of the same hand) that moves the viewpoint in the three-dimensional environment, such that the user can view the three-dimensional environment from a different viewing perspective. In some embodiments, the full hand grip includes a first set of fingers (e.g., last three or four fingers, all fingers, etc.) of a respective hand (e.g., each hand, first hand, second hand, first and second hand, etc.) of the user maintaining contact with a palm of the respective hand. A full-hand grip may involve gripping by closing the entire hand (e.g., resembling a closed fist, of either one hand or both hands), and the second type of movement of the hand(s) while maintaining the full-hand grip causes an object in the three-dimensional environment to be moved relative to the three-dimensional environment. In some embodiments, the multi-finger grip includes a set of fingers (e.g., thumb) of a respective hand (e.g., each hand, first hand, second hand, first and second hand, etc.) maintaining contact with another set of fingers (e.g., index finger and/or middle finger, etc.) of the respective hand. A multi-finger grip may involve gripping by closing the thumb and another finger (e.g., of either one hand or both hands), and the first type of movement (e.g., rotation) of the hand(s) around a common center of rotation while maintaining the multi-finger grip causes the user's virtual position (e.g., the viewpoint) in the three-dimensional environment to move relative to the three-dimensional environment. In some embodiments, the functions of the first type of hand posture or grip and the second type of hand posture or grip are reversed, and the movement of the one or both hands while maintaining the second type of hand posture or grip causes an object in the three-dimensional environment to be moved related to the three-dimensional environment, and the movement of the one or both hands while maintaining the first type of hand posture or grip causes the user's virtual position (e.g., the viewpoint) in the three-dimensional environment to move relative to the three-dimensional environment.

In some embodiments, the first type of hand posture or grip is a single handed posture or grip, and the second type of hand posture or grip is a two-handed posture or grip. In some embodiments, the first type of hand posture or grip is a two-handed posture or grip, and the second type of hand posture or grip is a single-handed posture or grip.

In some embodiments, the first type of hand posture or grip is a single-handed posture or grip, and movement of the user's hand while maintaining the single-handed posture or grip causes movement of a selected virtual object relative to three-dimensional environment (e.g., also relative to the viewpoint of the currently displayed view of the three-dimensional environment) (e.g., as if the virtual object is moved relative to the virtual position of the user in the three-dimensional environment in accordance with the user's hand movement). In some embodiments, the second type of hand posture or grip is a two-handed posture or grip, and movement of the user's hands while maintaining the two-handed posture or grip causes movement of the viewpoint relative to the three-dimensional environment (e.g., as if the user is moved relative to the three-dimensional environment in accordance with the user's hand movement).

In some embodiments, the computer system, when switching from displaying the view corresponding to the first viewpoint to displaying the view corresponding to the second viewpoint, displays a sequence of intermediate views corresponding to a sequence of intermediate viewpoints on a path of the movement of the viewpoint, wherein the path is determined based on the movement path of the user's hand(s) while maintaining the second type of hand posture or grip.

In some embodiments, movement of the user's hand while maintaining a one-handed grip causes a selected virtual object to move in the three-dimensional environment relative to the viewpoint, and movement of the user's hands while maintaining a two-handed grip causes the viewpoint to move in the three-dimensional environment (e.g., relative to a selected virtual object). For example, in some embodiments, if the user moves his/her hand toward himself/herself while maintaining a one-handed grip, the computer system moves a selected virtual object toward himself/herself in the first view of the three-dimensional environment corresponding to the first viewpoint, and if the user moves both hands toward himself/herself while the hands maintain a two-handed grip, the computer system moves the viewpoint of the currently displayed view of the three-dimensional environment toward a selected anchor position (e.g., to a selected virtual object, to a closest suitable viewpoint for viewing the selected virtual object, etc.) in the three-dimensional environment.

In some embodiments, moving the virtual object in the three-dimensional environment includes rotating the virtual object in the three-dimensional environment around a virtual position corresponding to the first viewpoint (e.g., so that the virtual object rotates around the virtual position of the user in the three-dimensional environment without getting closer to the virtual position of the user, and the same side of the virtual object is, optionally, shown to the user in the first view of the three-dimensional environment during the rotation of the virtual object). In some embodiments, moving the virtual object in the three-dimensional environment includes rotating the virtual object in the three-dimensional environment around a virtual axis that passes through the virtual object (e.g., so that a different side of the virtual object faces the user without getting closer to or farther away from the virtual position of the user). In some embodiments, moving the viewpoint of the currently displayed view of the three-dimensional environment from the first viewpoint to the second viewpoint includes rotating the viewpoint around the anchor position (e.g., the position of the virtual object) with a predetermined spatial relationship to the first viewpoint (e.g., located in front of the position the first viewpoint) (e.g., so that the user can see the virtual object at the target position from another angle without moving the virtual object in the three-dimensional environment). For example, in some embodiments, when the user moves his/her hand(s) clockwise or counterclockwise toward himself/herself around a horizontal circle, if the hand(s) maintain the first type of grip during the movement of the hand(s), the computer system rotates the virtual object located at the selected target position around its own central axis so the far side of the virtual object is moved toward the virtual position of the user in the first view of the three-dimensional environment corresponding to the first viewpoint, and if the hand(s) maintain the second type of grip during the movement of the hand(s), the computer system moves the viewpoint of the currently displayed view of the three-dimensional environment along a circular orbit around an anchor point to a different side of the selected target position (e.g., a virtual object at the target position, or a position without virtual object, etc.) in the three-dimensional environment.

In some embodiments, the computer system requires that a distance between two hands of the user do not change by more than a threshold amount during the movement of the two hands while maintaining the first type of hand posture grip and/or the second type of hand posture or grip, in order to recognize the hand movement as a request for moving a virtual object or a request for moving a viewpoint relative to the three-dimensional environment. In some embodiments, if the computer system detects that the distance between the two hands of the user has changed by more than the threshold amount during the movement of the two hands while maintaining the first type of hand posture or grip and/or the second type of hand posture or grip, the computer system recognizes the hand movement as a request to resize a virtual object or change the shape of a virtual object.

In some embodiments, in accordance with a determination that the user's hand(s) maintain a third type of hand posture or grip (e.g., either the first type of hand posture or grip or the second type of hand posture or grip, or a type of hand posture or grip that is different from the first and second types of hand posture and grip, etc.) while executing a third type of movement (e.g., coordinated movement of both hands such as moving the two hands apart from each other or toward each other), the computing system resizes a selected virtual object (e.g., virtual table 7142, virtual object 7140, etc.) in the three-dimensional environment relative to the three-dimensional environment in accordance with the movement of the both hands (e.g., relative movement of both hands) in the physical environment. In some embodiments, the change in the size of the virtual object is proportional to or otherwise correlated to a change in distance between the two hands in the physical environment from the time when the hands first formed the third type of hand posture or grip).

In some embodiments, in accordance with a determination that the user's hand(s) maintain a fourth type of hand posture or grip (e.g., either the first type of hand posture or grip or the second type of hand posture or grip, or a type of hand posture or grip that is different from the first and second types of hand posture or grip, etc.) different from the third type of hand posture or grip, while executing a fourth type of movement (e.g., coordinated movement of both hands such as moving the two hands apart from each other or toward each other), the computing system resizes the three-dimensional environment and, optionally, all the virtual objects inside the three-dimensional environment, in accordance with the movement of the hands (e.g., relative movement of both hands) in the physical environment. In some embodiments, the change in the size of the three-dimensional environment as a whole is proportional to or otherwise correlated to a change in distance between the two hands in the physical environment from the time when the hands first form the fourth type of hand posture or grip).

In some embodiments, the computer system determines whether to move a virtual object or the viewpoint based on whether a gaze input is detected on a moveable virtual object or on a portion of the three-dimensional environment that does not have a movable virtual object present (e.g., have a virtual object or surface present but the virtual object or surface is not moveable, or is empty). For example, if the user's gaze is on a virtual vase on the virtual table, the user's hand movement (e.g., while maintaining a preset hand grip) is recognized as a request to move the virtual object relative to the three-dimensional environment and the viewpoint; and if the user gaze is on a virtual wall, the user's hand movement (e.g., while maintaining the preset hand grip) is recognized as a request to move the viewpoint relative to the three-dimensional environment. In some embodiments, a virtual object is movable if the physical object simulated by the virtual object is physically moveable (e.g., rotatable, repositionable, etc.) by a user (e.g., moveable based on its moderate size and weight, based on whether it is a fixture or an object, etc.).

In some embodiments, in response to a two-handed flex gesture (e.g., two hands both in a respective grip while the hands are being moved toward or away from the user's torso in parallel to each other), the computer system changes the height of a selected virtual object in accordance with the movement of the user's hands. For example, as the two hands of the user lift up or lower together in front of the user (e.g., by bending the hands upward around their respective wrists while the arms are extended forward in front of the user, or by rotating the forearms upward or downward around the elbows in front of the user while the elbows are stationary in front of the user or close to the sides of the user, or by rotating the whole arms upward or downward in front of the user around the shoulder joints while the forearms are curled upward or extended out, etc.), the computing system adjusts a height of the virtual object in the three-dimensional environment in accordance with the flexing movement of the hands. In some embodiments, the height of the object keeps increasing with every flexing movement. In some embodiments, the height of the object increases when hands move upward and decrease when hands move downward.

FIGS. 7J-7O illustrate selecting a suitable viewpoint for viewing a target object or position in response to receiving a user's request for navigating to the target object or position in the three-dimensional environment, in accordance with some embodiments. For example, in response to detecting a hand movement that corresponds to a request to initiate locomotion to a selected virtual object in the three-dimensional environment, the computer does not simply move the viewpoint to the position of the selected virtual object or to a fixed distance from the selected virtual object, but instead move to an appropriate viewing position for the selected virtual object based on one or more preset characteristics of the selected virtual object. In other words, depending on the virtual object that is selected as the navigation target, the viewpoint may be moved to an object-specific distance and/or viewing angle from the selected virtual object. The resulting spatial relationship between a navigation target and the position of the viewpoint at the end of the locomotion toward a navigation target is different between when a first virtual object is selected as the navigation target and when a second virtual object is selected as the navigation target, if the preset characteristics are different for the first virtual object and the second virtual object, in accordance with some embodiments.

FIGS. 7J-7K, FIGS. 7L-7M, and FIGS. 7N-7O illustrate three different scenarios where different virtual objects are selected as the navigation target for locomotion performed in response to a user's request, in accordance with some embodiments. In the examples shown in FIGS. 7J-7K, FIGS. 7L-7M, and FIGS. 7N-7O, the same type of user inputs (e.g., a gaze input 7208 in conjunction with hand movement with a predefined hand posture or grip, etc.) are used to select the navigation target and initiate the locomotion toward the navigation target. In some embodiments, the user inputs includes a sequence of multiple user inputs (e.g., multiple repetitions of hand movement while maintaining a required hand posture or grip) that corresponds to a request to make the full extent of movement possible toward the selected navigation target. It is shown in each example that, the viewpoint at the end of the requested locomotion is closer to the respective position of the navigation target than before the locomotion is started, but is still spaced apart from the respective position of the navigation target, and the final position of the viewpoint is selected in accordance with one or more predefined characteristics of the virtual object that is selected as the navigation target (e.g., the characteristics include the size, dimension, and/or nature of the virtual object, etc.) in conjunction with the respective position of the virtual object. In some embodiments, a virtual position may be selected as a navigation target and, in accordance with a determination that there is no virtual object present at the virtual position that is selected as the navigation target, the computer system moves the viewpoint to the virtual position (e.g., without a displacement or offset from the virtual position). In some embodiments, it is not required that a single way of selecting the navigation target and making the locomotion request be used; and different ways of selecting the navigation target and making the locomotion request may be used to trigger locomotion toward the same object or toward different objects.

Figure 7J:
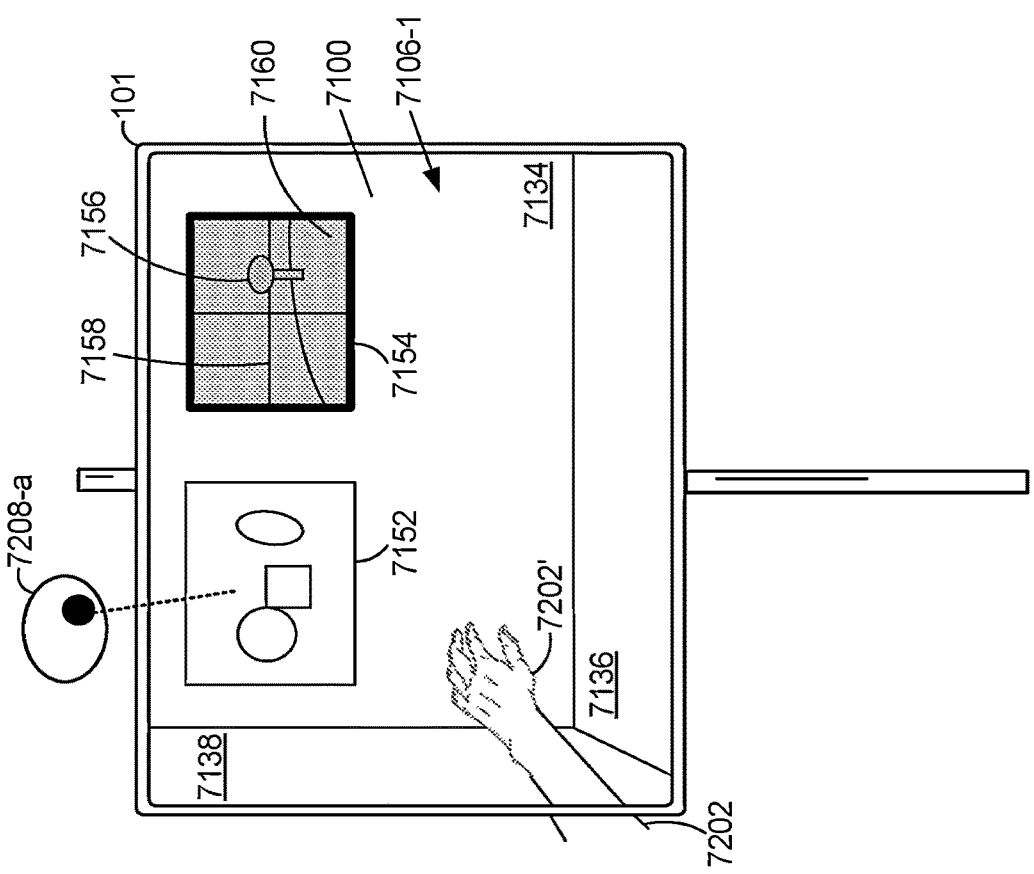
Figure 7M:
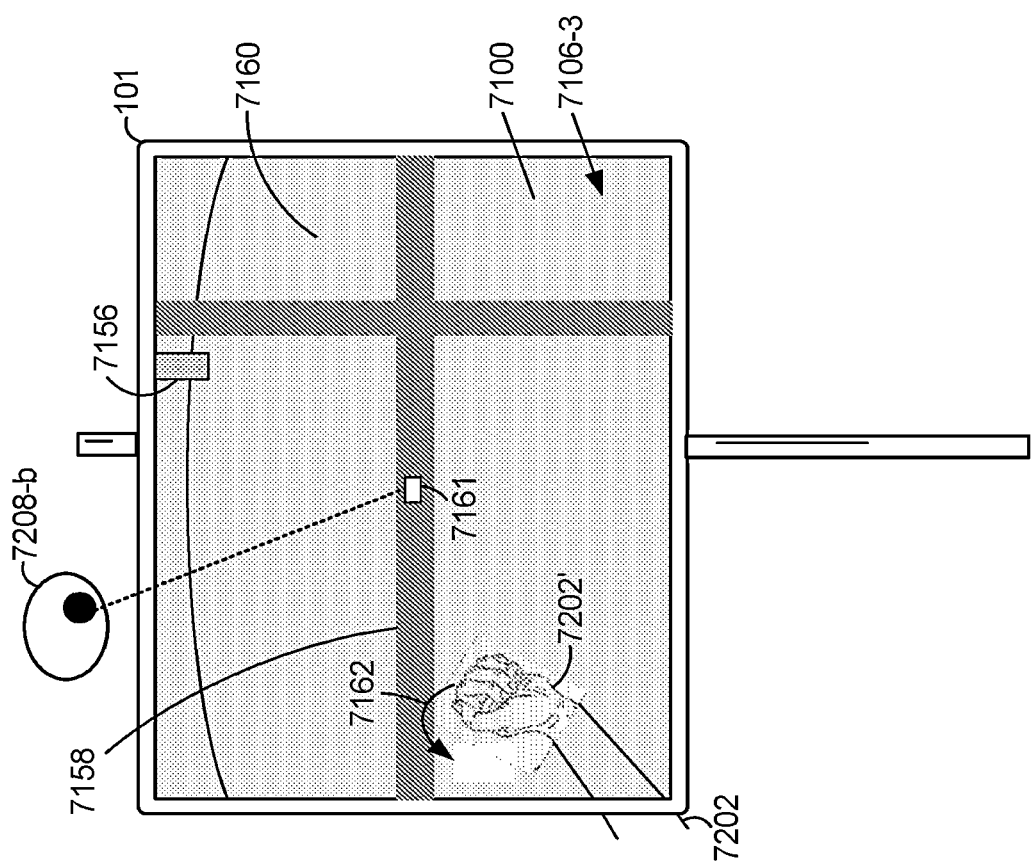
Figure 7L:
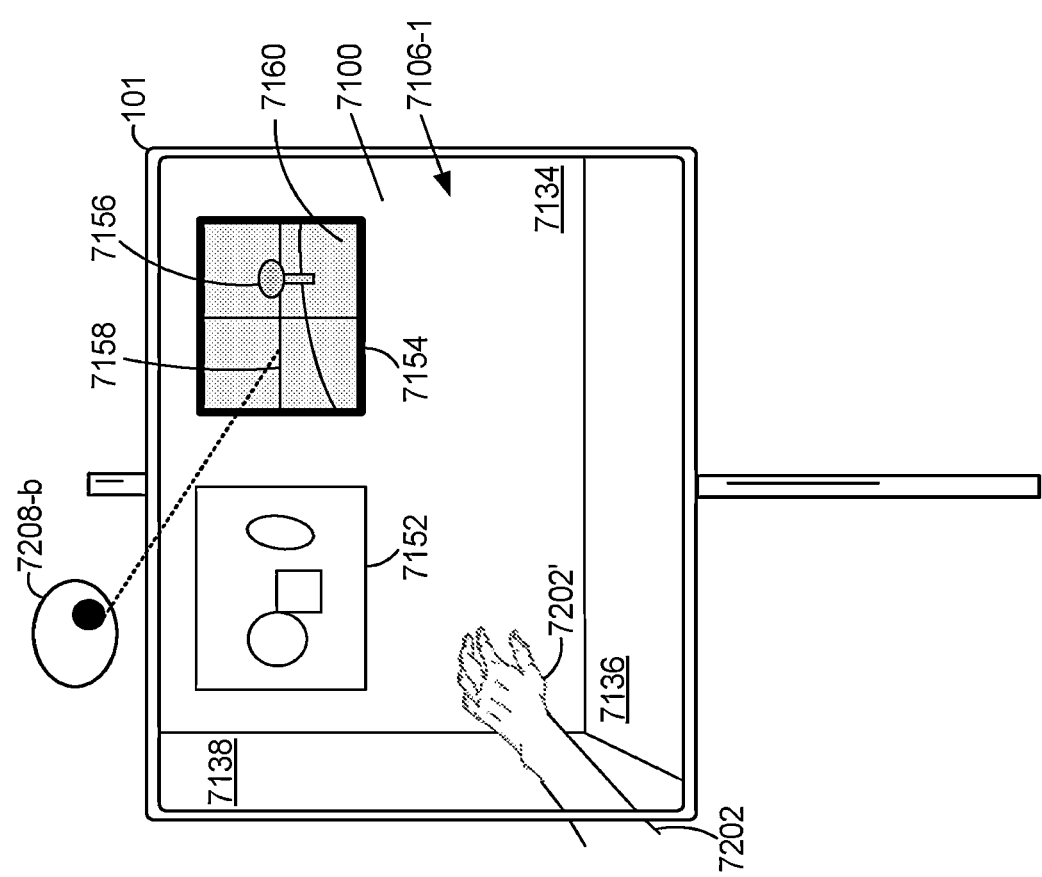
Figure 7O:
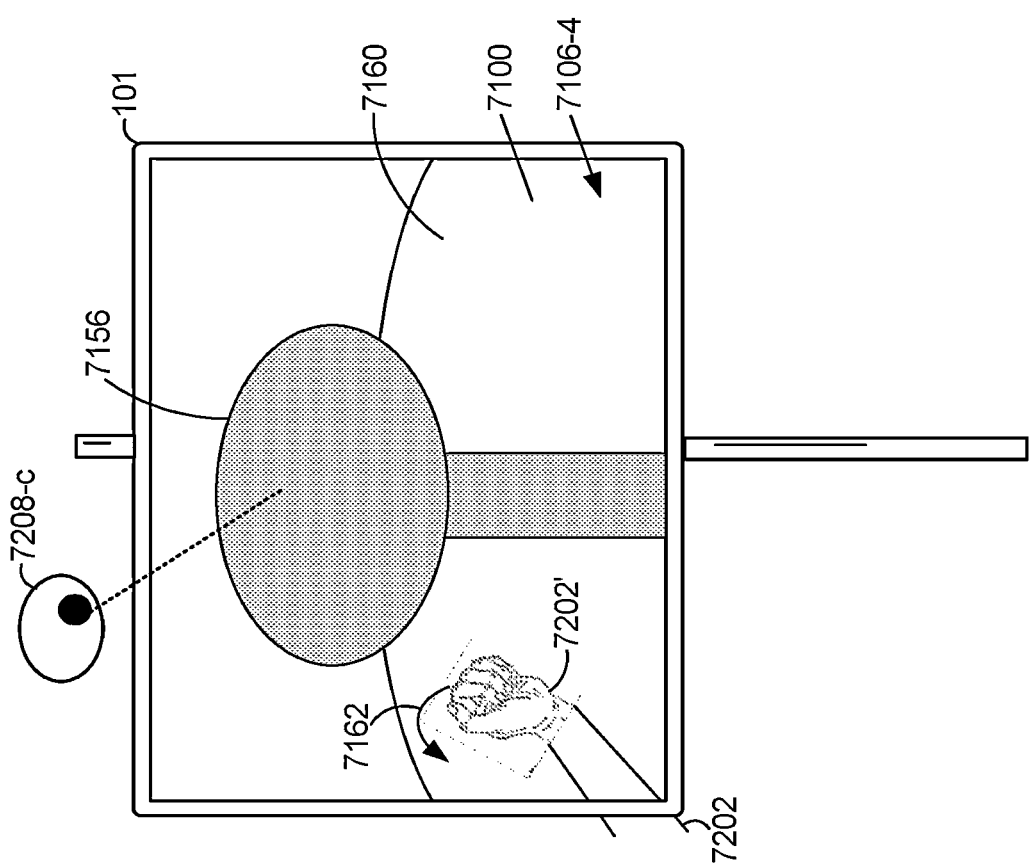
Figure 7N:
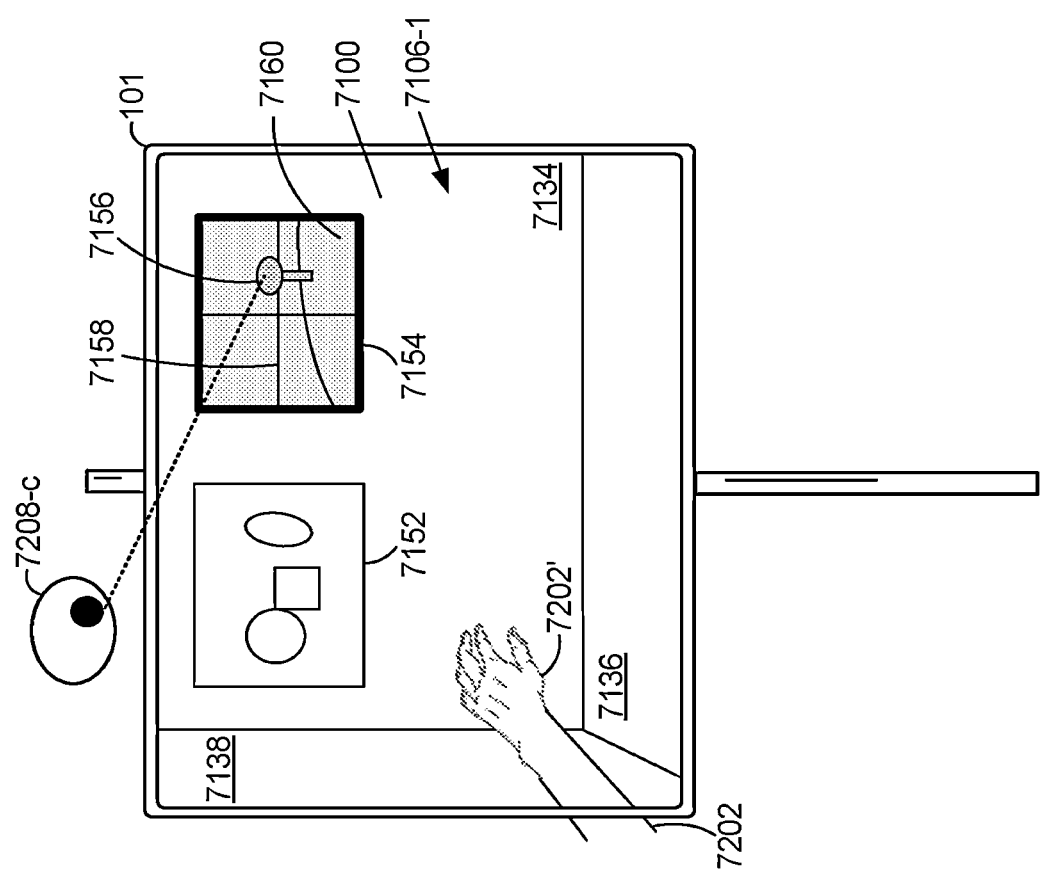

FIGS. 7J, 7L, and 7N illustrate a computer system (e.g., computer system 101 in FIG. 1) that includes at least a first display generation component (e.g., display 7100), where the computer system displays computer-generated content to a user via the first display generation component (e.g., display 7100), in accordance with some embodiments. In some embodiments, as shown in FIGS. 7J, 7L, and 7N, the first display generation component is a display (e.g., display 7100) that is placed in front of a user and that is not supported by or attached to the user's body. In some embodiments, the display generation component has a display side that faces toward the user's face and eyes and displays computer-generated content. In some embodiments, the display generation component has a transparent or semi-transparent portion (e.g., the entire area of the display side, a portion of the display side, etc.) through which the physical environment behind the display generation component is visible to the user facing the display side of the display generation component. In some embodiments, the display generation component displays a camera view of a portion of the physical environment that is obscured by presence of the display generation component, such that a user facing the display side of the display generation component can see the camera view of the portion of the physical environment, optionally, along with virtual content overlaid on, blocking the view of, and/or replacing display of, at least a portion of the camera view of the portion of the physical environment. In some embodiments, the display generation component projects the images of the virtual content into the user's eyes such that the user can visually perceive the virtual content. In some embodiments, the display generation component projects images of the virtual content onto physical surfaces and the virtual content is viewed through a semi-transparent portion or transparent portion of the display generation component along with the physical environment. In some embodiments, the display generation component is a head-mounted display that is attached to and/or supported by the user's head, face, ears, shoulders, and/or nose, and the display side of the head-mounted display faces the user's eyes and has a substantially fixed spatial relationship to the user's eyes. In some embodiments, the display generation component has a display side that is flat. In some embodiments, the display generation component has a display side that is curved and partially or completely surrounds a user's head or body. In some embodiments, the display generation component displays a completely virtual environment (e.g., a virtual game environment, a virtual office, etc.) without concurrently displaying a representation of a physical environment (e.g., a pass-through view (e.g., through a transparent portion of a display, or through a camera view) of the physical environment of the user, a recording of a camera view of a physical environment of the user, etc.). In some embodiments, the display generation component displays virtual content along with a representation of a physical environment, where the virtual content are displayed at various positions relative to the representation of the physical environment. In some embodiments, the various positions have corresponding locations in the physical environment. In some embodiments, spatial relationships in the physical environment are correlated to spatial relationships in the mixed reality and/or augmented reality environment displayed via the display generation component, such that virtual objects appear to be positioned and/or move relative to the physical environment in the mixed reality and/or augmented reality environment. Although the Figures show one type of display generation component as an example, it is emphasized that, in various embodiments, the techniques disclosed herein are also applicable to other types of display generation components, and may prove to be more advantageous for other types of display generation components (e.g., a head-mounted display, a display that blocks the user's view of the physical environment, etc.).

In some embodiments, the three-dimensional environment is a virtual environment without any representation of the physical environment surrounding the user. In some embodiments, the three-dimensional environment includes a virtual environment that has a spatial correspondence to a physical environment (e.g., include virtual walls at positions that correspond to physical locations of walls in the physical environment). In some embodiments, portions of the virtual environment are transparent to reveal portions of the physical environment at locations that correspond to the virtual positions of the portions of the virtual environment. For example, even though the virtual environment obscures most portions of the view of the physical environment, a virtual window may be included in the virtual environment that reveals the portion of physical environment at a location that corresponds to the virtual position of the virtual window in the virtual environment. In some embodiments, the resulting change in view from moving the viewpoint relative to a selected anchor position in the virtual environment is the same as the resulting view change from translating and/or reorienting the entire three-dimensional environment including all virtual objects contained therein relative to the virtual position of the viewpoint in the three-dimensional environment. In some embodiments, the virtual three-dimensional environment occupies an entire field of view of the user provided by the display generation component. In some embodiments, the virtual three-dimensional environment occupies a portion of the field of view of the user provided by the display generation component (e.g., a virtual portal or window that is displayed concurrently with a representation of a physical environment (e.g., overlaid on, replacing display of, blocking the view of a portion of the representation of the physical environment).

As show in FIGS. 7J, 7L, and 7N, a first display generation component (e.g., display 7100) displays a virtual three-dimensional environment (e.g., virtual three-dimensional environment 7106) that includes various virtual objects (e.g., a virtual picture frame 7152 on a virtual wall 7134, a virtual window 7154 on the same virtual wall 7134 next to the virtual picture frame 7152, a virtual floor 7136, a virtual wall 7138 that is perpendicular to and intersects with the virtual wall 7134 and the virtual floor 7136, a virtual hill 7160 outside of the virtual window 7154, a virtual tree 7156 outside of the virtual window 7154 and on the virtual hill 7160, virtual grilles 7158 of the virtual window 7154, etc.) and/or surfaces (e.g., surface of the virtual picture frame 7152 and surface of the virtual window 7154, virtual walls 7134 and 7138, virtual floor 7136, surface of the virtual grilles 7158, etc.) at different positions in the virtual three-dimensional environment. In some embodiments, a spatial relationship between a virtual object to another virtual object is defined by their relative positions and relative orientations in the virtual three-dimensional environment. For example, the virtual wall 7314 and virtual wall 7318 are vertical or upright in the three-dimensional environment, and the virtual floor 7136 is horizontal in the three-dimensional environment. The virtual picture frame 7152 and the virtual window 7154 are flat and in the same plane that is parallel to the virtual wall 7134. The virtual grilles 7158 are at the same depth from the virtual position of the viewpoint as the virtual window 7154, while the virtual tree 7156 and the virtual hill 7160 are much farther away from the virtual position of the viewpoint than the virtual window 7154. In this example, the virtual picture frame 7152 and the virtual window 7154 are at the same distance away from the virtual position of the viewpoint of the first view of the three-dimensional environment shown in FIGS. 7J, 7L, and 7N. A respective virtual object or surface has a corresponding position, spatial extent, shape, and/or orientation in the virtual three-dimensional environment that may be static or may change over time (e.g., in response to user input, and/or in accordance with preprogrammed instructions, etc.). In some embodiments, a viewpoint corresponding to a currently displayed view of a virtual three-dimensional environment refers to a virtual position, a vantage point, and/or a viewing perspective in the virtual three-dimensional environment from which the currently displayed view would be seen by a virtual viewer placed at the virtual position, vantage point and/or viewing perspective (e.g., with his/her eyes or head at the virtual position, standing at the virtual position, sitting at the virtual position, etc.). In some embodiments, the viewpoint corresponding to a currently displayed view of a virtual three-dimensional environment moves in the virtual three-dimensional environment in accordance with the movement of the head of a user (e.g., movement of the head relative to the torso, movement of the head as due to movement of the torso, etc.) who is in a position to view content displayed via the first display generation component. In some embodiments, the location of the user or a portion thereof in the physical environment has a corresponding position in the virtual three-dimensional environment (e.g., the virtual position that corresponds to the viewpoint of the currently displayed view of the virtual three-dimensional environment), and the movement of the user as a whole or a portion thereof (e.g., user's head and/or torso) in the physical environment, optionally, causes a corresponding movement of the viewpoint of the currently displayed view of the virtual three-dimensional environment. In some embodiments, the correspondence between the movement of the user's head or torso in the physical environment and the movement of the viewpoint allows the user to experience the spatial relationships in the virtual three-dimensional environment in a more physical and realistic way. In some embodiments, as disclosed herein, a user's physical inputs (e.g., hand gestures, finger gestures, movement of arms, movement of wrists, gaze inputs, various combinations of the above, etc.) other than physical movement of the user's head or torso in the physical environment are used to move the viewpoint relative to virtual objects in the virtual three-dimensional environment (e.g., moving the viewpoint closer to a virtual object, away from a virtual object, around a virtual object, etc.). In some embodiments, movement of a viewpoint is visually represented as replacing a first view corresponding to a first viewpoint at a first virtual position with a second view corresponding to a second viewpoint at a second virtual position. In some embodiments, the computer system displays a sequence of intermediate views that correspond to a sequence of intermediate viewpoints at virtual positions between the first virtual position and the second virtual position (e.g., virtual positions along a virtual movement path of the viewpoint of the currently displayed view, movement path of a virtual position of the user, etc.). In FIG. 7J-7K, FIGS. 7L-7M, and FIGS. 7N-7O, the viewpoint are moved toward different virtual objects in the three-dimensional environment that are selected by the user as the navigation target for a locomotion request, in accordance with some embodiments. In the three example scenarios shown in FIGS. 7J-7K, FIGS. 7L-7M, and FIGS. 7N-7O, the final position of the viewpoint is selected based on both the position of the virtual object that is selected as the navigation target, as well as the nature and characteristics of the virtual object that is selected as the navigation target, so that the virtual object that is selected as the navigation target can be viewed from a suitable distance in the final view of the three-dimensional environment at the end of the locomotion executed according to the user's request.

In some embodiments, as shown in FIGS. 7J-7O, the first display generation component is a display that is placed in front of a user that is not supported by or attached to the user's body. In some embodiments, the display is a head-mounted display that has a display side facing toward the user's face and eyes and does not move relative to the user's face or eyes when the user moves his/her head or body in the physical environment. In some embodiments, when a head-mounted display is used as the display generation component, the virtual position of the viewpoint of the currently displayed view of the physical environment corresponds to (e.g., having a preset spatial relationship to, having a constant spatial relationship to, overlaps with, is in proximity to, etc.) a virtual position of the user's eyes or head in the virtual three-dimensional environment. In the examples shown in FIGS. 7J-7O, the user as a whole is stationary relative to a physical environment, in accordance with some embodiments. In some embodiments, the user as a whole may be moving in the physical environment, but the viewpoint is not updated based on the movement of the user as a whole in the physical environment. In some embodiments, the user as a whole may be moving in the physical environment and the viewpoint is updated based on the movement of the user as a whole in the physical environment, but the update to the viewpoint is in additional to and independent of the movement of the viewpoint in response to the user's locomotion request made with respect to a respective virtual object.

In FIGS. 7J-7K, FIGS. 7L-7M, and FIGS. 7N-7O, the computer system detects a gaze input (e.g., gaze input 7208) being directed to a respective portion of the virtual three-dimensional environment. For example, in FIGS. 7J-7K, the gaze input 7208-*a* is directed to the virtual picture frame 7152 on the virtual wall 7134. In FIGS. 7L-7M, the gaze input 7208-*b* is directed to a point on the virtual grilles 7158 of the virtual window 7154. In FIGS. 7N-7O, the gaze input 7208-*c* is directed to the virtual tree 7156 beyond the virtual window 7154. In some embodiments, as the user's eyes move around while the user is facing the display side of the first display generation component, the computer system tracks the movement of the user's eyes and determines the user's line of sight and the position of the user's focal point in the three-dimensional environment. For example, in some embodiments, in accordance with a determination that the user's line of sight and focal point have localized within a threshold area at a first position in the three-dimensional environment for at least a threshold amount of time, a gaze input is detected, and a virtual object present at the first position is, optionally, recognized as a target of the gaze input. In some embodiments, the computer system displays a visual marker to show the current location of the gaze input. In some embodiments, the visual marker is displayed in accordance with a determination that a target of the gaze input has been recognized at the location of the gaze input. In some embodiments, the visual marker is displayed in accordance with a determination that the gaze input has met preset criteria (e.g., remained within a threshold area for at least a threshold amount of time (e.g., a threshold amount of time for detecting the gaze input (e.g., a gaze detection threshold), another threshold amount of time (e.g., a dwell time threshold) after the gaze input is detected), etc.). In some embodiments, the visual marker is displayed to merely indicate movement of the line of sight and/or focal point of the user, and does not necessarily mean that the user's attention is focused at the position of the visual marker. In some embodiments, if the visual marker is used to merely indicate the movement of the line of sight or focal point, other visual feedback is provided when a gaze input is detected and/or when a target object of the gaze input is detected (e.g., in accordance with the gaze input alone, or in accordance with the gaze input detected in conjunction with another user input, etc.). The selection of a target object is described in more detail with respect to the examples shown in FIGS. 7A-7D, in accordance with some embodiments.

In FIGS. 7J-7K, 7L-7M, and 7N-7O, a representation (e.g., representation 7202') of a user's hand (e.g., hand 7202) is shown in the views 7106 of the three-dimensional environment. In some embodiments, the representation of the user's hand is a camera view of the user's hand held in front of the user's body. For example, the user's hand is recognized and segmented from the camera view and superimposed or displayed at a position in the three-dimensional environment that corresponds to a virtual position of the user in the three-dimensional environment (e.g., a suitable virtual position of the hand is optionally determined based on the virtual position of the viewpoint of the currently displayed view). In some embodiments, the representation of the user's hand is a stylized graphical representation of the user's hand that, optionally, moves and/or changes to illustrate the movement and/or changing posture of the user's hand in the physical environment. In some embodiments, the representation of the user's hand is not displayed in the currently displayed view of the three-dimensional environment. For example, in some embodiments, the user's hand is outside of the user's field of view provided by the first display generation component. In some embodiments, the user's hand is in a position in front of the user that would have been in the user's field of view but for the presence of the first display generation component in front of the user (e.g., the view of the user's hand is blocked by the first display generation component and no representation of the user's hand is displayed via the first display generation component). In other words, in some embodiments, the user's hand performs a gesture or movement in the physical environment which is captured as a input that causes changes in the three-dimensional environment, even though the gesture and movement of the user's hand is not displayed via a representation of the user's hand in the view of the three-dimensional environment. In some embodiments, instead of a single hand, two hands of the user are used to provide the required user input for navigating within the virtual three-dimensional environment, and are, optionally, both visually represented in the view of the virtual three-dimensional environment.

In FIG. 7K following FIG. 7J, while the gaze input 7208-*a* is detected at a position on the virtual picture frame 7152 in the first view 7206-1 of the three-dimensional environment, the computer system detects movement of the user's hand 7202 in the physical environment (e.g., movement of the user's hand that corresponds to a change in grip of the hand). In accordance with a determination that the movement of the user's hand corresponds to movement of the finger(s) and/or wrist to form a first preset hand posture or grip (e.g., forming a fist, fully or partially closing the hand with multiple fingers curling toward and eventually resting on the palm of the hand, pinching multiple fingers together, etc.). In some embodiments, the first preset hand posture or grip corresponds to a grasp, a hold, a multi-finger pinch, etc. of the hand. In some embodiments, the first preset hand posture or grip requires the hand to have a first preset orientation relative to the user (e.g., with the palm side facing toward the user's face, facing upward, and/or facing sideways, etc.). In some embodiments, the movement of the user's hand includes movement of two hands toward each other and forming a first preset hand posture or grip (e.g., fingers of two hands are locked to each other, one hand is wrapped around another hand that is in a closed fist, two hands clasped together, etc.). In some embodiments, the computer system detects the movement of the user's hand(s) to form the first preset hand posture or grip in conjunction with (e.g., concurrently with, within a threshold time window of, etc.) detecting the gaze input 7208-*a* on a first portion of the virtual three-dimensional environment (e.g., the virtual picture frame 7152); and in response, the computer system selects the virtual picture frame 7152 as a navigation target for the subsequent locomotion request. In some embodiments, the computer system displays visual feedback (e.g., highlight, outline, visually distinguish, etc.) to indicate which position or virtual object is selected as the navigation target (e.g., highlighting the virtual picture frame with an outline, or spotlight, darken areas surrounding the virtual tree, etc.) within the three-dimensional environment. In some embodiments, the computer system selects a virtual position or virtual object as the navigation target for locomotion in response to detecting the gaze input moving to and/or dwelling on the position or virtual object while the user's hand(s) have formed and are maintaining the first preset hand posture or grip. In some embodiments, other method of selecting a navigation target is possible. For example, the user can use a pointer or control device to select the navigation target, or use a tap input or a click input in conjunction with a gaze input on a position or a virtual object to select the position or virtual object as a navigation target for a subsequent locomotion request.

As shown in FIG. 7K following FIG. 7J, while the user's hand(s) maintain the first predefined hand posture or grip (e.g., a grasping grip, a pinching grip, two-handed grasp, etc.), the computer system detects movement (e.g., movement 7162) of the user's hand(s) toward the user (e.g., translation of the user's hand(s) toward the user's body (e.g., due to movement of the user's arm(s) connected to the hand(s) around the elbow(s) or shoulder(s), rotational movement around the wrist(s) connected to the hand(s), or both, etc.). Optionally, the start of the movement of the user's hand in the first predefined hand posture or grip is detected while the gaze input 7208-a is maintained at the selected navigation target for locomotion. In FIG. 7K, in response to detecting the movement of the user's hand(s) while the user's hand(s) maintain the first predefined hand posture or grip, in accordance with a determination that the selected navigation target is the virtual picture frame 7152 and that the respective movement includes (or is) a first amount of movement (e.g., movement 7162 that represents a full range of movement capable of the hand(s) in this manner (e.g., rotating around the wrist, rotating around elbow, rotating around shoulder, etc.)), the computer system replaces the first view 7106-1 of the virtual three-dimensional environment corresponding to a first viewpoint (e.g., the viewpoint corresponding to a first virtual position in the virtual three-dimensional environment) with a second view 7106-2 of the virtual three-dimensional environment corresponding to a second viewpoint (e.g., the viewpoint corresponding to a second virtual position in the three-dimensional environment that is different from the first virtual position). As shown in FIG. 7K, the second viewpoint is selected in accordance with the position of the virtual object that is selected as the navigation target, namely the virtual picture frame 7152, as well as the preset characteristics of the virtual picture frame 7152 (e.g., its size, amount of available visual details, nature of content, etc.). For example, the viewpoint is optionally moved along a straight path between the original virtual position of the viewpoint at the start of the locomotion request toward the virtual object that is selected as the navigation target, but stops at a first distance away from the virtual object that is selected as the navigation target, where the first distance is selected based on the characteristics of the virtual object as a suitable viewing distance for viewing the virtual object (e.g., viewing it as a whole, and/or with maximum amount of details and clarity, etc.). As a result of the movement of the viewpoint for the currently displayed view of the three-dimensional environment (e.g., from the first virtual position to the second virtual position), the virtual picture frame 7152 appears much closer to the user, it is as if the user has moved closer to the virtual wall 7134 toward the virtual picture frame 7152. In some embodiments, similar movement of the hand(s) can be repeated while the gaze input remains on the virtual picture frame 7152, but the viewpoint will not move any closer to the virtual picture frame 7152, because the closest viewing position suitable for viewing the virtual picture frame 7152 has been reached. In some embodiments, the movement of the viewpoint in the virtual three-dimensional environment simulates or mimics the movement of a virtual position of the user resulted from the user's hand grasping and pulling on an invisible rubber band or taut rope around a virtual pulley anchored at the selected navigation target in the virtual three-dimensional environment. In some embodiments, other types of inputs are used to select the navigation target and trigger locomotion toward the virtual object or position that is selected as the navigation target, such as those described with respect to FIGS. 7A-7I and FIGS. 8-9.

In contrast to FIGS. 7J-7K, FIG. 7M following FIG. 7L illustrate navigation toward a different navigation target, in accordance with some embodiments. As shown in FIGS. 7L-7M, while the gaze input 7208-b is detected at a position on the virtual grilles 7158 in the first view 7206-1 of the three-dimensional environment, the computer system detects movement of the user's hand 7202 in the physical environment (e.g., movement of the user's hand that corresponds to a change in grip of the hand). In accordance with a determination that the movement of the user's hand corresponds to movement of the finger(s) and/or wrist to form the first preset hand posture or grip (e.g., forming a fist, fully or partially closing the hand with multiple fingers curling toward and eventually resting on the palm of the hand, pinching multiple fingers together, etc.). In some embodiments, the first preset hand posture or grip corresponds to a grasp, a hold, a multi-finger pinch, etc. of the hand. In some embodiments, the first preset hand posture or grip requires the hand to have a first preset orientation relative to the user (e.g., with the palm side facing toward the user's face, facing upward, and/or facing sideways, etc.). In some embodiments, the movement of the user's hand includes movement of two hands toward each other and forming a first preset hand posture or grip (e.g., fingers of two hands are locked to each other, one hand is wrapped around another hand that is in a closed fist, two hands clasped together, etc.). In some embodiments, the computer system detects the movement of the user's hand(s) to form the first preset hand posture or grip in conjunction with (e.g., concurrently with, within a threshold time window of, etc.) detecting the gaze input 7208-b on a second portion of the virtual three-dimensional environment (e.g., the virtual grilles 7158 of the virtual window 7154); and in response, the computer system selects the virtual grilles 7158 as the navigation target for the subsequent locomotion request. In some embodiments, the computer system displays visual feedback (e.g., highlight, outline, visually distinguish, etc.) to indicate which virtual position or object has been selected as the navigation target (e.g., highlighting the virtual grilles with an outline, or spotlight, darken areas surrounding the virtual tree, etc.) within the three-dimensional environment. In some embodiments, the computer system selects a virtual position or object as the navigation target for locomotion in response to detecting the gaze input moving to and/or dwelling on the virtual position or object while the user's hand(s) have formed and are maintaining the first preset hand posture or grip. In some embodiments, other methods of selecting a navigation target is possible. For example, the user can use a pointer or control device to select the navigation target, or use a tap input or a click input in conjunction with a gaze input on a virtual position or object to select the virtual position or object as the navigation target for a subsequent locomotion request.

As shown in FIG. 7M following FIG. 7L, while the user's hand(s) maintain the first predefined hand posture or grip (e.g., a grasping grip, a pinching grip, two-handed grasp, etc.), the computer system detects movement (e.g., movement 7162) of the user's hand(s) toward the user (e.g., translation of the user's hand(s) toward the user's body (e.g., due to movement of the user's arm(s) connected to the hand(s) around the elbow(s) or shoulder(s), rotational movement around the wrist(s) connected to the hand(s), or both, etc.). Optionally, the start of the movement of the user's hand(s) in the first predefined hand posture or grip is detected while the gaze input 7208-*b* is maintained at the selected navigation target for locomotion. In FIG. 7M, in response to detecting the movement of the user's hand(s) while the user's hand(s) maintain the first predefined hand posture or grip, in accordance with a determination that the selected navigation target is the virtual grilles 7158 and that the respective movement includes (or is) a first amount of movement (e.g., movement 7162 that represents a full range of movement capable of the hand(s) in this manner (e.g., rotating around the wrist(s), rotating around elbow(s), rotating around shoulder(s), etc.)), the computer system replaces the first view 7106-1 of the virtual three-dimensional environment corresponding to the first viewpoint (e.g., the viewpoint corresponding to a first virtual position in the virtual three-dimensional environment) with a third view 7106-3 of the virtual three-dimensional environment corresponding to a third viewpoint (e.g., the viewpoint corresponding to a third virtual position in the three-dimensional environment that is different from the first virtual position and the second virtual position). As shown in FIG. 7M, the third viewpoint is selected in accordance with the position of the virtual object that is selected as the navigation target, namely the virtual grilles 7158, as well as the characteristics of the virtual grilles 7158 (e.g., its size, amount of available visual details, nature of content, etc.). For example, the viewpoint is optionally moved along a straight path between the original virtual position of the viewpoint at the start of the locomotion request toward the virtual object that is selected as the navigation target, but stops at a second distance away from the virtual object that is selected as the navigation target, where the second distance is selected based on the characteristics of the virtual object as a suitable viewing distance for viewing the virtual object (e.g., viewing it as a whole, and/or with maximum amount of details and clarity, etc.). As a result of the movement of the viewpoint for the currently displayed view of the three-dimensional environment (e.g., from the first virtual position to the third virtual position), the virtual grilles 7158 appears much closer to the user; it is as if the user has moved closer to the virtual wall 7134 toward the virtual grilles 7158. In some embodiments, similar movement of the hand(s) can be repeated while the gaze input remains on the virtual grilles 7158, but the viewpoint will not move any closer to the virtual grilles 7158, because the closest viewing position suitable for viewing the virtual grilles 7158 has been reached. In some embodiments, the movement of the viewpoint in the virtual three-dimensional environment simulates or mimics the movement of a virtual position of the user resulted from the user's hand grasping and pulling on an invisible rubber band or taut rope around a virtual pulley anchored at the selected navigation target in the virtual three-dimensional environment. In some embodiments, other types of inputs are used to select the navigation target and trigger locomotion toward the virtual object or position that is selected as the navigation target, such as those described with respect to FIGS. 7A-7I and FIGS. 8-9.

In FIG. 7K and FIG. 7M, the distances that are selected as a suitable distance for viewing the selected navigation targets are different. In FIG. 7K, the navigation target is a virtual picture frame 7154, and the suitable viewing distance is about an arm's length given the size of the virtual picture frame 7154. With the second viewpoint at the first distance, e.g., an arm's length, away from the virtual picture frame 7154, the whole picture of the virtual picture frame 7154 is in the center of the field of view provided by the first display generation component, and the picture inside the virtual picture frame 7154 is presented with full resolution and complete detail. Other objects that may be distracting to the user are outside of the field of view provided by the first display generation component. In FIG. 7M, the navigation target is the virtual grilles 7158 that has an interesting detail 7161 which is not fully visible or presented with sufficient detail in the first view 7106-1 corresponding to the first viewpoint (shown in FIG. 7L). In response to the locomotion request to navigate to the virtual grilles 7158, the viewpoint is moved to a suitable viewing distance that is about fifteen inches given the size of the detail 7161 on the virtual grilles 7158. With the third viewpoint at the second distance, e.g., fifteen inches, away from the virtual grilles 7158, the special visual feature 7161 on the virtual grilles 7158 is in the center of the field of view provided by the first display generation component, and the visual feature 7161 as well as the virtual grilles 7158 is presented with full resolution and complete detail at the focal point of the user. The virtual grilles 7158 are not fully included within the field of view provided by the first display generation component at the end of the locomotion because the outer portions of the virtual grilles do not have additional visual features that are not already represented by the portions of the virtual grilles within the field of view. In some embodiments, other portions of the field of view includes the virtual hill 7160 and the bottom of the virtual tree 7156 which are, optionally, out of focus due to their distances from the virtual position of the third viewpoint.

In FIG. 7O following FIG. 7N, an interaction analogous to those shown in FIGS. 7J-7K and FIGS. 7L-7M is illustrated, in accordance with some embodiments. In this example, the gaze input 7208-*c* is detected on the virtual tree 7156 outside of the virtual window 7154 when the user's hand forms the first predefined hand posture or grip. The virtual tree 7156 is selected as the navigation target by the user's input. In response to the locomotion request (e.g., the hand movement 7162 while in the first predefined hand posture or grip, or other types of user input that corresponds to a request for locomotion, etc.) to navigate to the virtual tree 7156, the viewpoint is moved to a suitable viewing distance (e.g., a third distance) that is about ten feet above the virtual hill 7160 (e.g., where the root of the virtual tree is standing) and ten feet away from the surface of the virtual tree top, given the size and height of the virtual tree 7156. With a fourth viewpoint (e.g., the viewpoint at the end of the locomotion) at the third distance (e.g., ten feet, some other suitable distances, etc.) away from the root and top of the virtual tree 7156, the tree top of the virtual tree 7156 is in the center of the field of view provided by the first display generation component, and the tree top as well as a portion of the tree trunk are presented with full resolution and complete detail. The bottom of the virtual tree truck is not fully included within the field of view provided by the first display generation component because the focus is the top of the tree, and, to present the full details of the top of the tree, the distance cannot be more than ten feet away from the tree top, for example. In some embodiments, other portions of the field of view include the virtual hill 7160 which are, optionally, out of focus due to their distances from the virtual position of the fourth viewpoint. In some embodiments, other virtual objects that are between the viewpoint and the virtual position of the navigation target is optionally removed from the field of view. In some embodiments, other constraints present in the virtual three-dimensional environment are optionally used to determine the suitable viewing distance for a navigation target. For example, in some embodiments, in the example shown in FIGS. 7N-7O, the fourth viewpoint may be right on the transparent portion of the virtual window 7154, to simulate that the viewer is looking at the virtual tree right at the virtual window 7154, because the viewer cannot move beyond the virtual window in the three-dimensional environment.

In some embodiments, the inputs specifying a navigation target located at a respective position in the three-dimensional environment and triggering a navigation operation toward the navigation target are different from those illustrated in FIGS. 7J-7O. For example, in some embodiments, the navigation target is selected by clicking a controller in the physical environment when the controller is pointing towards a respective location in the physical environment that corresponds to the respective position of the intended navigation target. In some embodiments, the navigation target is selected using a pointer that can be moved by a touch input on a touch-sensitive surface. In some embodiments, a general region can be selected based on a gaze input (e.g., it is difficult to hold a gaze at a precise position for a period of time) and subsequent touch-input or gesture input can be used to fine tune to the position of a selector near or within the general region to select the navigation target within the general region.

In some embodiments, the selection of the suitable position for the viewpoint at the end of the locomotion, in particular, the selection of the suitable viewing distance that separates the position of the navigation target and the virtual position of the viewpoint at the end of the locomotion toward the navigation target is based on the size of the navigation target. For example, a larger size of the navigation target requires a correspondingly larger viewing distance, in some cases. In some embodiments, the selected viewing distance places the viewpoint outside of and separated from (e.g., not on the surface of, separated by a finite distance that is selected in accordance with the characteristics of the virtual object that is selected as the navigation target, etc.) a smallest bounding box of the navigation target. In some embodiments, if the navigation target is not a virtual object but just a position in empty space, the viewing distance would be zero and the viewpoint is directly moved to the selected target position.

In some embodiments, the selection of the position of the viewpoint at the end of the locomotion, in particular, the selection of the suitable viewing distance that separates the position of the navigation target and the virtual position of the viewpoint at the end of the locomotion toward the navigation target is based on the nature of the navigation target (e.g., whether it's intended to be explored within or in close proximity, or be viewed and appreciated as a whole, etc.). For example, when the selected navigation target is a virtual museum that is viewed from faraway, at the end of the locomotion, the viewpoint is in front of a gate of the virtual museum and only a partial view of the museum building is within the field of view of the user. When the selected navigation target is a virtual light house that is viewed from faraway, at the end of the locomotion, the viewpoint is at a distance that provides a full view of the virtual light house. In some embodiments, the virtual position of the viewpoint at the end of the locomotion is selected based on the object type of the navigation target. For example, the viewpoint selected for a building or landmark is high above the virtual ground (e.g., ten feet above ground or higher) and relatively far away from the building or landmark such that it can viewed as a whole given the limited angular span of the field of view of the user. In contrast, the viewpoint selected for a street sign, a flag pole, an entrance to a park, etc. is lower to the virtual ground (e.g., about eye level for an average user) and close to the selected navigation target (e.g., a few feet away from the street sign, flag pole, or entrance to the par, etc.). This is a different and independent consideration from the size (e.g., width and height) of the navigation target.

In some embodiments, the computer system displays an animated transition including a sequence of intermediate views of the three-dimensional environment corresponding to a sequence of viewpoints between the starting viewpoint (e.g., the viewpoint of the currently displayed view when at the starting position) and the final viewpoint (e.g., the viewpoint of the currently displayed view at the final position) after the locomotion, where peripheral portions of the intermediate views are visually deemphasized (e.g., blurred and/or darkened, etc.) relative to central portions of the intermediate views to simulate a vignette effect during the movement of the viewpoint.

In some embodiments, the simulated vignette effect changes based on speed of the movement of the viewpoint. In some embodiments, the speed of the movement of the viewpoint is dependent on various factors, such as the distance between the starting position of the viewpoint before the locomotion and the final positions of the viewpoint at the end of the locomotion, the movement speed and/or magnitude of the user's input that triggered and/or sustained the locomotion, etc. In some embodiments, an amount of changes (e.g., degree of blurring, size of blurred area, blur radius, amount of desaturation, degree of darkening, size of darkened area, etc.) applied to a first set of display properties of the peripheral portions of the respective intermediate views are adjusted in accordance with a rate of transition represented by the sequence of intermediate views (e.g., a movement speed of the viewpoint of the currently displayed view as shown in the animation, etc.). For example, for a faster movement of the viewpoint during the locomotion, a larger peripheral portion of the intermediate views is blurred and/or darkened relative to the central portion of the intermediate views; and, for a slower movement of the viewpoint during the locomotion, a smaller peripheral portion of the intermediate views is blurred and/or darkened relative to the central portion of the intermediate views. In some embodiments, the movement speed of the viewpoint is measured by the number of frames per second that are displayed between the frame showing the viewpoint at a first position and the frame showing the viewpoint at a second position that is closer to the navigation target and that is a unit distance away from the first position.

In some embodiments, the amount of vignette gradually increases during the locomotion. For example, in some embodiments, the size of the peripheral portions of the intermediate views that are visually deemphasized relative to the central portions of the intermediate views gradually increases during at least a sub-sequence of the sequence of intermediate views (e.g., in the beginning sub-sequence of the sequence of intermediate views).

In some embodiments, input gestures used in the various examples and embodiments described herein optionally include discrete, small motion gestures performed by movement of the user's finger(s) relative to other finger(s) or part(s) of the user's hand, optionally, without requiring major movement of the user's whole hand or arm away from their natural location(s) and posture(s)) to perform operations immediately prior to or during the gesture) for interacting with a virtual or mixed-reality environment, in accordance with some embodiments.

In some embodiments, the input gestures are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, depth cameras, etc.). For example, the one or more imaging sensors are components of or provide data to a computer system (e.g., computer system 101 in FIG. 1 (e.g., a portable electronic device 7100 or an HMD)) that includes a display generation component (e.g., display generation component 120 in FIGS. 1, 3, and 4 (e.g., a touch-screen display that serves as a display and a touch-sensitive surface, a stereoscopic display, a display with a pass-through portion, etc.). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye. For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7200), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether to execute large motions or remaining relatively stationary when providing the input gestures with his/her hand, without experiencing constraints imposed by a specific input device or input region.

In some embodiments, a micro tap input is a tap input of a thumb over index finger (e.g., over a side of the index finger adjacent to the thumb) of a user's hand. In some embodiments, a tap input is detected without requiring lift-off of the thumb from the side of the index finger. In some embodiments, a tap input is detected in accordance with a determination that downward movement of the thumb are followed by upward movement of the thumb, with the thumb making contact with the side of the index finger for less than a threshold amount of time. In some embodiments, a tap-hold input is detected in accordance with a determination that the thumb moves from the raised position to the touch-down position and remains in the touch-down position for at least a first threshold amount of time (e.g., the tap time threshold or another time threshold that is longer than the tap time threshold). In some embodiments, the computer system requires that the hand as a whole remains substantially stationary in location for at least the first threshold amount of time in order to detect the tap-hold input by the thumb on the index finger. In some embodiments, the touch-hold input is detected without requiring that the hand as a whole is kept substantially stationary (e.g., the hand as a whole may move while the thumb rests on the side of the index finger). In some embodiments, a tap-hold-drag input is detected when the thumb touches down on the side of the index finger and the hand as a whole moves while the thumb rests on the side of the index finger.

In some embodiments, a micro flick gesture is a push or flick input by a movement of a thumb across index finger (e.g., from the palm side to the back side of the index finger). In some embodiments, the extension movement of the thumb is accompanied by upward movement away from the side of the index finger, e.g., as in an upward flick input by the thumb. In some embodiments, the index finger moves in the opposite direction from that of the thumb during the forward and upward movement of the thumb. In some embodiments, a reverse flick input is performed by the thumb moving from an extended position to a retracted position. In some embodiments, the index finger moves in the opposite direction from that of the thumb during the backward and downward movement of the thumb.

In some embodiments, a micro swipe gesture is a swipe input by a movement of a thumb along index finger (e.g., along a side of the index finger adjacent to the thumb or on the side of the palm). In some embodiments, the index finger is optionally in an extended state (e.g., substantially straight) or a curled up state. In some embodiments, the index finger moves between the extended state and the curled up state during the movement of the thumb in a swipe input gesture.

In some embodiments, different phalanges of various fingers correspond to different inputs. A micro tap input of thumb over various phalanges of various fingers (e.g., index finger, middle finger, ring finger, and, optionally, pinky finger) are optionally mapped to different operations. Similarly, in some embodiments, different push or click inputs can be performed by the thumb across different fingers and/or different parts of a finger to trigger different operations in a respective user interface contact. Similarly, in some embodiments, different swipe inputs performed by the thumb along different fingers and/or in different directions (e.g., toward the distal or proximal end of a finger) trigger different operations in a respective user interface context.

In some embodiments, the computer system treats tap inputs, flick inputs, and swipe inputs are treated as different types of inputs based on movement types of the thumb. In some embodiments, the computer-system treats inputs having different finger locations that are tapped, touched, or swiped by the thumb as different sub-input-types (e.g., proximal, middle, distal subtypes, or index, middle, ring, or pinky subtypes) of a given input type (e.g., a tap input type, a flick input type, a swipe input type, etc.). In some embodiments, the amount of movement performed by the moving finger (e.g., thumb) and or other movement metrics associated with the movement of the finger (e.g., speed, initial speed, ending speed, duration, direction, movement pattern, etc.) is used to quantitatively affect the operation that is triggered by the finger input.

In some embodiments, the computer-system recognizes combination input types that combines a sequence of movements by the thumb, such as a tap-swipe input (e.g., touch-down of thumb on a finger followed by swiping along the side of the finger), a tap-flick input (e.g., touch-down of thumb over a finger followed by a flick across the finger from palm side to back side of the finger), a double tap input (e.g., two consecutive taps on the side of a finger at about the same location), etc.

In some embodiments, the gesture inputs are performed by an index finger instead of the thumb (e.g., index finger performs the tap or swipe on the thumb, or the thumb and the index finger move toward each other to perform a pinch gesture, etc.). In some embodiments, a wrist movement (e.g., a flick of the wrist in a horizontal direction, or a vertical direction) is performed immediately preceding, immediately succeeding (e.g., within a threshold amount of time) or contemporaneously with the finger movement inputs to trigger additional operations, different operations, or modified operations in the current user interface context, as compared to the finger movement inputs without the modifier input by the wrist movement. In some embodiments, the finger input gestures performed with the user's palm facing the user's face are treated as a different type of gestures from finger input gestures performed with the user's palm facing away from the user's face. For example, a tap gesture performed with the user's palm facing the user performs an operation with added (or reduced) privacy safeguard as compared to an operation (e.g., the same operation) performed in response to a tap gesture performed with the user's palm facing away from the user's face.

Although one type of finger input may be used to trigger a type of operation in the examples provided in this disclosure, other types of finger input are optionally used for trigger the same type of operation in other embodiments.

Additional descriptions regarding FIGS. 7A-7O are provided below in references to methods 8000, 9000, and 10000 described with respect to FIGS. 8-10 below.

FIG. 8 is a flowchart of a method 8000 for selecting a navigation target and navigating to the navigation target in accordance with a physical gesture, in accordance with some embodiments.

In some embodiments, method 8000 is performed at a computer system (e.g., computer system 101 in FIG. 1) including a first display generation component (e.g., display 7100 in FIGS. 7A-7O, an inner display of an HMD, etc.) and one or more input devices (e.g., cameras, controllers, touch-sensitive surfaces, joysticks, buttons, gloves, watches, motion sensors, orientation sensors, etc.). In some embodiments, the first display generation component is a heads-up display, a head-mounted display (HMD), a display, a touch-screen, a projector, etc. In some embodiments, the first display generation component is a display component facing the user and provides a CGR experience to the user. In some embodiments, the first display generation component is an inner display of a two-sided display device (e.g., a two-sided HMD) that displays a first user interface on a first side corresponding to the first display generation component, and a second user interface on the second side corresponding to a second display generation component. In some embodiments, the computer system is an integrated device with one or more processors and memory enclosed in the same housing as the first display generation component and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from the display generation component(s) and/or the one or more input devices. In some embodiments, the display generation component(s) and the one or more input devices are integrated and enclosed in the same housing. In some embodiments, the method 8000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 8000 are, optionally, combined and/or the order of some operations is, optionally, changed.

In some embodiments, method 8000 is performed at a computing system including a display generation component (e.g., a heads-up display, an HMD, a display, a touch-screen, a projector, etc.) and one or more input devices (e.g., cameras, controllers, touch-sensitive surfaces, joysticks, buttons, etc.). The computing system displays (8002), by the display generation component, a first view of at least a portion of a three-dimensional environment (e.g., a virtual environment) corresponding to a first viewpoint (e.g., the first view 7205 shown in FIG. 7A). While displaying the first view of the at least the portion of the three-dimensional environment, the computing system detects (8004) a change in grip of a user's hand (e.g., hand 7202 in FIG. 7A) (e.g., detecting movement of the user's thumb, fingers, wrist, hand, etc., by the one or more input devices) in conjunction with (e.g., at the same time of, or within a threshold amount of time of (e.g., before, or after), etc.) detecting a gaze input (e.g., gaze input 7206 in FIG. 7A) directed to a respective position (e.g., the virtual treetop 7120 in FIG. 7A) in the portion of the three-dimensional environment (e.g., the gaze input is detected by tracking a user's eye movement using the one or more input devices and calculating a target location of the eye gaze when the eyes are focused on a location in the virtual three-dimensional environment with less than a threshold amount of movement during a threshold amount of time (e.g., the eye gaze meets preset stability threshold)), wherein the change in grip of the user's hand results in a first predefined hand grip (e.g., a full grip posture, a grasp posture, a pinch posture, etc.) (e.g., while the gaze input is directed to the respective position, or within a threshold amount of time of (e.g., before, or after), etc.). While the user's hand maintains the first predefined hand grip (e.g., the hand grip shown in FIG. 7B) (e.g., the first predefined hand grip is formed when all of the fingers of the user's hand are curled up to form a full grip with the thumb closed over the other fingers, and the user's hand remains in the full grip posture after the fingers are curled up), the computing system detects (8006) a respective movement (e.g., movement 7130 of hand 7202 in FIG. 7C) (e.g., lateral movement toward the user's body (e.g., due to movement of the user's arm connected to the hand), or rotational movement around the wrist connected to the hand) of the user's hand (e.g., movement of the whole hand in the full grip posture, optionally, while the gaze input is maintained at the respective position). In response to detecting (8008) the respective movement of the user's hand while the user's hand maintains the first predefined hand grip (e.g., as shown in FIG. 7C): in accordance with a determination that the respective position is a first position (e.g., the virtual treetop 7120 in FIG. 7B) and that the respective movement includes (or is) a first amount of movement (e.g., movement 7130 in FIG. 7C is a fraction of the full extent of movement 7132 in FIG. 7D), the computing system replaces (8010) the first view (e.g., view 7205 in FIG. 7B) of the at least the portion of the three-dimensional environment corresponding to the first viewpoint with a second view (e.g., view 7207 in FIG. 7C) of at least the portion of the three-dimensional environment corresponding to a second viewpoint that is different from the first viewpoint, wherein the second viewpoint is selected in accordance with the respective movement of the user's hand (e.g., the movement 7130) and the first position in the three-dimensional environment (e.g., the user is moved closer to the first position where the eye gaze is directed to in the three-dimensional environment, in response to the movement of the hand while the hand maintains the first predefined hand grip); and in accordance with a determination that the respective position is a second position (e.g., the virtual hilltop 7108) that is different from the first position and that the respective movement includes (or is) the first amount of movement (e.g., movement 7130), the computing system replaces (8012) the first view of the at least the portion of the three-dimensional environment corresponding to the first viewpoint with a third view of at least the portion of the three-dimensional environment corresponding to a third viewpoint, wherein the third viewpoint is selected in accordance with the respective movement of the user's hand and the second position in the three-dimensional environment, and the third viewpoint is different from the first viewpoint and the second viewpoint (e.g., the user is moved closer to the second position where the eye gaze is directed to in the three-dimensional environment, in response to the respective movement of the hand while the hand maintains the first predefined hand grip).

In some embodiments, in response to detecting the respective movement of the user's hand while the user's hand maintains the first predefined hand grip: in accordance with a determination that the respective position is the first position and that the respective movement includes (or is) a second amount of movement (e.g., movement 7132 in FIG. 7D) that is different from the first amount of movement, the computing system replaces the first view (e.g., view 7205 shown in FIG. 7A) of the at least the portion of the three-dimensional environment corresponding to the first viewpoint with a fourth view (e.g., view 7210 in FIG. 7D) of at least the portion of the three-dimensional environment corresponding to a fourth viewpoint, wherein the fourth viewpoint is selected in accordance with the respective movement of the user's hand and the first position in the three-dimensional environment and the fourth viewpoint is different from the first viewpoint and the second viewpoint (e.g., if the second amount of movement is less than the first amount of movement, the fourth viewpoint is between the first viewpoint and the second viewpoint; if the second amount of movement is greater than the first amount of movement, the second viewpoint is between the first viewpoint and the fourth viewpoint); and in accordance with a determination that the respective position is the second position and that the respective movement includes (or is) the second amount of movement, the computing system replaces the first view of the at least the portion of the three-dimensional environment corresponding to the first viewpoint with a fifth view of at least the portion of the three-dimensional environment corresponding to a fifth viewpoint, wherein the fifth viewpoint is selected in accordance with the respective movement of the user's hand and the second position in the three-dimensional environment, and the fifth viewpoint is different from the first viewpoint, the third viewpoint, and the fourth viewpoint (e.g., if the second amount of movement is less than the first amount of movement, the fifth viewpoint is between the first viewpoint and the third viewpoint; if the second amount of movement is greater than the first amount of movement, the third viewpoint is between the first viewpoint and the fifth viewpoint). Replacing the first view of the at least the portion of the three-dimensional environment corresponding to a first viewpoint with a fourth view of at least the portion of the three-dimensional environment corresponding to a fourth viewpoint selected in accordance with the respective movement of the user's hand, in accordance with a determination that the respective position is the first position and that the respective movement includes a second amount of movement different from the first amount of movement, and replacing the first view of the at least the portion of the three-dimensional environment corresponding to the first viewpoint with a fifth view of at least the portion of the three-dimensional environment corresponding to a fifth viewpoint selected in accordance with the respective movement of the user's hand and the second position in the three-dimensional environment, in accordance with a determination that the respective position is the second position and that the respective movement includes the second amount of movement, provides additional control options without cluttering the UI with additional displayed controls (e.g., additional displayed controls for replacing the first view, additional displayed controls for selecting between the third and fourth viewpoints, etc.). Providing additional control options without cluttering the UI with additional displayed controls enhances the operability of the device, which, additionally, reduces power usage and improves battery life of the device by enabling the user to use the device more quickly and efficiently.

In some embodiments, in response to detecting the gaze input directed to the respective position (e.g., the respective position being the 1st, 2nd, 3rd, 4th, or 5th position, etc.) in the portion of the three-dimensional environment, the computing system applies a visual effect (e.g., visual marker 7122 on the virtual tree 7120 in FIG. 7A) at the respective position to visually distinguish the respective position from its surrounding areas in the three-dimensional environment (e.g., displaying a spotlight on the respective position or on an object at the respective position, where the spotlight highlights the respective position to which the gaze input is directed to indicate a current position of the gaze input in the three-dimensional environment). Applying a visual effect at the respective position to visually distinguish the respective position for its surrounding area in the three-dimensional environment, in response to detecting the gaze input directed to the respective position in the portion of the three-dimensional environment, provides improved visual feedback to the user (e.g., improved visual feedback that the computer system has detected the user's gaze input directed to the respective position in the portion of the three-dimensional environment, improved visual feedback identifying the respective position, etc.). Providing improved feedback enhances the operability of the device, which, additionally, reduces power usage and improves battery life of the device by enabling the user to use the device more quickly and efficiently.

In some embodiments, prior to detecting the change in grip of the user's hand that results in the first predefined hand grip, the computing system detects the gaze input at a third position different from the respective position in the three-dimensional environment. In response to detecting the gaze input at the third position, the computing system applies the visual effect at the third position in the three-dimensional environment to visually distinguish the sixth position from its surrounding areas in the three-dimensional environment. While displaying the visual effect at the third position in the three-dimensional environment, the computing system detects movement of the gaze input from the third position to the respective position in the three-dimensional environment. In response to detecting the movement of the gaze input from the third position to the respective position, the computing system ceases to apply the visual effect at the third position and applies the visual effect to the respective position (e.g., moving the spotlight from the third position to the respective position in accordance with the movement of the gaze input in at least the portion of the three-dimensional environment (e.g., following the same path as the gaze input) in the three-dimensional environment)). Applying the visual effect at the third position in the three-dimensional environment to visually distinguish the third position from its surrounding areas in the three-dimensional environment in response to detecting the gaze input at the third position, and ceasing to applying the visual effect at the third position and applying the visual effect to the respective position in response to detecting the movement of the gaze input from the third position to the respective position, provides improved visual feedback to the user (e.g., improved visual feedback regarding movement of the gaze input from the third position to the respective position). Providing improved feedback enhances the operability of the device, which, additionally, reduces power usage and improves battery life of the device by enabling the user to use the device more quickly and efficiently.

In some embodiments (e.g., before detecting the change in grip of the user's hand, while the user's hand maintains the first predefined hand grip, etc.), the computing system detects a respective gesture comprising predefined movement of a first portion of the user's hand relative to a second portion of the user's hand (e.g., rubbing the user's thumb against the user's index finger, moving one or more fingers while maintaining the first predefined hand grip, etc.), and in response to detecting the respective gesture, the computing system shifts a respective application location of the visual effect in the portion of the view of the three-dimensional environment in accordance with the respective gesture (e.g., the direction and amount of the movement of the application location of the visual effect is selected based on the direction, speed, and/or magnitude of the respective gesture). For example, before the predefined hand grip is formed or while the predefined hand grip is maintained, one or more gestures can be performed using the same hand to fine tune the target position selected by the gaze input, before the movement of the hand is used to navigate the viewpoint toward the preset viewpoint associated with the target position (e.g., the target position itself, a suitable viewpoint for the object that is close to the target position, etc.). Detecting a respective gesture comprising predefined movement of a first portion of the user's hand relative to a second portion of the user's hand, and shifting a respective application location of the visual effect in the portion of the view of the three-dimensional environment in accordance with the respective gesture, provides additional control options without cluttering the UI with additional displayed controls (e.g., additional displayed controls for shifting a respective application location of the visual effect). Providing additional control options without cluttering the UI with additional displayed controls enhances the operability of the device, which, additionally, reduces power usage and improves battery life of the device by enabling the user to use the device more quickly and efficiently.

In some embodiments, detecting the respective movement of the user's hand while maintaining the first predefined hand grip includes detecting movement of the user's hand (e.g., rotational movement of the wrist while the arm connected to the wrist is kept still or substantially still (e.g., with less than a threshold amount of movement), or moving the arm together with the wrist toward the user, etc.) while a plurality of fingers (e.g., all fingers, four fingers, etc.) of the hand remain in contact with a palm of the hand (e.g., the user maintains a closed fist or full grip). Replacing the first view of the at least the portion of the three-dimensional environment corresponding to the first viewpoint with a second view or a third view, selected in accordance with the respective movement of the user's hand and the first position or second position, respectively, in response to detecting the respective movement of the user's hand while maintaining the first predefined hand grip, further including detecting movement of the user's hand while a plurality of fingers of the hand remain in contact with a palm of the hand, provides additional control options without cluttering the UI with additional displayed controls (e.g., additional displayed controls for replacing the first view with the second view or third view, additional displayed controls for selecting the second view or third view, etc.). Providing additional control options without cluttering the UI with additional displayed controls enhances the operability of the device, which, additionally, reduces power usage and improves battery life of the device by enabling the user to use the device more quickly and efficiently.

In some embodiments, selecting the second viewpoint or the third viewpoint in accordance with the respective movement of the hand includes selecting the second viewpoint or the third viewpoint based on an amount of rotation of the hand around a wrist attached to the hand in the respective movement of the hand. In some embodiments, lateral movement of the hand due to movement of the user's arm or person is not taken into account when determining the amount of locomotion that results from the respective movement of the hand. In some embodiments, rotational movement of the hand around the elbow due to movement of the user's arm is not taken into account when determining the amount of locomotion that results from the respective movement of the hand. Selecting the second viewpoint or the third viewpoint based on an amount of rotation of the hand around a wrist attached to the hand in the respective movement of the hand provides additional control options without cluttering the UI with additional displayed controls (e.g., additional displayed controls for selecting, or choosing between, the second viewpoint and third viewpoint). Providing additional control options without cluttering the UI with additional displayed controls enhances the operability of the device, which, additionally, reduces power usage and improves battery life of the device by enabling the user to use the device more quickly and efficiently.

In some embodiments, selecting the second viewpoint or the third viewpoint in accordance with the respective movement of the hand includes selecting the second viewpoint or the third viewpoint based on an amount of rotation of the hand around an elbow attached to the hand (e.g., by a forearm and a wrist) in the respective movement of the hand. In some embodiments, lateral movement of the hand due to movement of the user's arm or person is not taken into account when determining the amount of locomotion that results from the respective movement of the hand. In some embodiments, rotational movement of the hand around the wrist is not taken into account when determining the amount of locomotion that results from the respective movement of the hand. Selecting the second viewpoint or the third viewpoint based on an amount of rotation of the hand around an elbow attached to the hand in the respective movement of the hand provides additional control options without cluttering the UI with additional displayed controls (e.g., additional displayed controls for selecting, or choosing between, the second viewpoint and third viewpoint). Providing additional control options without cluttering the UI with additional displayed controls enhances the operability of the device, which, additionally, reduces power usage and improves battery life of the device by enabling the user to use the device more quickly and efficiently.

In some embodiments, when selecting the second viewpoint or the third viewpoint in accordance with the respective movement of the hand, a full range of rotational movement of the user's hand around a wrist attached to the hand causes navigation to a respective (e.g., preselected) viewpoint corresponding to the respective position (e.g., the respective position itself, a closest suitable viewpoint for viewing an object at the respective position, etc.) to which the gaze input is directed, and different amounts of rotational movements of the user's hand around the wrist that are less than the full range of rotational movement of the user's hand around the wrist cause different amounts (e.g., with positive correlation to the amount of rotational movement) of navigation toward the respective viewpoint corresponding to the respective position to which the gaze input is directed. In some embodiments, the different amounts of navigation are proportional to the different amounts of rotational movement. In some embodiments, a different mapping between the amount of rotational movement and the amount of navigation toward the preselected viewpoint corresponding to the gaze selected destination is used (e.g., logarithmic mapping, exponential mapping, etc.). Selecting the second viewpoint or the third viewpoint in accordance with the respective movement of the hand, wherein a full range of rotational movement of the user's hand around a wrist attached to the hand causes navigation to a respective viewpoint corresponding to the respective position to which the gaze input is directed, and different amounts of rotational movements of the user's hand around the wrist that are less than the full range of rotational movement of the user's hand around the wrist cause different amounts of navigation toward the respective viewpoint corresponding to the respective position to which the gaze input is directed, provides additional control options without cluttering the UI with additional displayed controls (e.g., additional displayed controls for selecting, or choosing between, the second viewpoint and third viewpoint, additional displayed controls for selecting an amount of navigation toward the respective viewpoint). Providing additional control options without cluttering the UI with additional displayed controls enhances the operability of the device, which, additionally, reduces power usage and improves battery life of the device by enabling the user to use the device more quickly and efficiently.

In some embodiments, detecting the respective movement of the user's hand while the user's hand maintains the first predefined hand grip further includes detecting one or more tap gestures performed by the user's hand (e.g., as the user taps on the hand while maintaining the predefined hand grip, the first view is changed to a view corresponding to a different viewpoint). In some embodiments, one or more characteristics of the change in the views (e.g., the distance between the first viewpoint and the subsequent viewpoints, the rate at which the first view is changed to the different view, etc.) depend on one or more characteristics of the tap gesture(s) (e.g., fast tapping causes faster navigation between views, and slower tapping causes slower navigation between views)). In some embodiments, the tap gestures are micro-gestures performed by a finger (e.g., thumb) on another part of the same hand (e.g., on the side of the index finger, on the side of the middle finger, etc.), e.g., while the other fingers are curled up against the palm. In some embodiments, each tap corresponds to a fixed amount of navigation toward the selected target position (e.g., selected by the gaze input, and optionally adjusted by a predefined micro-gesture detected before the tap gestures), and repeated taps cause progressive navigation toward the selected target position. In some embodiments, the tap gesture on the hand is started upon touch-down of a finger on another part of the same hand, and continues while the contact is maintained on the hand; and the amount of navigation is based on the duration that the contact is maintained. In some embodiments, the speed of navigation increases from a first speed to a second speed as the duration of the contact exceeds a threshold duration. In some embodiments, an animated transition between the first view and the subsequent views are generated based on the acceleration and/or speed of the tap gesture(s). Replacing the first view of the at least the portion of the three-dimensional environment corresponding to the first viewpoint with a second view or a third view, selected in accordance with the respective movement of the user's hand and the first position or second position, respectively, in response to detecting the respective movement of the user's hand while maintaining the first predefined hand grip, further including detecting one or more tap gestures performed by the user's hand, provides additional control options without cluttering the UI with additional displayed controls (e.g., additional displayed controls for replacing the first view with the second view or third view, additional displayed controls for selecting the second view or third view, etc.). Providing additional control options without cluttering the UI with additional displayed controls enhances the operability of the device, which, additionally, reduces power usage and improves battery life of the device by enabling the user to use the device more quickly and efficiently.

In some embodiments, detecting the respective movement of the user's hand while the user's hand maintains the first predefined hand grip further includes detecting one or more swipe gestures performed by the user's hand (e.g., as the user swipes forward (or backward) (e.g., swiping the thumb of the hand across or along the side of the index finger, etc.) while maintaining the predefined hand grip (e.g., with four fingers curled up against the palm)), and in response the first view is changed to a view corresponding to a different viewpoint. In some embodiments, one or more characteristics of the change in the views (e.g., the distance between the first viewpoint and the subsequent viewpoints, the rate at which the first view is changed to the different view, etc.) depend on one or more characteristics of the swipe gesture(s) (e.g., fast swiping causes faster navigation between views, and slower swiping causes slower navigation between views)). In some embodiments, the swipe gestures are micro-gestures performed by a finger (e.g., thumb) on another part of the same hand (e.g., on the side of the index finger, on the side of the middle finger, etc.), e.g., while the other fingers are curled up against the palm. In some embodiments, each swipe corresponds to a fixed amount of navigation toward the selected target position (e.g., selected by the gaze input, and optionally adjusted by a predefined micro-gesture detected before the tap gestures), and repeated swipes cause progressive navigation toward the selected target position. In some embodiments, the swipe gesture on the hand is started upon touch-down of a finger on another part of the same hand, and continues while the contact is maintained on the hand; and the amount of navigation is based on the amount of movement of the finger on the hand while the contact is maintained. In some embodiments, an animated transition between the first view and the subsequent views are generated based on the acceleration and/or speed of the swipe gesture(s). Replacing the first view of the at least the portion of the three-dimensional environment corresponding to the first viewpoint with a second view or a third view, selected in accordance with the respective movement of the user's hand and the first position or second position, respectively, in response to detecting the respective movement of the user's hand while maintaining the first predefined hand grip, further including detecting one or more swipe gestures performed by the user's hand, provides additional control options without cluttering the UI with additional displayed controls (e.g., additional displayed controls for replacing the first view with the second view or third view, additional displayed controls for selecting the second view or third view, etc.). Providing additional control options without cluttering the UI with additional displayed controls enhances the operability of the device, which, additionally, reduces power usage and improves battery life of the device by enabling the user to use the device more quickly and efficiently.

In some embodiments, detecting the respective movement of the user's hand while the user's hand maintains the first predefined hand grip further includes detecting movement of the user's hand toward the user while the first predefined hand grip is maintained (e.g., corresponding to a "drawing back" gesture as the first part of a "slingshot motion"); and ceasing to maintain the first predefined hand grip after the movement of the user's hand toward the user (e.g., corresponding to a releasing gesture as the second part of a "slingshot motion"). In some embodiments, upon detecting the releasing motion (e.g., cessation of the first predefined hand grip), the computer system starts the navigation from the first view to the subsequent views of the three-dimensional environment. In some embodiments, the distance between the first viewpoint and the subsequent viewpoint is based on (e.g., proportional to, otherwise positively correlated to, etc.) the movement distance of the hand prior to the cessation of the first predefined hand grip. In some embodiments, how fast the view changes from the first viewpoint to subsequent viewpoint is based on (e.g., proportional to, otherwise positively correlated to, etc.) how far the user drags back the hand in the first part of the slingshot motion). Replacing the first view of the at least the portion of the three-dimensional environment corresponding to the first viewpoint with a second view or a third view, selected in accordance with the respective movement of the user's hand and the first position or second position, respectively, in response to detecting the respective movement of the user's hand while maintaining the first predefined hand grip, further including detecting movement of the user's hand toward the user while the first predefined hand grip is maintained and ceasing to maintain the first predefined hand grip after the movement of the user's hand toward the user, provides additional control options without cluttering the UI with additional displayed controls (e.g., additional displayed controls for replacing the first view with the second view or third view, additional displayed controls for selecting the second view or third view, etc.). Providing additional control options without cluttering the UI with additional displayed controls enhances the operability of the device, which, additionally, reduces power usage and improves battery life of the device by enabling the user to use the device more quickly and efficiently.

In some embodiments, the computing system displays a sequence of intermediate views corresponding to a sequence of intermediate viewpoints between the first viewpoint and the second or third viewpoint, wherein the sequence of intermediate viewpoints corresponds to movement of a virtual viewer in the three-dimensional environment that is based on (e.g., proportional to, otherwise positively correlated to, etc.) one or more movement characteristics (e.g., rotational speed, amount of rotation, a combination thereof of the hand around the wrist, around the elbow, etc.; tapping speed, tapping duration, swiping speed, swiping distance, etc.) of the respective movement (e.g., the first amount of movement or the second amount of movement) of the user's hand. Displaying a sequence of intermediate views corresponding to a sequence of intermediate viewpoints between the first viewpoint and the second or third viewpoint, wherein the sequence of intermediate viewpoints corresponds to movement of a virtual viewer in the three-dimensional environment that is based on one or more movement characteristics of the respective movement of the user's hand, provides improved visual feedback to the user (e.g., improved visual feedback regarding the one or more movement characteristics of the respective movement of the user's hand). Providing improved feedback enhances the operability of the device, which, additionally, reduces power usage and improves battery life of the device by enabling the user to use the device more quickly and efficiently.

In some embodiments, while replacing the first view of at least the portion of the three-dimensional environment corresponding to the first viewpoint with a subsequent view (e.g., the second, third, fourth, or fifth view, etc.) of at least the portion of the three-dimensional environment corresponding to a subsequent viewpoint (e.g., the second, third, fourth, or fifth view, etc.) closer to a target position selected in accordance with the respective position of the gaze input, the computing system displays an animated transition between the first view and the subsequent view while visually deemphasizing (e.g., blurring, darkening, de-saturating, etc.) a peripheral portion of a field of view of the user into the three-dimensional environment during the animated transition between the first view and the subsequent view (e.g., as the first view transitions into the subsequent view, peripheral vision is occluded to reduce motion sickness caused to the user). Displaying an animated transition between the first view and the subsequent view while visually deemphasizing a peripheral portion of a field of view of the user into the three-dimensional environment during the animated transition, provides improved visual feedback to the user (e.g., improved visual feedback that the computer system is replacing the first view with the subsequent view). Providing improved feedback enhances the operability of the device, which, additionally, reduces power usage and improves battery life of the device by enabling the user to use the device more quickly and efficiently.

In some embodiments, replacing the first view with another view (e.g., the second view, the third view, etc.) of the three-dimensional environment corresponding to a viewpoint (e.g., the second viewpoint, the third viewpoint, etc.) different from the first viewpoint is performed in accordance with a determination that the respective position to which the gaze input is directed corresponds to a position of a non-moveable object (e.g., a representation of a physical object, a virtual object that is fixed to the three-dimensional environment, etc.). In response to detecting the respective movement of the user's hand while the user's hand maintains the first predefined hand grip and in accordance with a determination that the respective position in at least the portion of the three-dimensional environment corresponds to a position of a movable object (e.g., a virtual object that is not fixed in the virtual environment): the computing system maintains display of the first view of the at least the portion of the three-dimensional environment; and the computing system moves the movable object from the respective position toward the first viewpoint (e.g., the user appears to be stationary inside the virtual environment and only the object moves with respect to the user). Maintaining display of the first view of the at least the portion of the three-dimensional environment and moving the movable object from the respective position toward the first viewpoint, in accordance with a determination that the respective position in at least the portion of the three-dimensional environment corresponds to a position of a movable object, moves the movable object (instead of the first view) when a set of conditions has been met without requiring further user input (e.g., further user input to select and move the movable object, further user input to choose between moving the first view or moving the first movable object, etc.). Performing an operation when a set of conditions has been met without requiring further user input enhances the operability of the device, which, additionally, reduces power usage and improves battery life of the device by enabling the user to use the device more quickly and efficiently.

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000 and 10000) are also applicable in an analogous manner to method 8000 described above with respect to FIG. 8. For example, the gestures, navigation targets, anchor positions, target positions, virtual objects, views, viewpoints, virtual positions of the viewpoints, locomotion requests, hand postures, hand grips, gaze inputs, physical objects, user interface objects, intermediate views, object types, and/or animations described above with reference to method 8000 optionally have one or more of the characteristics of the gestures, navigation targets, anchor positions, target positions, virtual objects, views, viewpoints, virtual positions of the viewpoints, locomotion requests, hand postures, hand grips, gaze inputs, physical objects, user interface objects, intermediate views, object types, and/or animations described herein with reference to other methods described herein (e.g., methods 9000 and 10000). For brevity, these details are not repeated here.

FIG. 9 is a flowchart of a method 9000 for selectively moving a virtual object relative to the three-dimensional environment (and the viewpoint) or moving the viewpoint relative to the three-dimensional environment (and all the virtual objects inside the three-dimensional environment) based on the hand grip that is maintained during a sequence of user inputs, in accordance with some embodiments.

In some embodiments, method 9000 is performed at a computer system (e.g., computer system 101 in FIG. 1) including a first display generation component (e.g., display 7100 in FIGS. 7A-7O, an inner display of an HMD, etc.) and one or more input devices (e.g., cameras, controllers, touch-sensitive surfaces, joysticks, buttons, gloves, watches, motion sensors, orientation sensors, etc.). In some embodiments, the first display generation component is a heads-up display, a head-mounted display (HMD), a display, a touch-screen, a projector, etc. In some embodiments, the first display generation component is a display component facing the user and provides a CGR experience to the user. In some embodiments, the first display generation component is an inner display of a two-sided display device (e.g., a two-sided HMD) that displays a first user interface on a first side corresponding to the first display generation component, and a second user interface on the second side corresponding to a second display generation component. In some embodiments, the computer system is an integrated device with one or more processors and memory enclosed in the same housing as the first display generation component and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from the display generation component(s) and/or the one or more input devices. In some embodiments, the display generation component(s) and the one or more input devices are integrated and enclosed in the same housing. In some embodiments, the method 8000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 9000 are, optionally, combined and/or the order of some operations is, optionally, changed.

In some embodiments, method 9000 is performed at a computing system including a display generation component (e.g., a heads-up display, an HMD, a display, a touch-screen, a projector, etc.) and one or more input devices (e.g., cameras, controllers, touch-sensitive surfaces, joysticks, buttons, etc.). The computing system displays (9002), via the display generation component, a view (e.g., the view shown in FIGS. 7E, 7F, and 7H) of at least a portion of a three-dimensional environment (e.g., a virtual environment) corresponding to a first viewpoint. While displaying the view (e.g., view shown in FIGS. 7E, 7F, and 7H) of the at least the portion of the three-dimensional environment corresponding to the first viewpoint, the computing system detects (9004) a respective user input, including detecting movement of one or both hands of a user (e.g., movement of the whole hand(s) around the wrist(s), elbow(s), and/or shoulder(s) of the user) in a physical environment (e.g., a single-handed two-finger pinch posture, a single-handed full hand grip, both hands being in the two-finger pinch posture, both hands being in the full-hand grip, etc.). In some embodiments, detecting the respective user input further includes detecting selection of a target position (e.g., detecting a gaze input directed to the target position prior to, at the same time of, or within a time window after) in the three-dimensional environment in conjunction with the movement of the one or both hands of the user. In response to detecting (9006) the respective user input: in accordance with a determination that the respective user input meets first criteria (e.g., one or both hands are in a world grip) (as shown in FIGS. 7F and 7G), wherein the first criteria include a first criterion that is met when the one or both hands of the user maintain a first grip (e.g., the two-finger pinch posture, or the full grip posture, etc.) while a first type of movement of the one or both hands is detected (e.g., the two hands each maintain a two-finger pinch posture or full grip posture while moving clockwise or counterclockwise around a virtual object, or a position in the virtual environment, or a single hand maintains the two-finger pinch posture or full grip posture while moving sideways or toward the user, etc.), the computing system moves (9008) a virtual object (e.g., virtual table 7142 in FIGS. 7F and 7G) (e.g., the virtual object located at the target position selected by the gaze input detected in conjunction with the movement of the user's hand(s)) in the three-dimensional environment relative to the three-dimensional environment in accordance with the movement of the one or both hands in the physical environment (while maintaining the first viewpoint) (e.g., the virtual object moves while the 3D environment and the user stay stationary (e.g., as viewed from a first viewing position). In some embodiments, the virtual object can be moved outside the portion of the 3D environment based on the hand movement (e.g., tossed away)). In response to detecting the respective user input and in accordance with a determination that the respective user input meets second criteria (e.g., as shown in FIGS. 7H-7I) (e.g., one or both hands are in a user grip) different from the first criteria (e.g., one or both hands are in the world grip), wherein the second criteria include a second criterion that is met when the one or both hands of the user maintain a second grip that is different from the first grip (e.g., the full grip posture, or the two-finger pinch posture, etc.) while a second type of movement of one of both of the hands is detected (e.g., the two hands each maintain a two-finger pinch posture or full grip posture while moving clockwise or counterclockwise around a virtual object, or a position in the virtual environment, or a single hand maintains the two-finger pinch posture or full grip posture while moving sideways or toward the user, etc.), the computing system replaces (9010) the view of at least the portion of the three-dimensional environment corresponding to the first viewpoint with a view (e.g., the view shown in FIG. 7I) of at least the portion of the three-dimensional environment corresponding to a second viewpoint (e.g., the viewpoint corresponding to the selected target position) different from the first viewpoint (e.g., the user is moved closer to the position where the eye gaze is directed to in the three-dimensional environment, in response to the movement of the hand; or the user is moved around an anchor position or anchor object selected by the gaze input or the starting position of the hand(s), etc.) (e.g., the virtual object stays stationary inside the virtual environment, and the user's position within the virtual environment (e.g., as reflected by the viewpoint corresponding to the current view of the virtual environment), moves in accordance with the hand movement).

In some embodiments, detecting that the one or both hands of the user are maintaining the first grip includes detecting that a first set of fingers (e.g., last three or four fingers, all fingers, etc.) of a respective hand (e.g., each hand, first hand, second hand, first and second hand, etc.) of the one or both hands of the user is maintaining contact with a palm of the respective hand (e.g., a full-hand grip may involve gripping by closing the entire hand (e.g., resembling a closed fist, of either one hand or both hands), and the second type of movement of the hand(s) while maintaining the full-hand grip causes an object in the three dimensional environment to be moved relative to the three-dimensional environment) and detecting that the one or both hands of the user are maintaining the second grip includes detecting a second set of fingers (e.g., thumb) of a respective hand (e.g., each hand, first hand, second hand, first and second hand, etc.) of the one or both hands are maintaining contact with a third set of fingers (e.g., index finger and/or middle finger, etc.) of the respective hand of the one or both hands (e.g., a two-finger grip may involve gripping by closing the thumb and another finger (e.g., of either one hand or both hands), and the first type of movement (e.g., rotation) of the hand(s) around a common center of rotation while maintaining the two-finger grip causes the user's position (e.g., the viewpoint) in the three dimensional environment to move relative to the three dimensional environment). In some embodiments, the functions of the first grip and the second grip are reversed, and the movement of the one or both hands while maintaining the second grip causes an object in the three-dimensional environment to be moved related to the three-dimensional environment, and the movement of the one or both hands while maintaining the first grip causes the user's position (e.g., the viewpoint) in the three-dimensional environment to change relative to the three-dimensional environment. Moving a virtual object in the three-dimensional environment relative to the three-dimensional environment in accordance with a determination that the respective user input meets first criteria requiring that a first set of fingers of a respective hand of the one or both hands of the user maintain contact with a palm of the respective hand, and replacing the view of at least the portion of the three-dimensional environment corresponding to the first viewpoint with a view of at least the portion of the three dimensional environment corresponding to a second viewpoint different from the first viewpoint in accordance with a determination that the respective user input meets second criteria requiring a second set of fingers of a respective hand of the one or both hands maintain contact with a third set of fingers of the respective hand of the one or both hands, provides additional control options without cluttering the UI with additional displayed controls (e.g., additional displayed controls for moving the virtual object and/or replacing the view of at least the portion of the three-dimensional environment corresponding to the first viewpoint). Providing additional control options without cluttering the UI with additional displayed controls enhances the operability of the device, which, additionally, reduces power usage and improves battery life of the device by enabling the user to use the device more quickly and efficiently.

In some embodiments, the first criterion is met when a single hand of the user maintains the first grip while the first type of movement of the single hand is detected. In some embodiments, the second criterion is met when the single hand of the user maintains the second grip while the second type of movement of the single hand is detected. Moving a virtual object in the three-dimensional environment relative to the three-dimensional environment in accordance with a determination that the respective user input meets first criteria requiring a single hand of the user maintain the first grip while the first type of movement of the single hand is detected, and replacing the view of at least the portion of the three-dimensional environment corresponding to the first viewpoint with a view of at least the portion of the three dimensional environment corresponding to a second viewpoint different from the first viewpoint in accordance with a determination that the respective user input meets second criteria requiring the single hand of the user maintain the second grip while the second type of movement of the single hand is detected, provides additional control options without cluttering the UI with additional displayed controls (e.g., additional displayed controls for moving the virtual object and/or replacing the view of at least the portion of the three-dimensional environment corresponding to the first viewpoint). Providing additional control options without cluttering the UI with additional displayed controls enhances the operability of the device, which, additionally, reduces power usage and improves battery life of the device by enabling the user to use the device more quickly and efficiently.

In some embodiments, the first type of movement is the same as the second type of movement (e.g., the same movement of the user's hand while maintaining different grips cause either the movement of the virtual object relative to the three-dimensional environment and the virtual position of the user in the three-dimensional environment, or the movement of the virtual position of the user in the three-dimensional environment).

In some embodiments, moving the virtual object in the three-dimensional environment in accordance with the movement of the one or both hands in the physical environment includes moving the virtual object (e.g., translation, rotation around internal axis, rotation around external axis, etc.) in the three-dimensional environment in accordance with the movement (e.g., sideways movement, rotational movement around the wrist or elbow toward or away from the user, etc.) of the single hand of the user in the physical environment while the single hand maintains the first grip (e.g., the world grip).

In some embodiments, replacing the view corresponding to the first viewpoint with the view corresponding to the second viewpoint includes displaying an animated transition corresponding to moving (e.g., translation, rotation, etc.) a viewpoint of a currently displayed view of the three-dimensional environment (e.g., the viewpoint corresponding to a virtual position of the user) from the first viewpoint to the second viewpoint in accordance with the movement (sideways movement, rotational movement around the wrist or elbow toward or away from the user, etc.) of the single hand of the user in the physical environment while the single hand maintains the second grip (e.g., the user grip). Moving a virtual object in the three-dimensional environment relative to the three-dimensional environment in accordance with the movement of the single hand of the user while the single hand maintains the first grip, and replacing the view of at least the portion of the three-dimensional environment corresponding to the first viewpoint with a view of at least the portion of the three dimensional environment corresponding to a second viewpoint different from the first viewpoint in accordance with movement of the single hand of the user while the single hand maintains the second grip, provides additional control options without cluttering the UI with additional displayed controls (e.g., additional displayed controls to initiate and/or cease moving the virtual object and/or replacing the view of at least the portion of the three-dimensional environment corresponding to the first viewpoint). Providing additional control options without cluttering the UI with additional displayed controls enhances the operability of the device, which, additionally, reduces power usage and improves battery life of the device by enabling the user to use the device more quickly and efficiently.

In some embodiments, moving the virtual object in the three-dimensional environment includes translating the virtual object in the three-dimensional environment relative to a position corresponding to the first viewpoint in accordance with the movement of the single hand while the single hand maintains the first grip. In some embodiments, moving the viewpoint of the currently displayed view of the three-dimensional environment from the first viewpoint to the second viewpoint includes translating the viewpoint in accordance with the movement of the single hand while the single hand maintains the second grip. For example, in some embodiments, the user moves his/her hand toward himself/herself, and as a result, if the hand maintains the first grip during the movement of the hand, the computer system moves the virtual object located at the selected target position linearly toward himself/herself in the first view of the three-dimensional environment corresponding to the first viewpoint, and if the hand maintains the second grip during the movement of the hand, the computer system moves the viewpoint of the currently displayed view of the three-dimensional environment toward the selected target position (e.g., to the target position, to a closest suitable viewpoint corresponding to the selected target position, etc.) in the three-dimensional environment. Translating the virtual object in the three-dimensional environment relative to a position corresponding to the first viewpoint in accordance with the movement of the single hand while the single hand maintains the first grip, and translating the viewpoint in accordance with the movement of the single hand while the single hand maintains the second grip, provides additional control options without cluttering the UI with additional displayed controls (e.g., additional displayed controls for translating the virtual object, additional displayed controls for translating the viewpoint, additional displayed controls for choosing between translating the virtual object or viewpoint, etc.). Providing additional control options without cluttering the UI with additional displayed controls enhances the operability of the device, which, additionally, reduces power usage and improves battery life of the device by enabling the user to use the device more quickly and efficiently.

In some embodiments, moving the virtual object in the three-dimensional environment includes rotating the virtual object in the three-dimensional environment around a position corresponding to the first viewpoint (e.g., so that the virtual object rotates around the virtual position of the user in the three-dimensional environment without getting closer to the virtual position of the user, and the same side of the virtual object is shown to the user in the first view of the three-dimensional environment during the rotation of the virtual object). In some embodiments, moving the viewpoint of the currently displayed view of the three-dimensional environment from the first viewpoint to the second viewpoint includes rotating the viewpoint around the anchor position with a predetermined spatial relationship to the first viewpoint (e.g., located in front of the position the first viewpoint) (e.g., so that the user can see the virtual object at the target position from another angle without moving the virtual object in the three-dimensional environment). For example, in some embodiments, the user moves his/her hand clockwise or counterclockwise toward himself/herself around a horizontal circle, and as a result, if the hand maintains the first grip during the movement of the hand, the computer system rotates the virtual object located at the selected target position around its own central axis so the far side of the virtual object is moved to the user in the first view of the three-dimensional environment corresponding to the first viewpoint, and if the hand maintains the second grip during the movement of the hand, the computer system moves the viewpoint of the currently displayed view of the three-dimensional environment along a circular orbit around an anchor point to a different side of the selected target position in the three-dimensional environment. Rotating the virtual object in the three-dimensional environment around a position corresponding to the first viewpoint in accordance with the movement of the single hand while the single hand maintains the first grip, and rotating the viewpoint around the anchor position with a predetermined spatial relationship to the first viewpoint in accordance with the movement of the single hand while the single hand maintains the second grip, provides additional control options without cluttering the UI with additional displayed controls (e.g., additional displayed controls for rotating the virtual object, additional displayed controls for rotating the viewpoint, additional displayed controls for choosing between rotating the virtual object or viewpoint, etc.). Providing additional control options without cluttering the UI with additional displayed controls enhances the operability of the device, which, additionally, reduces power usage and improves battery life of the device by enabling the user to use the device more quickly and efficiently.

In some embodiments, the first criterion is met when both hands of the user maintain the first grip while the first type of movement of the both hands of the user is detected. In some embodiments, the second criterion is met when both hand of the user maintain the second grip while the second type of movement of the both hands of the user is detected. Moving a virtual object in the three-dimensional environment relative to the three-dimensional environment in accordance with a determination that the respective user input meets first criteria requiring both hands of the user maintain the first grip while the first type of movement of the both hands of the user is detected, and replacing the view of at least the portion of the three-dimensional environment corresponding to the first viewpoint with a view of at least the portion of the three dimensional environment corresponding to a second viewpoint different from the first viewpoint in accordance with a determination that the respective user input meets second criteria requiring both hands of the user maintain the second grip while the second type of movement of the both hands of the user is detected, provides additional control options without cluttering the UI with additional displayed controls (e.g., additional displayed controls for moving the virtual object and/or replacing the view of at least the portion of the three-dimensional environment corresponding to the first viewpoint). Providing additional control options without cluttering the UI with additional displayed controls enhances the operability of the device, which, additionally, reduces power usage and improves battery life of the device by enabling the user to use the device more quickly and efficiently.

In some embodiments, the first type of movement is the same as the second type of movement. In some embodiments, moving the virtual object in the three-dimensional environment in accordance with the movement of the one or both hands in the physical environment includes rotating the virtual object around an axis (e.g., x, y, or z axis) of the virtual object in accordance with the movement of the one or both hands of the user in the physical environment while the one or both hands maintain the first grip (e.g., the relative movement of the two hands, such as rotating a virtual wheel, while both hands maintain the first grip cause the virtual object at the selected target position to rotate around its own axis so that another side of the virtual object to facing toward the user). In some embodiments, replacing the view corresponding to the first viewpoint with the view corresponding to the second viewpoint includes displaying an animated transition showing rotation of a virtual position of the user in the three-dimensional environment around the axis of the virtual object in accordance with the movement of the one or both hands of the user in the physical environment while the one or both hands maintain the second grip (e.g., the relative movement of the two hands, while both hands maintain the second grip cause the three-dimensional environment (or the facing direction of the user in the three-dimensional environment) to rotate around the axis of the object, such that the user can see the virtual object and the three-dimensional environment from a different viewing angle). Moving a virtual object in the three-dimensional environment relative to the three-dimensional environment in accordance with the movement of both hands of the user in the physical environment while the both hands maintain the first grip, and replacing the view of at least the portion of the three-dimensional environment corresponding to the first viewpoint with a view of at least the portion of the three dimensional environment corresponding to a second viewpoint different from the first viewpoint in accordance with movement of both hands of the user while the both hands maintain the second grip, provides additional control options without cluttering the UI with additional displayed controls (e.g., additional displayed controls to initiate and/or cease moving the virtual object and/or replacing the view of at least the portion of the three-dimensional environment corresponding to the first viewpoint). Providing additional control options without cluttering the UI with additional displayed controls enhances the operability of the device, which, additionally, reduces power usage and improves battery life of the device by enabling the user to use the device more quickly and efficiently.

In some embodiments, in response to detecting the respective user input and in accordance with a determination that the respective user input meets third criteria, wherein the third criteria include a third criterion that is met when the both hands of the user maintain a third grip (e.g., either the first grip or the second grip, or a type of grip that is different from the first grip and the second grip, directed to the selected target position, etc.) while detecting a third type of movement of the both hands (e.g., coordinated movement of both hands such as moving the two hands apart from each other or toward each other), the computing system resizes the virtual object in the three-dimensional environment relative to the three-dimensional environment in accordance with the movement of the both hands (e.g., relative movement of both hands) in the physical environment (e.g., the change in the size of the virtual object is proportional to or otherwise correlated to a change in distance between the two hands in the physical environment from the time when the representations of both hands in the three-dimensional environment first form the third grip). Resizing the virtual object in the three-dimensional environment relative to the three-dimensional environment in accordance with the movement of the both hands of the user in the physical environment, wherein the both hands of the user maintain a third grip while a third type of movement of the both hands is detected, provides additional control options without cluttering the UI with additional displayed controls (e.g., additional displayed controls for resizing the virtual object). Providing additional control options without cluttering the UI with additional displayed controls enhances the operability of the device, which, additionally, reduces power usage and improves battery life of the device by enabling the user to use the device more quickly and efficiently.

In some embodiments, detecting the respective user input includes detecting a gaze input directed to a portion of the three-dimensional environment in conjunction with detecting the movement of both hands of the user in the three-dimensional environment. In some embodiments, in response to detecting the respective user input: in accordance with a determination that the respective user input meets fourth criteria (e.g., the hand(s) are in a predefined grip and the gaze input is directed to a target position in the three-dimensional environment), wherein the fourth criteria include a fourth criterion that is met when both hands of the user maintain a fourth grip while a fourth type of movement of the both hands of the user is detected and the portion of the three-dimensional environment corresponds to a position of a movable virtual object, the computing system rotates the moveable virtual object (e.g., around its own axis, relative to other objects in the three-dimensional environment, etc.) in the three-dimensional environment; and in accordance with a determination that the respective user input meets fifth criteria, wherein the fifth criteria include a fifth criterion that is met when both hands of the user maintain a fifth grip (e.g., the fifth grip can be the same or different from the fourth grip) while a fifth type of movement of the both hands of the user is detected and the portion of the three-dimensional environment does not correspond to a movable virtual object (e.g., the second position corresponds to an unoccupied region in the three-dimensional environment or a non-moveable object in the three-dimensional environment, etc.), the computing system rotates the three-dimensional environment (e.g., along with all the virtual objects in the three-dimensional environment) around a virtual position of the user (e.g., the virtual position of the current viewpoint) in the three-dimensional environment. For example, in some embodiments, an animated transition showing a sequence of intermediate views corresponding a sequence of viewpoints that have the same virtual position of the current viewpoint but changing gradually changing viewing direction rotating around the virtual position of the current viewpoint. Rotating the movable virtual object in the three-dimensional environment in accordance with a determination that both hands of the user maintain a fourth grip while a fourth type of movement of the both hands of the user is detected and the portion of the three-dimensional environment corresponds to a position of a movable virtual object, and rotating the three-dimensional environment around a virtual position of the user in the three-dimensional environment in accordance with a determination that both hands of the user maintain a fifth grip while a fifth type of movement of the both hands of the user is detected, provides additional control options without cluttering the UI with additional displayed controls (e.g., additional displayed controls for rotating the virtual object, additional displayed controls for rotating the three-dimensional environment around a virtual position of the user, additional displayed controls for choosing between rotating the virtual object or three-dimensional environment, etc.). Providing additional control options without cluttering the UI with additional displayed controls enhances the operability of the device, which, additionally, reduces power usage and improves battery life of the device by enabling the user to use the device more quickly and efficiently.

In some embodiments, in response to detecting the respective user input and in accordance with a determination that the respective user input meets sixth criteria, wherein the sixth criteria include a sixth criterion that is met when both hands of the user maintain a sixth grip (e.g., may be any of the first to fifth grips, or a different grip) while a flexing movement of the both hands (e.g., the two hands of the user lift up or lower together in front of the user by bending the hands upward around their respective wrists while the arms are extended forward in front of the user, or rotating the forearms upward around the elbows in front of the user while the elbows are stationary in front of the user or close to the sides of the user, or rotating the whole arms upward in front of the user around the shoulder joints while the forearms are curled upward, etc.) is detected, the computing system adjusts a height of the virtual object in the three-dimensional environment in accordance with the flexing movement of the both hands (e.g., the height of the object keeps increasing as the flexing movement continues, or with every flexing movement). Adjusting a height of the virtual object in the three-dimensional environment in accordance with the flexing movement of the both hands provides additional control options without cluttering the UI with additional displayed controls (e.g., additional displayed controls for adjusting the height of the virtual object). Providing additional control options without cluttering the UI with additional displayed controls enhances the operability of the device, which, additionally, reduces power usage and improves battery life of the device by enabling the user to use the device more quickly and efficiently.

In some embodiments, in response to detecting the respective user input and in accordance with a determination that the respective user input meets seventh criteria, wherein the seventh criteria include a seventh criterion that is met when a single hand of the user maintains a seventh grip (e.g., may be any of the first to sixth grips, or a different grip) while detecting flexing movement of the single hand, the computing system moves the virtual object in the three-dimensional environment towards a virtual position of the user in the three-dimensional environment (e.g., the virtual object keeps getting closer to the first viewpoint with every flexing movement). Moving the virtual object in the three-dimensional environment towards a virtual position of the user in the three-dimensional environment, in accordance with a determination that the respective user input meets seventh criteria requiring a single hand of the user maintains a seventh grip while detecting flexing movement of the single hand, provides additional control options without cluttering the UI with additional displayed controls (e.g., additional displayed controls for moving the virtual object, additional displayed controls for selecting a direction to move the virtual object, etc.). Providing additional control options without cluttering the UI with additional displayed controls enhances the operability of the device, which, additionally, reduces power usage and improves battery life of the device by enabling the user to use the device more quickly and efficiently.

It should be understood that the particular order in which the operations in FIG. 9 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000 and 10000) are also applicable in an analogous manner to method 9000 described above with respect to FIG. 9. For example, the gestures, navigation targets, anchor positions, target positions, virtual objects, views, viewpoints, virtual positions of the viewpoints, locomotion requests, hand postures, hand grips, gaze inputs, physical objects, user interface objects, intermediate views, object types, and/or animations described above with reference to method 9000 optionally have one or more of the characteristics of the gestures, navigation targets, anchor positions, target positions, virtual objects, views, viewpoints, virtual positions of the viewpoints, locomotion requests, hand postures, hand grips, gaze inputs, physical objects, user interface objects, intermediate views, object types, and/or animations described herein with reference to other methods described herein (e.g., methods 8000 and 10000). For brevity, these details are not repeated here.

FIG. 10 is a flowchart of a method 10000 for moving a viewpoint toward a selected navigation target in response to a locomotion request, where the position of the viewpoint is selected based on the position of the navigation target as well as one or more other characteristics of the navigation target, in accordance with some embodiments.

In some embodiments, method 10000 is performed at a computer system (e.g., computer system 101 in FIG. 1) including a first display generation component (e.g., display 7100 in FIGS. 7A-7O, an inner display of an HMD, etc.) and one or more input devices (e.g., cameras, controllers, touch-sensitive surfaces, joysticks, buttons, gloves, watches, motion sensors, orientation sensors, etc.). In some embodiments, the first display generation component is a heads-up display, a head-mounted display (HMD), a display, a touch-screen, a projector, etc. In some embodiments, the first display generation component is a display component facing the user and provides a CGR experience to the user. In some embodiments, the first display generation component is an inner display of a two-sided display device (e.g., a two-sided HMD) that displays a first user interface on a first side corresponding to the first display generation component, and a second user interface on the second side corresponding to a second display generation component. In some embodiments, the computer system is an integrated device with one or more processors and memory enclosed in the same housing as the first display generation component and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from the display generation component(s) and/or the one or more input devices. In some embodiments, the display generation component(s) and the one or more input devices are integrated and enclosed in the same housing. In some embodiments, the method 8000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 10000 are, optionally, combined and/or the order of some operations is, optionally, changed.

In some embodiments, a method 10000 is performed at a computing system including a display generation component (e.g., a heads-up display, an HMD, a display, a touch-screen, a projector, etc.) and one or more input devices (e.g., cameras, controllers, touch-sensitive surfaces, joysticks, buttons, etc.). The computing system displays (10002), by the display generation component, a first view (e.g., view shown in FIGS. 7J, 7L, and 7N) of at least a portion of a three-dimensional environment (e.g., a virtual environment) corresponding to a first viewpoint. While displaying the first view of the at least the portion of the three-dimensional environment corresponding to the first viewpoint, the computing system detects (10004) a set of one or more first user inputs specifying a navigation target located at a respective position in the three-dimensional environment and triggering a navigation operation toward the navigation target (e.g., gaze input 7208 and hand gestures detected in FIGS. 7K, 7M, and 7O) (e.g., selecting a respective target position by clicking a controller in the physical environment when the controller is pointing towards a respective location in the physical environment that corresponds to the respective target position; or using gaze to select a virtual object or position in the virtual environment as the target object or position and performing a hand gesture to trigger navigation toward the target virtual object or target position, etc.). In response to detecting the set of one or more first user inputs, the computing system displays (10006), by the display generation component, an updated view (e.g., views shown in FIGS. 7K, 7M, and 7O) of at least the portion of the three-dimensional environment corresponding to a second viewpoint different from the first viewpoint, wherein the second viewpoint is closer to the respective position of the navigation target than the first viewpoint but is spaced apart from the respective position of the navigation target, and the second viewpoint is selected in accordance with a predefined characteristic of the navigation target (e.g., the virtual picture frame 7152, the virtual grilles 7158, the virtual tree 7156, etc.) (e.g., whether it is a virtual object or location; the size, dimension, nature of the virtual object or location, etc.) in conjunction with the respective position of the navigation target (e.g., the second viewpoint is closer to the respective position of the navigation target than the first viewpoint, but is offset from the respective position in a manner that is based on the predefined characteristic of the navigation target).

In some embodiments, selecting the second viewpoint in accordance with the predefined characteristic of the navigation target in conjunction with the respective position of the navigation target includes: in accordance with a determination that the navigation target has a first size, selecting the second viewpoint at a first position that is a first distance away from the respective position of the navigation target; and in accordance with a determination that the navigation target has a second size that is different from the first size, selecting the second viewpoint at a second position that is a second distance away from the respective position of the navigation target, wherein the second distance is different from the first distance. In some embodiments, the first distance and the second distance are greater than the distance defined by a bounding box of the target object, and not necessarily linearly correlated to the size of the target object. In some embodiments, in response to a requests to navigate to a large object (such as a tree, a house, a building, etc.), the distance between the chosen viewpoint and the respective position (e.g., center or edge) of the large object is comparable to (e.g., 0.2 to 2 times of) the size of the large object; and in response to a request to navigate to a small object (e.g., an apple, a sign, an insect, etc.) that are located the same distance away from the virtual position of the user as the large object, the distance between the chosen viewpoint and the respective position of the small object is comparable to (e.g., 1 to 5 times of) the size of the small object. Selecting the second viewpoint at a first position that is a first distance away from the respective position of the navigation target, in accordance with a determination that the navigation target has a first size, and selecting the second viewpoint at a second position that is a second distance, different from the first distance, away from the respective portion of the navigation target in accordance with a determination that the navigation target has a second size different from the first size, selects the second viewpoint at an appropriate position (e.g., for viewing, based on the size of the navigation target) when a set of conditions has been met without requiring further user input (e.g., further user input to adjust the distance between the second position and the respective viewpoint of the navigation target for comfortable viewing).

Performing an operation when a set of conditions has been met without requiring further user input enhances the operability of the device, which, additionally, reduces power usage and improves battery life of the device by enabling the user to use the device more quickly and efficiently.

In some embodiments, selecting the second viewpoint in accordance with the predefined characteristic of the navigation target in conjunction with the respective position of the navigation target includes: in accordance with a determination that the navigation target corresponds to a virtual object of a first type (e.g., the navigation target is a landmark object such as a building, a mountain, etc.), selecting the second viewpoint at a third position that corresponds to a first vantage point relative to the respective position of the navigation target; and in accordance with a determination that the navigation target corresponds to a virtual object of a second type (e.g., the navigation target is a small object such as a tree, a street sign, a car, etc.) that is different from the first type, selecting the second viewpoint at a second position that corresponds to a second vantage point relative to the respective position of the navigation target, wherein the first vantage point is different from the second vantage point (e.g., the first position and the second position optionally have the same distance away from the respective position of the target object; or the first position and the second position have different distances from the respective position of the target object, etc.). For example, in some embodiments, if the target object is part of large scenery that requires appreciation from afar (e.g., a mountain, a farm, a lake, etc.), the second viewpoint is chosen to have a vantage point that is high up and outside of the confines of a building or room (e.g., looking out from the top of a building); and if the target object is an object that requires visual inspection (e.g., a car driving by, a sign, a person, etc.), the second viewpoint is chosen to have a vantage point that is close enough for visual inspection (e.g., looking down from the window). Selecting the second viewpoint at a third position that corresponds to a first vantage point relative to the respective position of the navigation target in accordance with a determination that the navigation target corresponds to a virtual object of the first type, and selecting the second viewpoint at a second position that corresponds to a second vantage point, different from the first vantage point, relative to the respective position of the navigation target in accordance with a determination that the navigation target corresponds to a virtual object of a second type different from the first type, selects an appropriate vantage point (e.g., based on the type of virtual object) when a set of conditions is met without requiring further user input (e.g., further user input to select the vantage point). Performing an operation when a set of conditions has been met without requiring further user input enhances the operability of the device, which, additionally, reduces power usage and improves battery life of the device by enabling the user to use the device more quickly and efficiently.

In some embodiments, the computing system displays, by the display generation component, an animated transition including a sequence of intermediate views of at least the portion of the three-dimensional environment corresponding to a sequence of viewpoints between the first viewpoint to the second viewpoint, wherein peripheral portions of respective intermediate views of the sequence of intermediate views of at least the portion of the three-dimensional environment are visually deemphasized (e.g., blurred and/or darkened, etc.) relative to central portions of the respective intermediate views of the sequence of intermediate views (e.g., simulating a vignette effect during the transition from the first viewpoint to the second viewpoint). Displaying an animated transition including a sequence of intermediate views of at least the portion of the three-dimensional environment corresponding to a sequence of viewpoints between the first viewpoint to the second viewpoint, wherein peripheral portions of respective intermediate views of the sequence of intermediate views are visually deemphasized relative to central portions of the respective intermediate views of the sequence of intermediate views, provides improved visual feedback to the user (e.g., improved visual feedback that the computer system is performing the navigation operation toward the navigation target, improved visual feedback that the computer system is displaying an updated view of at least the portion of the three-dimensional environment, improved visual feedback regarding the first and second viewpoints, etc.). Providing improved feedback enhances the operability of the device, which, additionally, reduces power usage and improves battery life of the device by enabling the user to use the device more quickly and efficiently.

In some embodiments, an amount of changes (e.g., degree of blurring, size of blurred area, blur radius, amount of desaturation, degree of darkening, size of darkened area, etc.) applied to a first set of display properties of the peripheral portions of the respective intermediate views is adjusted in accordance with a rate of transition represented by the sequence of intermediate views (e.g., a movement speed of the viewpoint of the currently displayed view as shown in the animation, etc.). For example, in some embodiments, a first amount of change is applied to first set of display properties of the peripheral portions of the intermediate views when the movement speed of the viewpoint is slow (e.g., two thousand frames showing a movement distance of one mile), and a second amount of change greater than the first amount of change is applied to the first set of display properties of the peripheral portions of the intermediate views when the movement speed of the viewpoint is fast (e.g., five hundred frames showing the movement distance of one mile). Displaying an animated transition including a sequence of intermediate views of at least the portion of the three-dimensional environment corresponding to a sequence of viewpoints between the first viewpoint to the second viewpoint, wherein peripheral portions of respective intermediate views of the sequence of intermediate views are visually deemphasized relative to central portions of the respective intermediate views of the sequence of intermediate views, and an amount of change applied to a first set of display properties of the peripheral portions of the respective intermediate views in accordance with a rate of transition represented by the sequence of intermediate views, provides improved visual feedback to the user (e.g., improved visual feedback that the computer system is performing the navigation operation toward the navigation target, improved visual feedback that the computer system is displaying an updated view of at least the portion of the three-dimensional environment, improved visual feedback regarding the first and second viewpoints, etc.). Providing improved feedback enhances the operability of the device, which, additionally, reduces power usage and improves battery life of the device by enabling the user to use the device more quickly and efficiently.

In some embodiments, a size of the peripheral portions of the respective intermediate views that are visually deemphasized relative to the central portions of the respective intermediate views increases during at least a sub-sequence of the sequence of intermediate views (e.g., in the beginning sub-sequence of the sequence of intermediate views).

Increasing a size of the peripheral portions of the respective intermediate views during at least a sub-sequence of the sequence of intermediate views provides improved visual feedback to the user (e.g., improved visual feedback regarding the progress of the animated transition, improved visual feedback by increasing the size of peripheral portions of the respective intermediate views, etc.). Providing improved feedback enhances the operability of the device, which, additionally, reduces power usage and improves battery life of the device by enabling the user to use the device more quickly and efficiently.

In some embodiments, detecting the set of one or more first user inputs includes, after triggering the navigation operation toward the navigation target in response to a beginning portion of the set of one or more first user inputs, detecting a continuing portion of the set of one or more first user inputs, wherein the progress of the navigation operation toward the navigation target corresponds to progress of the continuing portion of the set of one or more first user inputs. For example, the animated transition that includes intermediate views between the views corresponding to the first viewpoint and the second viewpoint is generated in accordance with continuous movement of the user's hand (e.g., a wrist flex toward the user). Detecting a continuing portion of the set of one or more first user inputs, and triggering a navigation operation toward the navigation target, wherein progress of the navigation operation toward the navigation target corresponds to progress of the continuing portion of the set of one or more first user inputs, provides additional control options without cluttering the UI with additional displayed controls (e.g., additional displayed controls for controlling the progress of the navigation operation, additional displayed controls for ceasing the navigation operation (e.g., if the user performs the one or more first user inputs in error), etc.). Providing additional control options without cluttering the UI with additional displayed controls enhances the operability of the device, which, additionally, reduces power usage and improves battery life of the device by enabling the user to use the device more quickly and efficiently.

It should be understood that the particular order in which the operations in FIG. 10 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000 and 9000) are also applicable in an analogous manner to method 10000 described above with respect to FIG. 10. For example, the gestures, navigation targets, anchor positions, target positions, virtual objects, views, viewpoints, virtual positions of the viewpoints, locomotion requests, hand postures, hand grips, gaze inputs, physical objects, user interface objects, intermediate views, object types, and/or animations described above with reference to method 10000 optionally have one or more of the characteristics of the gestures, navigation targets, anchor positions, target positions, virtual objects, views, viewpoints, virtual positions of the viewpoints, locomotion requests, hand postures, hand grips, gaze inputs, physical objects, user interface objects, intermediate views, object types, and/or animations described herein with reference to other methods described herein (e.g., methods 8000 and 9000). For brevity, these details are not repeated here.

The operations described above with reference to FIGS. 8, 9 and 10 are, optionally, implemented by components depicted in FIGS. 1-6. In some embodiments, aspects/operations of methods 8000, 9000 and 10000 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at a computer system including a display generation component and one or more input devices:
displaying, via the display generation component, a view of at least a portion of a three-dimensional environment corresponding to a first viewpoint;
while displaying the view of the at least the portion of the three-dimensional environment corresponding to the first viewpoint, detecting a respective user input by a user of the computer system, including detecting movement of one or both hands of a user in a physical environment; and
in response to detecting the respective user input:
in accordance with a determination that the respective user input meets first criteria, wherein the first criteria include a first criterion that is met when the one or both hands of the user maintain a first grip while a first type of movement of the one or both hands is detected, moving a virtual object in the three-dimensional environment relative to the three-dimensional environment in accordance with the movement of the one or both hands in the physical environment; and
in accordance with a determination that the respective user input meets second criteria different from the first criteria, wherein the second criteria include a second criterion that is met when the one or both hands of the user maintain a second grip that is different from the first grip while a second type of movement of the one or both hands is detected, replacing the view of at least the portion of the three-dimensional environment corresponding to the first viewpoint with a view of at least the portion of the three-dimensional environment corresponding to a second viewpoint different from the first viewpoint.

2. The method of claim 1, wherein detecting that the one or both hands of the user are maintaining the first grip includes detecting that a first set of fingers of a respective hand of the one or both hands of the user is maintaining contact with a palm of the respective hand; and wherein detecting that the one or both hands of the user are maintaining the second grip includes detecting that a second set of fingers of the respective hand of the one or both hands is maintaining contact with a third set of fingers of the respective hand of the one or both hands.

3. The method of claim 1, wherein:
the first criterion is met when a single hand of the user maintains the first grip while the first type of movement of the single hand is detected, and
the second criterion is met when the single hand of the user maintains the second grip while the second type of movement of the single hand is detected.

4. The method of claim 3, wherein:
the first type of movement is the same as the second type of movement,
moving the virtual object in the three-dimensional environment in accordance with the movement of the one or both hands in the physical environment includes moving the virtual object in the three-dimensional environment in accordance with the movement of the single hand of the user in the physical environment while the single hand maintains the first grip, and
replacing the view corresponding to the first viewpoint with the view corresponding to the second viewpoint includes displaying an animated transition corresponding to moving a viewpoint of a currently displayed view of the three-dimensional environment from the first viewpoint to the second viewpoint in accordance with the movement of the single hand of the user in the physical environment while the single hand maintains the second grip.

5. The method of claim 4, wherein:
moving the virtual object in the three-dimensional environment includes translating the virtual object in the three-dimensional environment relative to a position corresponding to the first viewpoint in accordance with the movement of the single hand while the single hand maintains the first grip; and
moving the viewpoint of the currently displayed view of the three-dimensional environment from the first viewpoint to the second viewpoint includes translating the viewpoint in accordance with the movement of the single hand while the single hand maintains the second grip.

6. The method of claim 4, wherein:
moving the virtual object in the three-dimensional environment includes rotating the virtual object in the three-dimensional environment around a position corresponding to the first viewpoint; and
moving the viewpoint of the currently displayed view of the three-dimensional environment from the first viewpoint to the second viewpoint includes rotating the viewpoint around an anchor position with a predetermined spatial relationship to the first viewpoint.

7. The method of claim 1, wherein:
the first criterion is met when both hands of the user maintain the first grip while the first type of movement of the both hands of the user is detected, and
the second criterion is met when both hand of the user maintain the second grip while the second type of movement of the both hands of the user is detected.

8. The method of claim 1, wherein:
the first type of movement is the same as the second type of movement;
moving the virtual object in the three-dimensional environment in accordance with the movement of the one or both hands in the physical environment includes rotating the virtual object around an axis of the virtual object in accordance with the movement of both hands of the user in the physical environment while the both hands maintain the first grip; and
replacing the view corresponding to the first viewpoint with the view corresponding to the second viewpoint includes displaying an animated transition showing rotation of a virtual position of the user in the three-dimensional environment around the axis of the virtual object in accordance with the movement of both hands of the user in the physical environment while the both hands maintain the second grip.

9. The method of claim 1, further including:
in response to detecting the respective user input:
in accordance with a determination that the respective user input meets third criteria, wherein the third criteria include a third criterion that is met when the both hands of the user maintain a third grip while detecting a third type of movement of the both hands, resizing the virtual object in the three-dimensional environment relative to the three-dimensional environment in accordance with the movement of the both hands in the physical environment.

10. The method of claim 1, wherein:
detecting the respective user input includes detecting a gaze input directed to a portion of the three-dimensional environment in conjunction with detecting the movement of both hands of the user in the three-dimensional environment; and
the method further includes, in response to detecting the respective user input:
in accordance with a determination that the respective user input meets fourth criteria, wherein the fourth criteria include a fourth criterion that is met when both hands of the user maintain a fourth grip while a fourth type of movement of the both hands of the user is detected and the portion of the three-dimensional environment corresponds to a position of a movable virtual object, rotating the movable virtual object in the three-dimensional environment; and
in accordance with a determination that the respective user input meets fifth criteria, wherein the fifth criteria include a fifth criterion that is met when both hands of the user maintain a fifth grip while a fifth type of movement of the both hands of the user is detected and the portion of the three-dimensional environment does not correspond to a movable virtual object, rotating the three-dimensional environment around a virtual position of the user in the three-dimensional environment.

11. The method of claim 1, further including:
in response to detecting the respective user input:
in accordance with a determination that the respective user input meets sixth criteria, wherein the sixth criteria include a sixth criterion that is met when both hands of the user maintain a sixth grip while a flexing movement of the both hands is detected, adjusting a height of the virtual object in the three-dimensional environment in accordance with the flexing movement of the both hands.

12. The method of claim 1, further including:
in response to detecting the respective user input:
in accordance with a determination that the respective user input meets seventh criteria, wherein the seventh criteria include a seventh criterion that is met when a single hand of the user maintains a seventh grip while detecting flexing movement of the single hand, moving the virtual object in the three-dimensional environment towards a virtual position of the user in the three-dimensional environment.

13. A computer system, comprising:
a display generation component;
one or more input devices;
one or more processors; and
memory storing one or more programs, wherein the one or more programs are configured to be executed by the one or more processors, the one or more programs including instructions for:
displaying, via the display generation component, a view of at least a portion of a three-dimensional environment corresponding to a first viewpoint;
while displaying the view of the at least the portion of the three-dimensional environment corresponding to the first viewpoint, detecting a respective user input, including detecting movement of one or both hands of a user in a physical environment; and
in response to detecting the respective user input:
in accordance with a determination that the respective user input meets first criteria, wherein the first criteria include a first criterion that is met when the one or both hands of the user maintain a first grip while a first type of movement of the one or both hands is detected, moving a virtual object in the three-dimensional environment relative to the three-dimensional environment in accordance with the movement of the one or both hands in the physical environment; and
in accordance with a determination that the respective user input meets second criteria different from the first criteria, wherein the second criteria include a second criterion that is met when the one or both hands of the user maintain a second grip that is different from the first grip while a second type of movement of the one or both hands is detected, replacing the view of at least the portion of the three-dimensional environment corresponding to the first viewpoint with a view of at least the portion of the three-dimensional environment corresponding to a second viewpoint different from the first viewpoint.

14. The computer system of claim 13, wherein detecting that the one or both hands of the user are maintaining the first grip includes detecting that a first set of fingers of a respective hand of the one or both hands of the user is maintaining contact with a palm of the respective hand; and wherein detecting that the one or both hands of the user are maintaining the second grip includes detecting a second set of fingers of the respective hand of the one or both hands is maintaining contact with a third set of fingers of the respective hand of the one or both hands.

15. The computer system of claim 13, wherein:
the first criterion is met when a single hand of the user maintains the first grip while the first type of movement of the single hand is detected, and
the second criterion is met when the single hand of the user maintains the second grip while the second type of movement of the single hand is detected.

16. The computer system of claim 15, wherein:
the first type of movement is the same as the second type of movement,
moving the virtual object in the three-dimensional environment in accordance with the movement of the one or both hands in the physical environment includes moving the virtual object in the three-dimensional environment in accordance with the movement of the single hand of the user in the physical environment while the single hand maintains the first grip, and
replacing the view corresponding to the first viewpoint with the view corresponding to the second viewpoint includes displaying an animated transition corresponding to moving a viewpoint of a currently displayed view of the three-dimensional environment from the first viewpoint to the second viewpoint in accordance with the movement of the single hand of the user in the physical environment while the single hand maintains the second grip.

17. The computer system of claim 16, wherein:
moving the virtual object in the three-dimensional environment includes translating the virtual object in the three-dimensional environment relative to a position corresponding to the first viewpoint in accordance with the movement of the single hand while the single hand maintains the first grip; and
moving the viewpoint of the currently displayed view of the three-dimensional environment from the first viewpoint to the second viewpoint includes translating the viewpoint in accordance with the movement of the single hand while the single hand maintains the second grip.

18. The computer system of claim 16, wherein:
moving the virtual object in the three-dimensional environment includes rotating the virtual object in the three-dimensional environment around a position corresponding to the first viewpoint; and
moving the viewpoint of the currently displayed view of the three-dimensional environment from the first viewpoint to the second viewpoint includes rotating the viewpoint around an anchor position with a predetermined spatial relationship to the first viewpoint.

19. The computer system of claim 13, wherein:
the first criterion is met when both hands of the user maintain the first grip while the first type of movement of the both hands of the user is detected, and
the second criterion is met when both hand of the user maintain the second grip while the second type of movement of the both hands of the user is detected.

20. The computer system of claim 13, wherein:
the first type of movement is the same as the second type of movement;
moving the virtual object in the three-dimensional environment in accordance with the movement of the one or both hands in the physical environment includes rotating the virtual object around an axis of the virtual object in accordance with the movement of both hands of the user in the physical environment while the both hands maintain the first grip; and
replacing the view corresponding to the first viewpoint with the view corresponding to the second viewpoint includes displaying an animated transition showing rotation of a virtual position of the user in the three-dimensional environment around the axis of the virtual object in accordance with the movement of both hands of the user in the physical environment while the both hands maintain the second grip.

21. The computer system of claim 13, wherein the one or more programs include instructions for, in response to detecting the respective user input:
in accordance with a determination that the respective user input meets third criteria, wherein the third criteria include a third criterion that is met when the both hands of the user maintain a third grip while detecting a third type of movement of the both hands, resizing the virtual object in the three-dimensional environment relative to the three-dimensional environment in accordance with the movement of the both hands in the physical environment.

22. The computer system of claim 13, wherein:
detecting the respective user input includes detecting a gaze input directed to a portion of the three-dimensional environment in conjunction with detecting the movement of both hands of the user in the three-dimensional environment; and
the one or more programs include instructions for, in response to detecting the respective user input:
in accordance with a determination that the respective user input meets fourth criteria, wherein the fourth criteria include a fourth criterion that is met when both hands of the user maintain a fourth grip while a fourth type of movement of the both hands of the user is detected and the portion of the three-dimensional environment corresponds to a position of a movable virtual object, rotating the movable virtual object in the three-dimensional environment; and
in accordance with a determination that the respective user input meets fifth criteria, wherein the fifth criteria include a fifth criterion that is met when both hands of the user maintain a fifth grip while a fifth type of movement of the both hands of the user is detected and the portion of the three-dimensional environment does not correspond to a movable virtual object, rotating the three-dimensional environment around a virtual position of the user in the three-dimensional environment.

23. The computer system of claim 13, wherein the one or more programs include instructions for, in response to detecting the respective user input:
in accordance with a determination that the respective user input meets sixth criteria, wherein the sixth criteria include a sixth criterion that is met when both hands of the user maintain a sixth grip while a flexing movement of the both hands is detected, adjusting a height of the virtual object in the three-dimensional environment in accordance with the flexing movement of the both hands.

24. The computer system of claim 13, wherein the one or more programs include instructions for, in response to detecting the respective user input:
in accordance with a determination that the respective user input meets seventh criteria, wherein the seventh criteria include a seventh criterion that is met when a single hand of the user maintains a seventh grip while detecting flexing movement of the single hand, moving the virtual object in the three-dimensional environment towards a virtual position of the user in the three-dimensional environment.

25. A non-transitory computer readable storage medium storing one or more programs, the one or more programs comprising instructions that, when executed by a computer system that includes a display generation component and one or more input devices, cause the computer system to:
display, via the display generation component, a view of at least a portion of a three-dimensional environment corresponding to a first viewpoint;
while displaying the view of the at least the portion of the three-dimensional environment corresponding to the first viewpoint, detect a respective user input, including detecting movement of one or both hands of a user in a physical environment; and in response to detecting the respective user input:
in accordance with a determination that the respective user input meets first criteria, wherein the first criteria include a first criterion that is met when the one or both hands of the user maintain a first grip while a first type of movement of the one or both hands is detected, move a virtual object in the three-dimensional environment relative to the three-dimensional environment in accordance with the movement of the one or both hands in the physical environment; and
in accordance with a determination that the respective user input meets second criteria different from the first criteria, wherein the second criteria include a second criterion that is met when the one or both hands of the user maintain a second grip that is different from the first grip while a second type of movement of the one or both hands is detected, replace the view of at least the portion of the three-dimensional environment corresponding to the first viewpoint with a view of at least the portion of the three-dimensional environment corresponding to a second viewpoint different from the first viewpoint.

26. The non-transitory computer readable storage medium of claim 25, wherein detecting that the one or both hands of the user are maintaining the first grip includes detecting that a first set of fingers of a respective hand of the one or both hands of the user is maintaining contact with a palm of the respective hand; and wherein detecting that the one or both hands of the user are maintaining the second grip includes detecting that a second set of fingers of the respective hand of the one or both hands is maintaining contact with a third set of fingers of the respective hand of the one or both hands.

27. The non-transitory computer readable storage medium of claim 25, wherein:
the first criterion is met when a single hand of the user maintains the first grip while the first type of movement of the single hand is detected, and
the second criterion is met when the single hand of the user maintains the second grip while the second type of movement of the single hand is detected.

28. The non-transitory computer readable storage medium of claim 27, wherein:
the first type of movement is the same as the second type of movement,
moving the virtual object in the three-dimensional environment in accordance with the movement of the one or both hands in the physical environment includes moving the virtual object in the three-dimensional environment in accordance with the movement of the single hand of the user in the physical environment while the single hand maintains the first grip, and
replacing the view corresponding to the first viewpoint with the view corresponding to the second viewpoint includes displaying an animated transition corresponding to moving a viewpoint of a currently displayed view of the three-dimensional environment from the first viewpoint to the second viewpoint in accordance with the movement of the single hand of the user in the physical environment while the single hand maintains the second grip.

29. The non-transitory computer readable storage medium of claim 28, wherein:
moving the virtual object in the three-dimensional environment includes translating the virtual object in the three-dimensional environment relative to a position corresponding to the first viewpoint in accordance with the movement of the single hand while the single hand maintains the first grip; and moving the viewpoint of the currently displayed view of the three-dimensional environment from the first viewpoint to the second viewpoint includes translating the viewpoint in accordance with the movement of the single hand while the single hand maintains the second grip.

30. The non-transitory computer readable storage medium of claim 28, wherein:

moving the virtual object in the three-dimensional environment includes rotating the virtual object in the three-dimensional environment around a position corresponding to the first viewpoint; and moving the viewpoint of the currently displayed view of the three-dimensional environment from the first viewpoint to the second viewpoint includes rotating the viewpoint around an anchor position with a predetermined spatial relationship to the first viewpoint.

31. The non-transitory computer readable storage medium of claim 25, wherein:

the first criterion is met when both hands of the user maintain the first grip while the first type of movement of the both hands of the user is detected, and the second criterion is met when both hand of the user maintain the second grip while the second type of movement of the both hands of the user is detected.

32. The non-transitory computer readable storage medium of claim 25, wherein:

the first type of movement is the same as the second type of movement;

moving the virtual object in the three-dimensional environment in accordance with the movement of the one or both hands in the physical environment includes rotating the virtual object around an axis of the virtual object in accordance with the movement of both hands of the user in the physical environment while the both hands maintain the first grip; and replacing the view corresponding to the first viewpoint with the view corresponding to the second viewpoint includes displaying an animated transition showing rotation of a virtual position of the user in the three-dimensional environment around the axis of the virtual object in accordance with the movement of both hands of the user in the physical environment while the both hands maintain the second grip.

33. The non-transitory computer readable storage medium of claim 25, wherein the one or more programs include instructions that when executed by the computer system cause the computer system to:

in response to detecting the respective user input:

in accordance with a determination that the respective user input meets third criteria, wherein the third criteria include a third criterion that is met when the both hands of the user maintain a third grip while detecting a third type of movement of the both hands, resize the virtual object in the three-dimensional environment relative to the three-dimensional environment in accordance with the movement of the both hands in the physical environment.

34. The non-transitory computer readable storage medium of claim 25, wherein:

detecting the respective user input includes detecting a gaze input directed to a portion of the three-dimensional environment in conjunction with detecting the movement of both hands of the user in the three-dimensional environment; and the one or more programs include instructions that when executed by the computer system cause the computer system to, in response to detecting the respective user input:

in accordance with a determination that the respective user input meets fourth criteria, wherein the fourth criteria include a fourth criterion that is met when both hands of the user maintain a fourth grip while a fourth type of movement of the both hands of the user is detected and the portion of the three-dimensional environment corresponds to a position of a movable virtual object, rotate the movable virtual object in the three-dimensional environment; and in accordance with a determination that the respective user input meets fifth criteria, wherein the fifth criteria include a fifth criterion that is met when both hands of the user maintain a fifth grip while a fifth type of movement of the both hands of the user is detected and the portion of the three-dimensional environment does not correspond to a movable virtual object, rotate the three-dimensional environment around a virtual position of the user in the three-dimensional environment.

35. The non-transitory computer readable storage medium of claim 25, wherein the one or more programs include instructions that when executed by the computer system cause the computer system to:

in response to detecting the respective user input:

in accordance with a determination that the respective user input meets sixth criteria, wherein the sixth criteria include a sixth criterion that is met when both hands of the user maintain a sixth grip while a flexing movement of the both hands is detected, adjust a height of the virtual object in the three-dimensional environment in accordance with the flexing movement of the both hands.

36. The non-transitory computer readable storage medium of claim 25, wherein the one or more programs include instructions that when executed by the computer system cause the computer system to:

in response to detecting the respective user input:

in accordance with a determination that the respective user input meets seventh criteria, wherein the seventh criteria include a seventh criterion that is met when a single hand of the user maintains a seventh grip while detecting flexing movement of the single hand, move the virtual object in the three-dimensional environment towards a virtual position of the user in the three-dimensional environment.

* * * * *